US012251342B2

(12) United States Patent
Larkner et al.

(10) Patent No.: US 12,251,342 B2
(45) Date of Patent: *Mar. 18, 2025

(54) MEDICAL PRODUCTS STORAGE DEVICE INCLUDING ACCESS CONTROL

(71) Applicant: HELMER SCIENTIFIC, LLC, Noblesville, IN (US)

(72) Inventors: Thomas J. Larkner, Noblesville, IN (US); David A. Ferrer, Westfield, IN (US); Jesse M. Smith, Noblesville, IN (US); Dennis H. Smith, Carmel, IN (US); Adam A. Cloud, Noblesville, IN (US); Mark D. Lockwood, Dubuque, IA (US); Mark G. Loeffelholz, Dubuque, IA (US); James R. Edwards, Bellevue, IA (US)

(73) Assignee: HELMER SCIENTIFIC, LLC, Noblesville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,348

(22) Filed: Dec. 15, 2023

(65) Prior Publication Data

US 2024/0115449 A1 Apr. 11, 2024

Related U.S. Application Data

(63) Continuation of application No. 17/992,230, filed on Nov. 22, 2022, now Pat. No. 11,883,335, which is a
(Continued)

(51) Int. Cl.
*A61G 12/00* (2006.01)
*A47B 81/00* (2006.01)
(Continued)

(52) U.S. Cl.
CPC .............. *A61G 12/00* (2013.01); *A47B 81/00* (2013.01); *B60B 33/00* (2013.01);
(Continued)

(58) Field of Classification Search
CPC .. A61G 12/00; G06Q 10/087; G07F 17/0064; G07F 11/165; G07F 17/0071;
(Continued)

(56) References Cited

U.S. PATENT DOCUMENTS

| 2,123,803 A | 7/1938 | Regenhardt |
| 2,501,932 A | 3/1950 | Budai et al. |

(Continued)

FOREIGN PATENT DOCUMENTS

| AU | 2014292968 B2 | 10/2019 |
| EP | 1467331 A2 | 10/2004 |

(Continued)

OTHER PUBLICATIONS

International Search Report and Written Opinion, International Application No. PCT/US2014/048209, search completed Jan. 20, 2015, 27 pages.
(Continued)

*Primary Examiner* — Michael Collins
(74) *Attorney, Agent, or Firm* — Womble Bond Dickinson (US) LLP

(57) ABSTRACT

An embodiment of a storage device for medical products includes a cabinet defining an enclosure having a plurality of compartments. In addition, the storage device includes a plurality of storage containers, each storage container configured to be inserted into a corresponding one of the plurality of compartments. Further, the storage device includes an actuation assembly including a plurality of arms that are configured to engage the plurality of storage containers so as to secure the plurality of storage containers in
(Continued)

the plurality of compartments. Still further, the storage device includes a release mechanism that is configured to simultaneously actuate each of the plurality of arms to release the plurality of storage containers from the plurality of compartments.

20 Claims, 37 Drawing Sheets

Related U.S. Application Data continuation of application No. 17/087,849, filed on Nov. 3, 2020, now Pat. No. 11,534,356, which is a continuation of application No. 15/442,193, filed on Feb. 24, 2017, now Pat. No. 10,821,044, which is a continuation of application No. 14/341,235, filed on Jul. 25, 2014, now Pat. No. 9,579,245.

(60) Provisional application No. 61/910,953, filed on Dec. 2, 2013, provisional application No. 61/858,880, filed on Jul. 26, 2013.

(51) Int. Cl.
  B60B 33/00 (2006.01)
  E05B 47/00 (2006.01)
  E05B 51/00 (2006.01)
  E05B 65/00 (2006.01)
  G06Q 10/087 (2023.01)
  G07C 9/28 (2020.01)
  G07F 9/10 (2006.01)
  G07F 11/16 (2006.01)
  G07F 11/62 (2006.01)
  G07F 17/00 (2006.01)

(52) U.S. Cl.
  CPC .......... E05B 47/0012 (2013.01); E05B 51/00 (2013.01); E05B 65/00 (2013.01); G06Q 10/087 (2013.01); G07C 9/28 (2020.01); G07F 9/105 (2013.01); G07F 11/165 (2013.01); G07F 11/62 (2013.01); G07F 17/0064 (2013.01); G07F 17/0071 (2013.01); G07F 17/0092 (2013.01); E05B 2047/0037 (2013.01); E05B 2047/0072 (2013.01)

(58) Field of Classification Search
  CPC ...... G07F 17/0092; G07F 11/62; G07F 9/105; G07C 9/28; A47B 81/00; B60B 33/00; E05B 47/0012; E05B 51/00; E05B 65/00; E05B 2047/0037; E05B 2047/0072
  USPC .................................................. 700/231–244
  See application file for complete search history.

(56) References Cited

U.S. PATENT DOCUMENTS

| | | |
|---|---|---|
| 3,068,023 A | 12/1962 | Fiala |
| 4,411,139 A | 10/1983 | Bos |
| 4,441,329 A | 4/1984 | Dawley |
| 4,463,348 A | 7/1984 | Sidebottom et al. |
| 4,560,088 A | 12/1985 | Tan |
| 4,566,285 A | 1/1986 | Tershak et al. |
| 4,616,890 A | 10/1986 | Romick |
| 5,025,950 A | 6/1991 | Trouteaud et al. |
| 5,139,321 A | 8/1992 | Beardsley |
| 5,262,758 A | 11/1993 | Nam et al. |
| 5,263,596 A * | 11/1993 | Williams ............ G07F 17/0092 221/198 |
| 5,314,244 A | 5/1994 | Swets et al. |
| 5,409,312 A | 4/1995 | Fletcher |
| 5,596,878 A | 1/1997 | Hanson et al. |
| 5,623,836 A | 4/1997 | Mrozinsky |
| 5,661,978 A | 9/1997 | Holmes et al. |
| 5,716,114 A | 2/1998 | Holmes et al. |
| 5,735,587 A | 4/1998 | Malin et al. |
| 5,745,366 A | 4/1998 | Higham et al. |
| 5,905,653 A | 5/1999 | Higham et al. |
| 6,011,999 A | 1/2000 | Holmes |
| 6,021,392 A | 2/2000 | Lester et al. |
| 6,116,067 A | 9/2000 | Myers et al. |
| 6,116,461 A | 9/2000 | Broadfield et al. |
| 6,119,471 A | 9/2000 | Tanaka et al. |
| 6,129,428 A | 10/2000 | Helwig et al. |
| 6,151,536 A | 11/2000 | Arnold et al. |
| 6,274,374 B1 | 8/2001 | Astle |
| 6,338,007 B1 | 1/2002 | Broadfield et al. |
| 6,401,466 B1 | 6/2002 | Olsen |
| 6,475,776 B1 | 11/2002 | Higuchi |
| 6,489,168 B1 | 12/2002 | Wang et al. |
| 6,532,399 B2 | 3/2003 | Mase |
| 6,536,859 B1 | 3/2003 | Bathe |
| 6,568,770 B2 | 5/2003 | Gonska et al. |
| 6,595,430 B1 | 7/2003 | Shah |
| 6,658,322 B1 | 12/2003 | Frederick et al. |
| 6,691,058 B2 | 2/2004 | Blakley |
| 6,707,381 B1 * | 3/2004 | Maloney ................ G07F 9/026 340/568.1 |
| 6,752,479 B2 | 6/2004 | Ferger et al. |
| 6,788,997 B1 | 9/2004 | Frederick |
| 6,810,350 B2 | 10/2004 | Blakley |
| 6,874,684 B1 | 4/2005 | Denenberg et al. |
| 6,935,560 B2 | 8/2005 | Andreasson et al. |
| 6,988,248 B1 | 1/2006 | Tang et al. |
| 7,158,030 B2 | 1/2007 | Chung |
| 7,178,729 B2 | 2/2007 | Shaffer et al. |
| 7,209,045 B2 | 4/2007 | De Gaulle et al. |
| 7,232,006 B2 | 6/2007 | Andreasson et al. |
| 7,232,066 B2 | 6/2007 | Andreasson et al. |
| 7,263,410 B1 | 8/2007 | Frederick et al. |
| 7,317,393 B2 | 1/2008 | Maloney |
| 7,348,884 B2 | 3/2008 | Higham |
| 7,544,329 B2 | 6/2009 | Malin |
| 7,570,786 B2 | 8/2009 | Ateya |
| 7,617,690 B2 | 11/2009 | Dawes |
| 7,630,791 B2 | 12/2009 | Nguyen et al. |
| 7,638,100 B2 | 12/2009 | Dawes |
| 7,661,591 B2 | 2/2010 | Dearing et al. |
| 7,668,620 B2 | 2/2010 | Shoenfeld |
| 7,719,420 B2 | 5/2010 | Christie et al. |
| 7,765,829 B2 | 8/2010 | Zenobi |
| 7,775,056 B2 | 8/2010 | Lowenstein |
| 7,806,488 B2 | 10/2010 | Hannan et al. |
| 7,942,321 B2 | 5/2011 | Linton et al. |
| 7,992,746 B2 | 8/2011 | Weber |
| 8,006,903 B2 | 8/2011 | Braun et al. |
| 8,025,149 B2 | 9/2011 | Sterry et al. |
| 8,036,773 B2 | 10/2011 | Braun et al. |
| 8,063,735 B2 | 11/2011 | Shoenfeld |
| 8,065,035 B2 | 11/2011 | Ross et al. |
| 8,068,023 B2 | 11/2011 | Dulin et al. |
| 8,068,934 B2 | 11/2011 | Saltsov |
| 8,103,379 B2 * | 1/2012 | Biba ................... A47B 88/467 312/319.1 |
| 8,113,007 B2 | 2/2012 | Zenobi et al. |
| 8,285,607 B2 | 10/2012 | Danilewitz |
| 8,376,228 B2 | 2/2013 | DeVet et al. |
| 8,405,508 B2 | 3/2013 | Burke |
| 8,473,097 B2 | 6/2013 | Shoenfeld |
| 8,517,215 B2 | 8/2013 | Shafir |
| 8,554,364 B2 | 10/2013 | Holmes et al. |
| 8,704,642 B2 | 4/2014 | Chen |
| 8,731,958 B2 | 5/2014 | Barrett et al. |
| 8,744,620 B2 | 6/2014 | Shavelsky et al. |
| 8,914,148 B2 | 12/2014 | Wagner |
| 8,972,051 B2 | 3/2015 | Rahilly et al. |
| 8,983,653 B2 | 3/2015 | Barret et al. |
| 9,081,887 B2 | 7/2015 | Olson et al. |
| 9,131,774 B2 | 9/2015 | Weber |
| 9,155,682 B2 | 10/2015 | Boyd |

(56) References Cited

U.S. PATENT DOCUMENTS

| | | |
|---|---|---|
| 9,157,261 B2 | 10/2015 | Rahilly |
| 9,224,124 B2 | 12/2015 | Rahim et al. |
| 9,295,331 B2 * | 3/2016 | Slogoff ................ E05B 47/023 |
| 9,345,644 B2 | 5/2016 | Michael |
| 9,460,413 B2 | 10/2016 | Elwood et al. |
| 9,463,412 B2 | 10/2016 | Akdogan et al. |
| 9,579,245 B2 * | 2/2017 | Larkner ............ E05B 47/0012 |
| 9,652,594 B2 | 5/2017 | Olson et al. |
| 9,910,965 B2 | 3/2018 | Bufalini et al. |
| 9,968,190 B2 | 5/2018 | Olson |
| 10,045,617 B2 | 8/2018 | Lehndorf et al. |
| 10,362,866 B2 | 7/2019 | Duval et al. |
| 10,663,218 B2 | 5/2020 | Belligundu |
| 10,751,239 B2 | 8/2020 | Volek et al. |
| 10,821,044 B2 | 11/2020 | Larkner et al. |
| 11,226,640 B2 | 1/2022 | Irwin et al. |
| 11,805,898 B2 | 11/2023 | Larkner et al. |
| 11,883,335 B2 * | 1/2024 | Larkner ............ E05B 47/0012 |
| 2003/0067388 A1 | 4/2003 | Elwood et al. |
| 2003/0105555 A1 | 6/2003 | Lunak et al. |
| 2004/0044326 A1 | 3/2004 | Kranz et al. |
| 2004/0080245 A1 | 4/2004 | Lammens et al. |
| 2004/0111323 A1 | 6/2004 | Niederland et al. |
| 2004/0113786 A1 | 6/2004 | Maloney |
| 2004/0115101 A1 | 6/2004 | Malin |
| 2004/0148055 A1 | 7/2004 | Shoenfeld |
| 2004/0186620 A1 | 9/2004 | Chimomas |
| 2004/0232230 A1 | 11/2004 | Linton et al. |
| 2005/0056033 A1 | 3/2005 | Gingras |
| 2005/0145644 A1 * | 7/2005 | Mori ...................... G07F 11/62 221/242 |
| 2005/0240305 A1 | 10/2005 | Bogash |
| 2006/0093514 A1 | 5/2006 | Dawes |
| 2007/0135965 A1 | 6/2007 | Nguyen et al. |
| 2007/0145130 A1 | 6/2007 | Danilewitz |
| 2007/0150382 A1 | 6/2007 | Danilewitz |
| 2007/0192315 A1 | 8/2007 | Drzaic et al. |
| 2007/0244598 A1 | 10/2007 | Shoenfeld |
| 2007/0265729 A1 | 11/2007 | Braun et al. |
| 2008/0042837 A1 | 2/2008 | Burke |
| 2008/0104993 A1 | 5/2008 | Zenobi et al. |
| 2008/0128444 A1 | 6/2008 | Schininger |
| 2008/0184719 A1 | 8/2008 | Lowenstein |
| 2008/0270178 A1 | 10/2008 | McRae et al. |
| 2008/0272138 A1 | 11/2008 | Ross et al. |
| 2008/0307821 A1 | 12/2008 | Zenobi |
| 2009/0089099 A1 | 4/2009 | Kranz et al. |
| 2009/0138122 A1 | 5/2009 | Wagner |
| 2009/0166415 A1 | 7/2009 | Braun et al. |
| 2009/0194587 A1 | 8/2009 | DeVet et al. |
| 2009/0210089 A1 | 8/2009 | Christie et al. |
| 2009/0212670 A1 | 8/2009 | Bustle et al. |
| 2009/0231132 A1 | 9/2009 | Shoenfeld |
| 2010/0114367 A1 * | 5/2010 | Barrett .................. G16H 20/10 705/2 |
| 2010/0265068 A1 | 10/2010 | Brackmann et al. |
| 2011/0202170 A1 | 8/2011 | Dawes et al. |
| 2012/0089248 A1 | 4/2012 | Biba et al. |
| 2012/0130534 A1 * | 5/2012 | Wurm ................ G07F 17/0092 700/236 |
| 2012/0187815 A1 | 7/2012 | Weber et al. |
| 2012/0259456 A1 | 10/2012 | Saltsov |
| 2013/0030566 A1 | 1/2013 | Shavelsky et al. |
| 2013/0175286 A1 | 7/2013 | Barrett et al. |
| 2013/0320032 A1 | 12/2013 | Rahilly |
| 2013/0325175 A1 | 12/2013 | Rahilly et al. |
| 2014/0222196 A1 | 8/2014 | Michael |
| 2014/0225491 A1 | 8/2014 | Shoenfeld |
| 2014/0246964 A1 | 9/2014 | Boyd |
| 2014/0277709 A1 | 9/2014 | Olson et al. |
| 2014/0316561 A1 | 10/2014 | Tkachenko |
| 2015/0196445 A1 | 7/2015 | Larkner et al. |
| 2015/0317456 A1 | 11/2015 | Olson et al. |
| 2016/0019367 A1 | 1/2016 | Olson et al. |
| 2016/0345728 A1 | 12/2016 | Lehndorf et al. |
| 2017/0092035 A1 | 3/2017 | Morgan et al. |
| 2017/0284732 A1 | 10/2017 | Cosgrove et al. |
| 2020/0268149 A1 | 8/2020 | Larkner et al. |

FOREIGN PATENT DOCUMENTS

| | | |
|---|---|---|
| EP | 3025249 B1 | 2/2022 |
| ES | 2909847 | 2/2022 |
| GB | 2401143 A | 11/2004 |
| WO | 2015013625 A2 | 1/2015 |

OTHER PUBLICATIONS

First Examination Report, European Application No. 14829422.6, completed Mar. 11, 2019, 8 pages.

Singapore Office Action, Singapore Application No. 11202003465Q, dated Jul. 14, 2021, 10 pages.

* cited by examiner

MEDICAL PRODUCTS STORAGE DEVICE INCLUDING ACCESS CONTROL

CROSS-REFERENCE

This application is a continuation of U.S. application Ser. No. 17/992,230, filed Nov. 22, 2022, which is a continuation of U.S. application Ser. No. 17/087,849, filed Nov. 3, 2020, which is a continuation of U.S. application Ser. No. 15/442,193, filed Feb. 24, 2017, which is a continuation of U.S. application Ser. No. 14/341,235, filed Jul. 25, 2014, which claims priority under 35 U.S.C. § 119 of U.S. provisional applications 61/858,880 filed on Jul. 26, 2013, and 61/910,953 filed Dec. 2, 2013, each of which is incorporated by reference herein.

BACKGROUND

The present disclosure is related to access control in medical products storage devices. More specifically, the present disclosure is related to medical storage systems with integrated inventory tracking and access control functions.

Medical supplies such as pharmaceuticals and blood products are high value commodities requiring stringent quality and inventory control measures. Medical products including medications, tissues, and blood products such as whole blood, plasma, or platelets, for example, are in limited supply and have a limited shelf life and stringent quality control requirements to maintain the quality of the products. In some cases, it is important to maintain the environment in which these products are stored within specific parameters. For example, temperature, humidity, and/or exposure to ultraviolet light may all be monitored and/or controlled.

Another aspect of the quality control requirement is that access to the medical products be limited to only those individuals who are authorized to handle the medical products. Stored items may be pre-matched to a specific individual or storage location. Authorization for access may be controlled to limit those individuals who have access to a particular storage location based on the authorization level of the individual. Access control also assists in preventing materials from being removed unexpectedly and may form part of an inventory control and management system.

This can be contrasted to the need for ready access to medical products in the event of power loss or an equipment failure may be necessary to prevent medical products from being inaccessible in emergencies. Power loss generally results in the loss of temperature control. In the case of specific stored products, such as blood products, for example, the product must be quickly relocated before the storage conditions fall outside of acceptable levels. In situations where large numbers of medical products are stored in a single climate control device, quick identification of the particular location of the medical product inventory that is needed assists with productivity and limits the time spent by a user locating appropriate inventory.

SUMMARY

The present application discloses one or more of the features recited in the appended claims and/or the following features which, alone or in any combination, may comprise patentable subject matter:

According to a first aspect of the present disclosure, a storage device for medical products comprises a control system, a cabinet, a plurality of storage containers, and an actuation assembly. The cabinet encloses a plurality of storage spaces. Each storage container is associated with one of the storage spaces. The actuation assembly includes an array of actuators. Each of the actuators of the array is associated with a respective storage container. Each of the actuators is independently actuable to secure or release the respective storage container with which the respective actuator is associated.

In some embodiments, each storage space includes an arm movable between a first position in which the arm secures a respective storage container and a second position in which the arm releases the respective storage container. In some embodiments, the arm includes a hook that engages the respective storage container when the arm secures the storage container and disengages the respective storage container when the arm releases the respective storage container.

In some embodiments, a respective actuator of the actuation assembly is operable to move a respective arm between the first and second positions. In some embodiments, the arm is formed to include a push rod which acts on the respective storage container as the arm is moved to the second position to cause the storage container to be moved in the storage space such that a portion of the storage container extends outwardly from the storage space.

In some embodiments, the storage device further includes a detector to detect the position of the arm.

In some embodiments, each actuator, when present, may have an associated sensor for detecting the position of an arm adjacent the respective actuator. In some embodiments, the sensor is a proximity sensor. In some embodiments, the sensor is an optical sensor. In some embodiments, the sensor is positioned on the actuation assembly and movable therewith. In some embodiments, the arm is pivotable about a pivot axis between the first and second positions. In some embodiments, each actuator comprises a solenoid actuated plunger that engages a respective arm when the solenoid is energized to thereby move the arm between the first and second positions.

In some embodiments, the control system compares the state of the solenoid to the signal from the detector to determine if the arm is properly positioned. In some embodiments, the control system identifies an error if the state of the solenoid and the signal from the detector do not properly correspond.

In some embodiments, each of the arms engages a release mechanism operable to simultaneously move the plurality of arms to the second position. In some embodiments, the release mechanism is manually operable. In some embodiments, the release mechanism includes a security device to prevent the release mechanism from being actuated. In some embodiments, the security device is a lock that is only moveable by operation of a key.

In some embodiments, the release device further includes a mechanical structure that moves to an indicator position when the release device has been actuated. In some embodiments, the mechanical structure does not return from the indicator position when the release device is returned to permit the arms to return to their respective first positions.

In some embodiments, the storage device includes a re-set actuator that is operable, under the control of the control system, to move the mechanical structure from the indicator position after the release device has been moved to allow the arms to return to their respective first positions. In some embodiments, the release device automatically locks when returned to a home position.

In some embodiments, the control system of the storage device further comprises a climate controller operable to monitor and control the climate in the cabinet.

In some embodiments, the storage device further comprises a positioning assembly in communication with the control system, wherein the positioning assembly moves the actuation assembly under the control of the control system, such that each actuator is adjacent a respective first one of the storage containers in a first position and a respective second one of the storage containers in a second position. In some embodiments, the storage device includes at least one detector for detecting the position of the actuation assembly, the detector for detecting the position of the actuation assembly being supported on the actuation assembly. In some embodiments, the detector for detecting the position of the actuation assembly determines the position of the actuation assembly by detecting a characteristic of a fixed component adjacent the actuation assembly. In some embodiments, the detector comprises a plurality of sensors, each sensor providing a signal responsive to a characteristic of a respective fixed component adjacent the actuation assembly, the control system determining the position of the actuation assembly by comparing the signals from the plurality of sensors to a known arrangement of fixed components to identify the particular position of the actuation assembly.

In some embodiments, the storage device further comprises an indicator assembly operable to provide an indication to a user of a storage location where the storage container has been released. In some embodiments, the indicator assembly includes a light emitting component that is operable to provide the indication. In some embodiments, the light emitting component illuminates at least a portion of the storage container that has been released. In some embodiments, the storage container comprises a light conducting material. In some embodiments, the light emitting component is positioned adjacent the storage container that has been released. In some embodiments, the control system causes the light emitting component to illuminate intermittently.

In some embodiments, each storage space is defined by a an enclosure that includes a floor and a ceiling, the storage device including stop that extends from the floor and engages a bottom hook formed on a bottom of a storage container when the storage container is engaged with the floor and slid along the floor from a storage position to removed position. In some embodiments, the stop extending from the floor of the storage space extends vertically upwardly from the floor into the storage space. In some embodiments, the stop is integrally formed in the floor. In some embodiments, the stop extending from the floor of the storage space is removable.

In some embodiments, the storage container includes a front portion, a back portion, opposing lateral sides, and a bottom, the storage container positionable in a storage space such that the back portion is positioned adjacent the arm. In some embodiments, the hook formed in the bottom of the storage container is positioned closer to the back portion than the front portion.

In some embodiments, the bottom of the storage container is formed such that a portion of the storage container near the front portion and a portion of the storage container near the back portion engage the floor of the storage space while a portion of the storage container positioned between the front portion and the back portion is spaced apart from the floor of the storage space. In some embodiments, a first height of the storage container near the front portion is greater than a second height of the storage container near the rear portion. In some embodiments, the height of the storage container varies such that a third height of the storage container at a position between the front portion and the back portion is smaller than the second height and the first height.

In some embodiments, the storage container is removable from the storage space. In some embodiments, the storage container is removable only by moving the storage container such that a portion of the storage container is outside of the storage space then manipulating the storage container to cause the hook of the storage container to clear the stop extending from the floor of the storage space and then fully removing the storage container from the storage space.

In some embodiments, the storage container includes a handle formed the front portion, the handle accessible to a user when the storage container is positioned in a storage space.

In some embodiments, the storage container comprises a material that provides light emission. In some embodiments, the storage container comprises texturing in the front portion to cause diffusion of light.

In some embodiments, the storage container further comprises a lid. In some embodiments, the storage container lid engages the storage space to prevent removal of the storage container from the storage space.

In some embodiments, the storage container comprises a magnet and each storage space includes a sensor operable to detect a magnetic field, the sensor positioned to detect the magnetic field of the magnet of the storage container when the storage container is in a storage position in the storage space. In some embodiments, the sensor, when detecting the presence of a magnetic field, provides a signal to the control system indicative of the presence of a storage container in the respective storage space.

In some embodiments, the storage device further comprises a plurality of light emitting components operable to shine a light into the storage space and a plurality of light detecting sensors positioned to detect light.

In some embodiments, each storage container defines a storage tray having four interior walls and an interior bottom surface for supporting a product to be stored and the interior bottom surface includes a reflective material.

In some embodiments, the light emitting components and light detecting sensors cooperate such that when the light emitting component is illuminated, a respective light detecting sensor monitors for reflected light. In some embodiments, when the light detecting sensor does not detect light when the respective light emitting component is illuminated, the light detecting sensor provides a signal to the control system indicating that the respective storage container contains a product or container. In some embodiments, when the light detecting sensor detects light when the respective light emitting component is illuminated, the light detecting sensor provides a signal to the control system indicating that the respective storage container does not contain a product.

In some embodiments, the storage device further comprises a plurality of proximity sensors, each proximity sensor positionable adjacent a storage space and operable to detect that a product is stored in the respective storage space.

In some embodiments, the actuation assembly includes a plurality of temperature sensors, each of the temperature sensors operable to detect the temperature of a first respective storage space. In some embodiments, each of the temperature sensors provides a signal indicative of the temperature in a first respective storage space to the control system, the control system operable to compare the temperatures of the first respective storage spaces to assess the operational status of the storage device. In some embodiments, the control system is operable to determine if a temperature gradient exists in the storage device.

In some embodiments, the control system is operable to move the actuation assembly to permit the temperature sensors to detect temperatures in second respective storage spaces.

In some embodiments, the storage device includes an oscillating platform supporting the plurality of storage spaces, the oscillating platform operable to selectively oscillate the storage spaces, and, thereby, oscillate a product stored in a respective storage space.

In some embodiments, the storage device includes at least one radio frequency identification sensor operable to detect radio frequency identification signals emitted from product stored in the storage device. In some embodiments, the storage device includes a plurality of radio frequency identification sensors, each of the radio frequency identification sensors associated with a specific storage space. In some embodiments, the radio frequency identification sensors are each operable to provide a signal to the control system indicative of the radio frequency identification signals detected by the particular radio identification sensor such that the control system associates a specific product identification with a specific storage space.

According to a second aspect of the present disclosure, a storage device for medical products comprises a control system, a cabinet, a plurality of storage containers, an actuation assembly, and a positioning assembly. The cabinet encloses a plurality of storage spaces. The plurality of storage containers are each associated with one of the storage spaces. The actuation assembly includes an array of actuators. Each of the actuators of the array is associated with a respective storage container. Each of the actuators is independently actuable to secure or release the respective storage container with which the respective actuator is associated. The positioning assembly is in communication with the control system. The positioning assembly moves the actuation assembly under the control of the control system, such that each actuator is adjacent a respective first one of the storage containers in a first position and a respective second one of the storage containers in a second position.

In some embodiments, the control system of the storage device further comprises a climate controller operable to monitor and control the climate in the cabinet.

In some embodiments, each storage space includes an arm movable between a first position in which the arm secures a respective storage container and a second position in which the arm releases the respective storage container. In some embodiments, the arm includes a hook that engages the respective storage container when the arm secures the storage container and disengages the respective storage container when the arm releases the respective storage container.

In some embodiments, a respective actuator of the actuation assembly is operable to move a respective arm between the first and second positions. In some embodiments, the storage device further includes a detector to detect the position of the arm.

In some embodiments, each actuator has an associated sensor for detecting the position of an arm adjacent the respective actuator. In some embodiments, the sensor is a proximity sensor. In some embodiments, the sensor is an optical sensor. In some embodiments, the sensor is positioned on the actuation assembly and movable therewith. In some embodiments, the arm is pivotable about a pivot axis between the first and second positions.

In some embodiments, the storage device includes at least one detector for detecting the position of the actuation assembly. In some embodiments, the detector for detecting the position of the actuation assembly is supported on the actuation assembly. In some embodiments, the detector for detecting the position of the actuation assembly determines the position of the actuation assembly by detecting a characteristic of a fixed component adjacent the actuation assembly. In some embodiments, the detector comprises a plurality of sensors, each sensor providing a signal responsive to a characteristic of a respective fixed component adjacent the actuation assembly, the control system determining the position of the actuation assembly by comparing the signals from the plurality of sensors to a known arrangement of fixed components to identify the particular position of the actuation assembly.

In some embodiments, each actuator comprises a solenoid actuated plunger that engages a respective arm when the solenoid is energized to thereby move the arm between the first and second positions. In some embodiments, the control system compares the state of the solenoid to the signal from the detector to determine if the arm is properly positioned.

In some embodiments, the arm is formed to include a push rod which acts on the respective storage container as the arm is moved to the second position to cause the storage container to be moved in the storage space such that a portion of the storage container extends outwardly from the storage space.

In some embodiments, each of the arms engages a release mechanism operable to simultaneously move the plurality of arms to the second position.

In some embodiments, the release mechanism is manually operable. In some embodiments, the release mechanism includes a security device to prevent the release mechanism from being actuated. In some embodiments, the security device is a lock that is only moveable by operation of a key. In some embodiments, the release device further includes a mechanical structure that moves to an indicator position when the release device has been actuated. In some embodiments, the mechanical structure does not return from the indicator position when the release device is returned to permit the arms to return to their respective first positions. In some embodiments, the storage device includes a reset actuator that is operable, under the control of the control system, to move the mechanical structure from the indicator position after the release device has been moved to allow the arms to return to their respective first positions. In some embodiments, the release device automatically locks when returned to a home position.

In some embodiments, the storage device further comprises an indicator assembly operable to provide an indication to a user of a storage location where the storage container has been released. In some embodiments, the indicator assembly includes a light emitting component that is operable to provide the indication. In some embodiments, the light emitting component illuminates at least a portion of the storage container that has been released.

In some embodiments, the storage container comprises a light conducting material. In some embodiments, the light emitting component is positioned adjacent the storage container that has been released. In some embodiments, the controller causes the light emitting component to illuminate intermittently.

In some embodiments, each storage space is defined by a an enclosure that includes a floor and a ceiling, the storage device including stop that extends from the floor and engages a bottom hook formed on a bottom of a storage container when the storage container is engaged with the floor and slid along the floor from a storage position to removed position. In some embodiments, the stop extending from the floor of the storage space extends vertically upwardly from the floor into the storage space. In some embodiments, the stop is integrally formed in the floor. In some embodiments, the stop extending from the floor of the storage space is removable.

In some embodiments, a storage container includes a front portion, a back portion, opposing lateral sides, and a bottom, the storage container positionable in a storage space such that the back portion is positioned adjacent the arm. In some embodiments, the hook formed in the bottom of the storage container is positioned closer to the back portion than the front portion.

In some embodiments, the bottom of the storage container is formed such that a portion of the storage container near the front portion and a portion of the storage container near the back portion engage the floor of the storage space while a portion of the storage container positioned between the front portion and the back portion is spaced apart from the floor of the storage space. In some embodiments, a first height of the storage container near the front portion is greater than a second height of the storage container near the rear portion. In some embodiments, the height of the storage container varies such that a third height of the storage container at a position between the front portion and the back portion is smaller than the second height and the first height.

In some embodiments, the storage container is removable from the storage space. In some embodiments, the storage container is removable only by moving the storage container such that a portion of the storage container is outside of the storage space then manipulating the storage container to cause the hook of the storage container to clear the stop extending from the floor of the storage space and then fully removing the storage container from the storage space.

In some embodiments, the storage container includes a handle formed the front portion, the handle accessible to a user when the storage container is positioned in a storage space. In some embodiments, the storage container comprises a material that provides light emission. In some embodiments, the storage container comprises texturing in the front portion to cause diffusion of light.

In some embodiments, the storage container further comprises a lid. In some embodiments, the storage container lid engages the storage space to prevent removal of the storage container from the storage space.

In some embodiments, the storage container comprises a magnet and each storage space includes a sensor operable to detect a magnetic field, the sensor positioned to detect the magnetic field of the magnet of the storage container when the storage container is in a storage position in the storage space. In some embodiments, the sensor, when detecting the presence of a magnetic field, provides a signal to the control system indicative of the presence of a storage container in the respective storage space.

In some embodiments, the storage device further comprises a plurality of light emitting components operable to shine a light into the storage space and a plurality of light detecting sensors positioned to detect light.

In some embodiments, each storage container defines a storage tray having four interior walls and an interior bottom surface for supporting a product to be stored, and wherein the interior bottom surface includes a reflective material.

In some embodiments, the light emitting components and light detecting sensors cooperate such that when the light emitting component is illuminated, a respective light detecting sensor monitors for reflected light. In some embodiments, when the light detecting sensor does not detect light when the respective light emitting component is illuminated, the light detecting sensor provides a signal to the control system indicating that the respective storage container contains a product. In some embodiments, the light detecting sensor detects light when the respective light emitting component is illuminated, the light detecting sensor provides a signal to the control system indicating that the respective storage container does not contain a product.

In some embodiments, the storage device further comprises a plurality of proximity sensors, each proximity sensor positionable adjacent a storage space and operable to detect that a product is stored in the respective storage space.

In some embodiments, the actuation assembly includes a plurality of temperature sensors, each of the temperature sensors operable to detect the temperature of a first respective storage space. In some embodiments, each of the temperature sensors provides a signal indicative of the temperature in a first respective storage space to the control system, the control system operable to compare the temperatures of the first respective storage spaces to assess the operational status of the storage device. In some embodiments, the control system is operable to determine if a temperature gradient exists in the storage device. In some embodiments, the control system is operable to move the actuation assembly to permit the temperature sensors to detect temperatures in second respective storage spaces.

In some embodiments, the storage device includes an oscillating platform supporting the plurality of storage spaces, the oscillating platform operable to selectively oscillate the storage spaces, and, thereby, oscillate products stored in a respective storage space.

In some embodiments, the storage device includes at least one radio frequency identification sensor operable to detect radio frequency identification signals emitted from product stored in the storage device. In some embodiments, the storage device includes a plurality of radio frequency identification sensors, each of the radio frequency identification sensors associated with a specific storage space. In some embodiments, the radio frequency identification sensors are each operable to provide a signal to the control system indicative of the radio frequency identification signals detected by the particular radio identification sensor such that the control system associates a specific product identification with a specific storage space.

According to a third aspect of the present disclosure, a storage device for medical products comprises a control system, a cabinet, a plurality of storage containers, and an oscillating platform. The cabinet encloses a plurality of storage spaces. Each storage container is associated with one of the storage spaces. The oscillating platform supports the plurality of storage spaces, the oscillating platform operable to selectively oscillate the storage spaces, and, thereby, oscillate product stored in a respective storage space.

In some embodiments, the control system of the storage device further comprises a climate controller operable to monitor and control the climate in the cabinet.

In some embodiments, each storage space includes an arm movable between a first position in which the arm secures a respective storage container and a second position in which the arm releases the respective storage container. In some embodiments, the arm includes a hook that engages the respective storage container when the arm secures the storage container and disengages the respective storage container when the arm releases the respective storage container. In some embodiments, a respective actuator of the actuation assembly is operable to move a respective arm between the first and second positions.

In some embodiments, the storage device further includes a detector to detect the position of the arm. In some embodiments, each actuator has an associated sensor for detecting the position of an arm adjacent the respective actuator. In some embodiments, the sensor is a proximity sensor. In some embodiments, the sensor is an optical sensor. In some embodiments, the sensor is positioned on the actuation assembly and movable therewith. In some embodiments, the arm is pivotable about a pivot axis between the first and second positions.

In some embodiments, the storage device further comprises a positioning assembly in communication with the control system, wherein the positioning assembly moves the actuation assembly under the control of the control system, such that each actuator is adjacent a respective first one of the storage containers in a first position and a respective second one of the storage containers in a second position.

In some embodiments, the storage device includes at least one detector for detecting the position of the actuation assembly, the detector for detecting the position of the actuation assembly being supported on the actuation assembly. In some embodiments, the detector for detecting the position of the actuation assembly determines the position of the actuation assembly by detecting a characteristic of a fixed component adjacent the actuation assembly. In some embodiments, the detector comprises a plurality of sensors, each sensor providing a signal responsive to a characteristic of a respective fixed component adjacent the actuation assembly, the control system determining the position of the actuation assembly by comparing the signals from the plurality of sensors to a known arrangement of fixed components to identify the particular position of the actuation assembly.

In some embodiments, each actuator comprises a solenoid actuated plunger that engages a respective arm when the solenoid is energized to thereby move the arm between the first and second positions.

In some embodiments, the control system compares the state of the solenoid to the signal from the detector to determine if the arm is properly positioned.

In some embodiments, the arm is formed to include a push rod which acts on the respective storage container as the arm is moved to the second position to cause the storage container to be moved in the storage space such that a portion of the storage container extends outwardly from the storage space.

In some embodiments, each of the arms engages a release mechanism operable to simultaneously move the plurality of arms to the second position. In some embodiments, the release mechanism is manually operable. In some embodiments, the release mechanism includes a security device to prevent the release mechanism from being actuated. In some embodiments, the security device is a lock that is only moveable by operation of a key. In some embodiments, the release device further includes a mechanical structure that moves to an indicator position when the release device has been actuated. In some embodiments, the mechanical structure does not return from the indicator position when the release device is returned to permit the arms to return to their respective first positions. In some embodiments, the storage device includes a re-set actuator that is operable, under the control of the control system, to move the mechanical structure from the indicator position after the release device has been moved to allow the arms to return to their respective first positions. In some embodiments, the release device automatically locks when returned to a home position.

In some embodiments, the storage device further comprises an indicator assembly operable to provide an indication to a user of a storage location where the storage container has been released. In some embodiments, the indicator assembly includes a light emitting component that is operable to provide the indication. In some embodiments, the light emitting component illuminates at least a portion of the storage container that has been released.

In some embodiments, the storage container comprises a light conducting material. In some embodiments, the light emitting component is positioned adjacent the storage container that has been released. In some embodiments, the controller causes the light emitting component to illuminate intermittently.

In some embodiments, each storage space is defined by an enclosure that includes a floor and a ceiling, the storage device including stop that extends from the floor and engages a bottom hook formed on a bottom of a storage container when the storage container is engaged with the floor and slid along the floor from a storage position to removed position. In some embodiments, the stop extending from the floor of the storage space extends vertically upwardly from the floor into the storage space. In some embodiments, the stop is integrally formed in the floor. In some embodiments, the stop extending from the floor of the storage space is removable.

In some embodiments, the storage container includes a front portion, a back portion, opposing lateral sides, and a bottom, the storage container positionable in a storage space such that the back portion is positioned adjacent the arm. In some embodiments, the hook formed in the bottom of the storage container is positioned closer to the back portion than the front portion. In some embodiments, the bottom of the storage container is formed such that a portion of the storage container near the front portion and a portion of the storage container near the back portion engage the floor of the storage space while a portion of the storage container positioned between the front portion and the back portion is spaced apart from the floor of the storage space. In some embodiments, a first height of the storage container near the front portion is greater than a second height of the storage container near the rear portion. In some embodiments, the height of the storage container varies such that a third height of the storage container at a position between the front portion and the back portion is smaller than the second height and the first height.

In some embodiments, the storage container is removable from the storage space.

In some embodiments, the storage container is removable only by moving the storage container such that a portion of the storage container is outside of the storage space then manipulating the storage container to cause the hook of the storage container to clear the stop extending from the floor of the storage space and then fully removing the storage container from the storage space.

In some embodiments, the storage container includes a handle formed the front portion, the handle accessible to a user when the storage container is positioned in a storage space. In some embodiments, the storage container comprises a material that provides light emission. In some embodiments, the storage container comprises texturing in the front portion to cause diffusion of light.

In some embodiments, the storage container further comprises a lid. In some embodiments, the storage container lid engages the storage space to prevent removal of the storage container from the storage space.

In some embodiments, the storage container comprises a magnet and each storage space includes a sensor operable to detect a magnetic field, the sensor positioned to detect the magnetic field of the magnet of the storage container when the storage container is in a storage position in the storage space. In some embodiments, the sensor, when detecting the presence of a magnetic field, provides a signal to the control system indicative of the presence of a storage container in the respective storage space.

In some embodiments, the storage device further comprises a plurality of light emitting components operable to shine a light into the storage space and a plurality of light detecting sensors positioned to detect light.

In some embodiments, each storage container defines a storage tray having four interior walls and an interior bottom surface for supporting a product to be stored, and wherein the interior bottom surface includes a reflective material.

In some embodiments, the light emitting components and light detecting sensors cooperate such that when the light emitting component is illuminated, a respective light detecting sensor monitors for reflected light. In some embodiments, when the light detecting sensor does not detect light when the respective light emitting component is illuminated, and the light detecting sensor provides a signal to the control system indicating that the respective storage container contains a product. In some embodiments, the light detecting sensor detects light when the respective light emitting component is illuminated, and the light detecting sensor provides a signal to the control system indicating that the respective storage container does not contain a product.

In some embodiments, the storage device further comprises a plurality of proximity sensors, each proximity sensor positionable adjacent a storage space and operable to detect that a product is stored in the respective storage space.

In some embodiments, the actuation assembly includes a plurality of temperature sensors, each of the temperature sensors operable to detect the temperature of a first respective storage space. In some of the embodiments, the temperature sensors provide a signal indicative of the temperature in a first respective storage space to the control system, the control system operable to compare the temperatures of the first respective storage spaces to assess the operational status of the storage device. In some embodiments, the control system is operable to determine if a temperature gradient exists in the storage device.

In some embodiments, the control system is operable to move the actuation assembly to permit the temperature sensors to detect temperatures in second respective storage spaces.

In some embodiments, the storage device includes at least one radio frequency identification sensor operable to detect radio frequency identification signals emitted from product stored in the storage device.

In some embodiments, the storage device includes a plurality of radio frequency identification sensors, each of the radio frequency identification sensors associated with a specific storage space.

In some embodiments, the radio frequency identification sensors are each operable to provide a signal to the control system indicative of the radio frequency identification signals detected by the particular radio identification sensor such that the control system associates a specific product identification with a specific storage space.

According to a fourth aspect of the present disclosure, a storage device for medical products comprises a control system, a cabinet, a plurality of storage containers, an actuation assembly, and at least one radio frequency identification sensor. The cabinet encloses a plurality of storage spaces. Each storage container is associated with one of the storage spaces. The actuation assembly includes an array of actuators. Each of the actuators of the array is associated with a respective storage container. Each of the actuators is independently actuable to secure or release the respective storage container with which the respective actuator is associated. The at least one radio frequency identification sensor is operable to detect radio frequency identification signals emitted from product stored in the storage device.

In some embodiments, the storage device includes a plurality of radio frequency identification sensors, each of the radio frequency identification sensors associated with a specific storage space. In some embodiments, the radio frequency identification sensors are each operable to provide a signal to the control system indicative of the radio frequency identification signals detected by the particular radio identification sensor such that the control system associates a specific product identification with a specific storage space.

In some embodiments, the control system of the storage device further comprises a climate controller operable to monitor and control the climate in the cabinet.

In some embodiments, each storage space includes an arm movable between a first position in which the arm secures a respective storage container and a second position in which the arm releases the respective storage container. In some embodiments, the arm includes a hook that engages the respective storage container when the arm secures the storage container and disengages the respective storage container when the arm releases the respective storage container.

In some embodiments, a respective actuator of the actuation assembly is operable to move a respective arm between the first and second positions.

In some embodiments, the storage device further includes a detector to detect the position of the arm.

In some embodiments, each actuator has an associated sensor for detecting the position of an arm adjacent the respective actuator. In some embodiments, the sensor is a proximity sensor. In some embodiments, the sensor is an optical sensor. In some embodiments, the sensor is positioned on the actuation assembly and movable therewith.

In some embodiments, the arm is pivotable about a pivot axis between the first and second positions.

In some embodiments, the storage device further comprises a positioning assembly in communication with the control system, wherein the positioning assembly moves the actuation assembly under the control of the control system, such that each actuator is adjacent a respective first one of the storage containers in a first position and a respective second one of the storage containers in a second position.

In some embodiments, the storage device includes at least one detector for detecting the position of the actuation assembly, the detector for detecting the position of the actuation assembly being supported on the actuation assembly. In some embodiments, the detector for detecting the position of the actuation assembly determines the position of the actuation assembly by detecting a characteristic of a fixed component adjacent the actuation assembly. In some embodiments, the detector comprises a plurality of sensors, each sensor providing a signal responsive to a characteristic of a respective fixed component adjacent the actuation assembly, the control system determining the position of the actuation assembly by comparing the signals from the plurality of sensors to a known arrangement of fixed components to identify the particular position of the actuation assembly.

In some embodiments, each actuator comprises a solenoid actuated plunger that engages a respective arm when the solenoid is energized to thereby move the arm between the first and second positions.

In some embodiments, the control system compares the state of the solenoid to the signal from the detector to determine if the arm is properly positioned.

In some embodiments, the arm is formed to include a push rod which acts on the respective storage container as the arm is moved to the second position to cause the storage container to be moved in the storage space such that a portion of the storage container extends outwardly from the storage space.

In some embodiments, each of the arms engages a release mechanism operable to simultaneously move the plurality of arms to the second position. In some embodiments, the release mechanism is manually operable. In some embodiments, the release mechanism includes a security device to prevent the release mechanism from being actuated. In some embodiments, the security device is a lock that is only moveable by operation of a key.

In some embodiments, the release device further includes a mechanical structure that moves to an indicator position when the release device has been actuated. In some embodiments, the mechanical structure does not return from the indicator position when the release device is returned to permit the arms to return to their respective first positions. In some embodiments, the storage device includes a re-set actuator that is operable, under the control of the control system, to move the mechanical structure from the indicator position after the release device has been moved to allow the arms to return to their respective first positions. In some embodiments, the release device automatically locks when returned to a home position.

In some embodiments, the storage device further comprises an indicator assembly operable to provide an indication to a user of a storage location where the storage container has been released. In some embodiments, the indicator assembly includes a light emitting component that is operable to provide the indication. In some embodiments, the light emitting component illuminates at least a portion of the storage container that has been released.

In some embodiments, the storage container comprises a light conducting material.

In some embodiments, the light emitting component is positioned adjacent the storage container that has been released. In some embodiments, the controller causes the light emitting component to illuminate intermittently.

In some embodiments, each storage space is defined by a an enclosure that includes a floor and a ceiling, the storage device including stop that extends from the floor and engages a bottom hook formed on a bottom of a storage container when the storage container is engaged with the floor and slid along the floor from a storage position to removed position. In some embodiments, the stop extending from the floor of the storage space extends vertically upwardly from the floor into the storage space. In some embodiments, the stop is integrally formed in the floor. In some embodiments, the stop extending from the floor of the storage space is removable.

In some embodiments, the storage container includes a front portion, a back portion, opposing lateral sides, and a bottom, the storage container positionable in a storage space such that the back portion is positioned adjacent the arm.

In some embodiments, the hook formed in the bottom of the storage container is positioned closer to the back portion than the front portion.

In some embodiments, the bottom of the storage container is formed such that a portion of the storage container near the front portion and a portion of the storage container near the back portion engage the floor of the storage space while a portion of the storage container positioned between the front portion and the back portion is spaced apart from the floor of the storage space.

In some embodiments, a first height of the storage container near the front portion is greater than a second height of the storage container near the rear portion. In some embodiments, the height of the storage container varies such that a third height of the storage container at a position between the front portion and the back portion is smaller than the second height and the first height.

In some embodiments, the storage container is removable from the storage space.

In some embodiments, the storage container is removable only by moving the storage container such that a portion of the storage container is outside of the storage space then manipulating the storage container to cause the hook of the storage container to clear the stop extending from the floor of the storage space and then fully removing the storage container from the storage space.

In some embodiments, the storage container includes a handle formed the front portion, the handle accessible to a user when the storage container is positioned in a storage space.

In some embodiments, the storage container comprises a material that provides light emission. In some embodiments, the storage container comprises texturing in the front portion to cause diffusion of light.

In some embodiments, the storage container further comprises a lid. In some embodiments, the storage container lid engages the storage space to prevent removal of the storage container from the storage space.

In some embodiments, the storage container comprises a magnet and each storage space includes a sensor operable to detect a magnetic field, the sensor positioned to detect the magnetic field of the magnet of the storage container when the storage container is in a storage position in the storage space. In some embodiments, the sensor, when detecting the presence of a magnetic field, provides a signal to the control system indicative of the presence of a storage container in the respective storage space.

In some embodiments, the storage device further comprises a plurality of light emitting components operable to shine a light into the storage space and a plurality of light detecting sensors positioned to detect light.

In some embodiments, each storage container defines a storage tray having four interior walls and an interior bottom surface for supporting a product to be stored, and wherein the interior bottom surface includes a reflective material.

In some embodiments, the light emitting components and light detecting sensors cooperate such that when the light emitting component is illuminated, a respective light detecting sensor monitors for reflected light. In some embodiments, when the light detecting sensor does not detect light when the respective light emitting component is illuminated, and the light detecting sensor provides a signal to the control system indicating that the respective storage container contains a product. In some embodiments, when the light detecting sensor detects light when the respective light emitting component is illuminated, and the light detecting sensor provides a signal to the control system indicating that the respective storage container does not contain a product.

In some embodiments, the storage device further comprises a plurality of proximity sensors, each proximity sensor positionable adjacent a storage space and operable to detect that a product is stored in the respective storage space.

In some embodiments, the actuation assembly includes a plurality of temperature sensors, each of the temperature sensors operable to detect the temperature of a first respective storage space. In some embodiments, each of the temperature sensors provides a signal indicative of the temperature in a first respective storage space to the control system, the control system operable to compare the temperatures of the first respective storage spaces to assess the operational status of the storage device. In some embodiments, the control system is operable to determine if a temperature gradient exists in the storage device. In some embodiments, the control system is operable to move the actuation assembly to permit the temperature sensors to detect temperatures in second respective storage spaces.

In some embodiments, the storage device includes an oscillating platform supporting the plurality of storage spaces, the oscillating platform operable to selectively oscillate the storage spaces, and, thereby, oscillate products stored in a respective storage space.

According to a fifth aspect of the present disclosure, a storage tray comprises a base, a front wall extending upwardly from the base, a back wall extending upwardly from the base, a first lateral side wall extending upwardly from the base and between the front wall and back wall, and a second lateral side wall extending upwardly from the base and between the front wall and back wall. The base, front wall, back wall, first lateral side wall, and second lateral side wall defining a storage container enclosure. The storage tray also comprises a plurality of legs extending downwardly from the base, the legs operable to support the storage tray on a support surface. The storage tray also comprises a receiver positioned adjacent the back wall and outboard of the storage container enclosure. The storage tray also comprises a handle positioned adjacent the front wall and outboard of the storage container enclosure. The storage tray also comprises a hook extending downwardly from the base. The storage tray also comprises a tab extending upwardly from each of the first and second lateral side walls, each tab extending along a portion of the length of each respective lateral side wall. The storage tray also comprises two grooves formed on opposite lateral sides of the base, the grooves configured to receive the tabs of a first storage tray when a second storage tray is stacked on the first storage tray.

In some embodiments, the hook formed in the bottom of the storage tray is positioned closer to the back portion than the front portion.

In some embodiments, the bottom of the storage tray is formed such that a portion of the storage tray near the front wall and a portion of the storage tray near the back wall engage the floor of the storage space while a portion of the storage tray positioned between the front wall and the back wall is spaced apart from the floor of the storage space.

In some embodiments, a first height of the storage tray near the front wall is greater than a second height of the storage tray near the rear portion.

In some embodiments, the height of the storage container varies such that a third height of the storage container at a position between the front wall and the back wall is smaller than the second height and the first height.

In some embodiments, the storage tray comprises a material that provides light emission.

In some embodiments, the storage tray comprises texturing in the handle to cause diffusion of light.

In some embodiments, the storage tray further comprises a lid.

In some embodiments, the storage tray comprises a magnet positioned in the base.

According to a sixth aspect of the present disclosure, a storage device for medical products comprises a control system, a cabinet enclosing a plurality of storage spaces, and an optical unit in communication with the control system. The optical unit has a field of view. The optical unit is supported by the cabinet and capable of targeting, detecting, reading indicia that passes through field of view. The optical unit transfers data regarding the indicia read by the optical detector to the control system.

In some embodiments, the control system utilizes the data regarding the indicia read by the optical detector to adjust records regarding the inventory located in the storage device.

In some embodiments, the control system utilizes the data regarding the indicia read by the optical detector to control access to one or more of the storage spaces.

In some embodiments, the storage device further comprises a plurality of storage containers, each storage container associated with one of the storage spaces.

In some embodiments, the storage device further comprises an actuation assembly including an array of actuators, each of the actuators of the array being associated with a respective storage container, each of the actuators being independently actuable to secure or release the respective storage container with which the respective actuator is associated.

In some embodiments, each storage space includes an arm movable between a first position in which the arm secures a respective storage container and a second position in which the arm releases the respective storage container.

In some embodiments, the arm includes a hook that engages the respective storage container when the arm secures the storage container and disengages the respective storage container when the arm releases the respective storage container.

In some embodiments, a respective actuator of the actuation assembly is operable to move a respective arm between the first and second positions.

In some embodiments, the storage device further includes a detector to detect the position of the arm.

In some embodiments, each actuator has an associated sensor for detecting the position of an arm adjacent the respective actuator.

In some embodiments, the sensor is a proximity sensor.

In some embodiments, the sensor is an optical sensor.

In some embodiments, the sensor is positioned on the actuation assembly and movable therewith.

In some embodiments, the arm is pivotable about a pivot axis between the first and second positions.

In some embodiments, each actuator comprises a solenoid actuated plunger that engages a respective arm when the solenoid is energized to thereby move the arm between the first and second positions.

In some embodiments, the control system compares the state of the solenoid to the signal from the detector to determine if the arm is properly positioned.

In some embodiments, the arm is formed to include a push rod which acts on the respective storage container as the arm is moved to the second position to cause the storage container to be moved in the storage space such that a portion of the storage container extends outwardly from the storage space.

In some embodiments, each of the arms engages a release mechanism operable to simultaneously move the plurality of arms to the second position.

In some embodiments, the release mechanism is manually operable.

In some embodiments, the release mechanism includes a security device to prevent the release mechanism from being actuated.

In some embodiments, the security device is a lock that is only moveable by operation of a key.

In some embodiments, the release device further includes a mechanical structure that moves to an indicator position when the release device has been actuated.

In some embodiments, the mechanical structure does not return from the indicator position when the release device is returned to permit the arms to return to their respective first positions.

In some embodiments, the storage device includes a re-set actuator that is operable, under the control of the control system, to move the mechanical structure from the indicator position after the release device has been moved to allow the arms to return to their respective first positions.

In some embodiments, the release device automatically locks when returned to a home position.

In some embodiments, the storage device further comprises a climate control system operable to monitor and control the climate in the cabinet.

In some embodiments, the storage device further comprises a positioning assembly in communication with the control system, wherein the positioning assembly moves the actuation assembly under the control of the control system, such that each actuator is adjacent a respective first one of the storage containers in a first position and a respective second one of the storage containers in a second position.

In some embodiments, the storage device includes at least one detector for detecting the position of the actuation assembly, the detector for detecting the position of the actuation assembly being supported on the actuation assembly.

In some embodiments, the detector for detecting the position of the actuation assembly determines the position of the actuation assembly by detecting a characteristic of a fixed component adjacent the actuation assembly.

In some embodiments, the detector comprises a plurality of sensors, each sensor providing a signal responsive to a characteristic of a respective fixed component adjacent the actuation assembly, the control system determining the position of the actuation assembly by comparing the signals from the plurality of sensors to a known arrangement of fixed components to identify the particular position of the actuation assembly.

In some embodiments, the storage device further comprises an indicator assembly operable to provide an indication to a user of a storage location where the storage container has been released.

In some embodiments, the indicator assembly includes a light emitting component that is operable to provide the indication.

In some embodiments, the light emitting component illuminates at least a portion of the storage container that has been released.

In some embodiments, the storage container comprises a light conducting material.

In some embodiments, the light emitting component is positioned adjacent the storage container that has been released.

In some embodiments, the control system causes the light emitting component to illuminate intermittently.

In some embodiments, each storage space is defined by a an enclosure that includes a floor and a ceiling, the storage device including stop that extends from the floor and engages a bottom hook formed on a bottom of a storage container when the storage container is engaged with the floor and slid along the floor from a storage position to removed position.

In some embodiments, the stop extending from the floor of the storage space extends vertically upwardly from the floor into the storage space.

In some embodiments, the stop is integrally formed in the floor.

In some embodiments, the stop extending from the floor of the storage space is removable.

In some embodiments, the storage container includes a front portion, a back portion, opposing lateral sides, and a bottom, the storage container positionable in a storage space such that the back portion is positioned adjacent the arm.

In some embodiments, the hook formed in the bottom of the storage container is positioned closer to the back portion than the front portion.

In some embodiments, the bottom of the storage container is formed such that a portion of the storage container near the front portion and a portion of the storage container near the back portion engage the floor of the storage space while a portion of the storage container positioned between the front portion and the back portion is spaced apart from the floor of the storage space.

In some embodiments, a first height of the storage container near the front portion is greater than a second height of the storage container near the rear portion.

In some embodiments, the height of the storage container varies such that a third height of the storage container at a position between the front portion and the back portion is smaller than the second height and the first height.

In some embodiments, the storage container is removable from the storage space.

In some embodiments, the storage container is removable only by moving the storage container such that a portion of the storage container is outside of the storage space then manipulating the storage container to cause the hook of the storage container to clear the stop extending from the floor of the storage space and then fully removing the storage container from the storage space.

In some embodiments, the storage container includes a handle formed the front portion, the handle accessible to a user when the storage container is positioned in a storage space.

In some embodiments, the storage container comprises a material that provides light emission. In some embodiments, the storage container comprises texturing in the front portion to cause diffusion of light.

In some embodiments, the storage container further comprises a lid.

In some embodiments, the storage container lid engages the storage space to prevent removal of the storage container from the storage space.

In some embodiments, the storage container comprises a magnet and each storage space includes a sensor operable to detect a magnetic field, the sensor positioned to detect the magnet of the storage container when the storage container is in a storage position in the storage space.

In some embodiments, the sensor, when detecting the presence of a magnetic field, provides a signal to the control system indicative of the presence of a storage container in the respective storage space.

In some embodiments, the storage device further comprises a plurality of light emitting components operable to shine a light into the storage space and a plurality of light detecting sensors positioned to detect light.

In some embodiments, each storage container defines a storage tray having four interior walls and an interior bottom surface for supporting a product to be stored, and wherein the interior bottom surface includes a reflective material.

In some embodiments, the light emitting components and light detecting sensors cooperate such that when the light emitting component is illuminated, a respective light detecting sensor monitors for reflected light.

In some embodiments, the light detecting sensor does not detect light when the respective light emitting component is illuminated, and the light detecting sensor provides a signal to the control system indicating that the respective storage container contains a product.

In some embodiments, when the light detecting sensor detects light when the respective light emitting component is illuminated, and the light detecting sensor provides a signal to the control system indicating that the respective storage container does not contain a product.

In some embodiments, the storage device further comprises a plurality of proximity sensors, each proximity sensor positionable adjacent a storage space and operable to detect that a product is stored in the respective storage space.

In some embodiments, the actuation assembly includes a plurality of temperature sensors, each of the temperature sensors operable to detect the temperature of a first respective storage space.

In some embodiments, each of the temperature sensors provides a signal indicative of the temperature in a first respective storage space to the control system, the control system operable to compare the temperatures of the first respective storage spaces to assess the operational status of the storage device.

In some embodiments, the control system is operable to determine if a temperature gradient exists in the storage device.

In some embodiments, the control system is operable to move the actuation assembly to permit the temperature sensors to detect temperatures in second respective storage spaces.

In some embodiments, the storage device includes an oscillating platform supporting the plurality of storage spaces, the oscillating platform operable to selectively oscillate the storage spaces, and, thereby, oscillate products stored in a respective storage space.

In some embodiments, the storage device includes at least one radio frequency identification sensor operable to detect radio frequency identification signals emitted from product stored in the storage device.

In some embodiments, the storage device includes a plurality of radio frequency identification sensors, each of the radio frequency identification sensors associated with a specific storage space.

In some embodiments, the radio frequency identification sensors are each operable to provide a signal to the control system indicative of the radio frequency identification signals detected by the particular radio identification sensor such that the control system associates a specific product identification with a specific storage space.

In some embodiments, the storage device comprises multiple optical units.

In some embodiments, the optical units are positioned are supported such that their respective fields of view are in an opposing location.

In some embodiments, the optical units each comprise an independent controller.

In some embodiments, the controllers of the optical units change the position of the field of view.

In some embodiments, the focal length of one or more of the optical detectors is changed to target a particular location.

According to a seventh aspect of the present disclosure, a storage device for medical products comprises a control system, a cabinet enclosing a plurality of storage spaces, a plurality of storage containers, and a plurality of electromagnets. Each storage container is associated with one of the storage spaces. Each storage container comprises a ferrous member positioned on the storage container. The plurality of electromagnets are each positioned in a respective storage space and independently energizable to act on the ferrous member of a respective storage container to secure or release a respective storage container.

In some embodiments, the storage device further comprises an optical unit in communication with the control system and having a field of view, the optical unit supported by the cabinet and capable of targeting, detecting, reading indicia that passes through field of view, wherein the optical unit transfers data regarding the indicia read by the optical detector to the control system.

In some embodiments, the control system utilizes the data regarding the indicia read by the optical detector to adjust records regarding the inventory located in the storage device.

In some embodiments, the control system utilizes the data regarding the indicia read by the optical detector to control access to one or more of the storage spaces.

In some embodiments, the storage device further comprises a climate control system operable to monitor and control the climate in the cabinet.

In some embodiments, the storage device further comprises an indicator assembly operable to provide an indication to a user of a storage location where the storage container has been released.

In some embodiments, the indicator assembly includes a light emitting component that is operable to provide the indication.

In some embodiments, the light emitting component illuminates at least a portion of the storage container that has been released.

In some embodiments, the storage container comprises a light conducting material.

In some embodiments, the light emitting component is positioned adjacent the storage container that has been released.

In some embodiments, the control system causes the light emitting component to illuminate intermittently.

In some embodiments, each storage space is defined by a an enclosure that includes a floor and a ceiling, the storage device including stop that extends from the floor and engages a bottom hook formed on a bottom of a storage container when the storage container is engaged with the floor and slid along the floor from a storage position to removed position.

In some embodiments, the stop extending from the floor of the storage space extends vertically upwardly from the floor into the storage space.

In some embodiments, the stop is integrally formed in the floor.

In some embodiments, the stop extending from the floor of the storage space is removable.

In some embodiments, the storage container includes a front portion, a back portion, opposing lateral sides, and a bottom, the storage container positionable in a storage space such that the back portion is positioned adjacent the arm.

In some embodiments, the hook formed in the bottom of the storage container is positioned closer to the back portion than the front portion.

In some embodiments, the bottom of the storage container is formed such that a portion of the storage container near the front portion and a portion of the storage container near the back portion engage the floor of the storage space while a portion of the storage container positioned between the front portion and the back portion is spaced apart from the floor of the storage space.

In some embodiments, a first height of the storage container near the front portion is greater than a second height of the storage container near the rear portion.

In some embodiments, the height of the storage container varies such that a third height of the storage container at a position between the front portion and the back portion is smaller than the second height and the first height.

In some embodiments, the storage container is removable from the storage space.

In some embodiments, the storage container is removable only by moving the storage container such that a portion of the storage container is outside of the storage space than manipulating the storage container to cause the hook of the storage container to clear the stop extending from the floor of the storage space and then fully removing the storage container from the storage space.

In some embodiments, the storage container includes a handle formed the front portion, the handle accessible to a user when the storage container is positioned in a storage space.

In some embodiments, the storage container comprises a material that provides light emission.

In some embodiments, the storage container comprises texturing in the front portion to cause diffusion of light.

In some embodiments, the storage container further comprises a lid.

In some embodiments, the storage container lid engages the storage space to prevent removal of the storage container from the storage space.

In some embodiments, the storage container comprises a magnet and each storage space includes a sensor operable to detect a magnetic field, the sensor positioned to detect the magnet of the storage container when the storage container is in a storage position in the storage space.

In some embodiments, the sensor, when detecting the presence of a magnetic field, provides a signal to the control system indicative of the presence of a storage container in the respective storage space.

In some embodiments, the storage device further comprises a plurality of light emitting components operable to shine a light into the storage space and a plurality of light detecting sensors positioned to detect light.

In some embodiments, each storage container defines a storage tray having four interior walls and an interior bottom surface for supporting a product to be stored, and wherein the interior bottom surface includes a reflective material.

In some embodiments, the light emitting components and light detecting sensors cooperate such that when the light emitting component is illuminated, a respective light detecting sensor monitors for reflected light.

In some embodiments, when the light detecting sensor does not detect light when the respective light emitting component is illuminated, and the light detecting sensor provides a signal to the control system indicating that the respective storage container contains a product.

In some embodiments, when the light detecting sensor detects light when the respective light emitting component is illuminated, and the light detecting sensor provides a signal to the control system indicating that the respective storage container does not contain a product.

In some embodiments, the storage device further comprises a plurality of proximity sensors, each proximity sensor positionable adjacent a storage space and operable to detect that a product is stored in the respective storage space.

In some embodiments, the storage device includes a plurality of temperature sensors, each of the temperature sensors operable to detect the temperature of a first respective storage space.

In some embodiments, each of the temperature sensors provides a signal indicative of the temperature in a first respective storage space to the control system, the control system operable to compare the temperatures of the first respective storage spaces to assess the operational status of the storage device.

In some embodiments, the control system is operable to determine if a temperature gradient exists in the storage device.

In some embodiments, the control system is operable to move the temperature sensors to detect temperatures in second respective storage spaces.

In some embodiments, the storage device includes an oscillating platform supporting the plurality of storage spaces, the oscillating platform operable to selectively oscillate the storage spaces, and, thereby, oscillate products stored in a respective storage space.

In some embodiments, the storage device includes at least one radio frequency identification sensor operable to detect radio frequency identification signals emitted from product stored in the storage device.

In some embodiments, the storage device includes a plurality of radio frequency identification sensors, each of the radio frequency identification sensors associated with a specific storage space.

In some embodiments, the radio frequency identification sensors are each operable to provide a signal to the control system indicative of the radio frequency identification signals detected by the particular radio identification sensor such that the control system associates a specific product identification with a specific storage space.

In some embodiments, the storage device includes at least one radio frequency identification sensor operable to detect radio frequency identification signals emitted from product stored in the storage device.

In some embodiments, the storage device includes a plurality of radio frequency identification sensors, each of the radio frequency identification sensors associated with a specific storage space.

In some embodiments, the storage device comprises multiple optical units.

In some embodiments, the optical units are positioned are supported such that their respective fields of view are in an opposing location.

In some embodiments, the optical units each comprise an independent controller.

In some embodiments, the controllers of the optical units change the position of the field of view.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
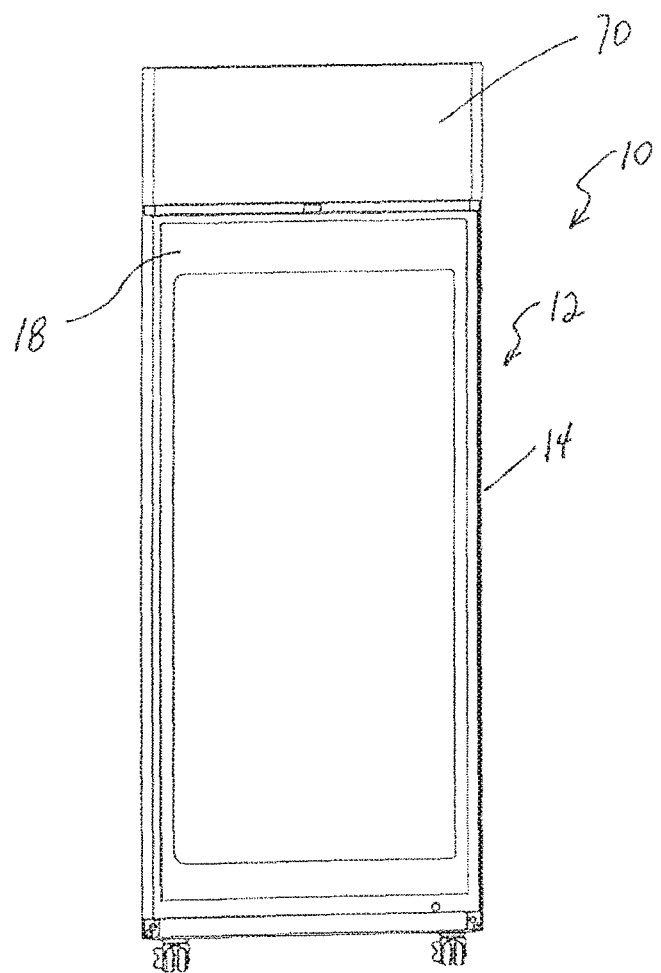
FIG. 1 is a front plan view of a medical products storage device.
Figure 2:
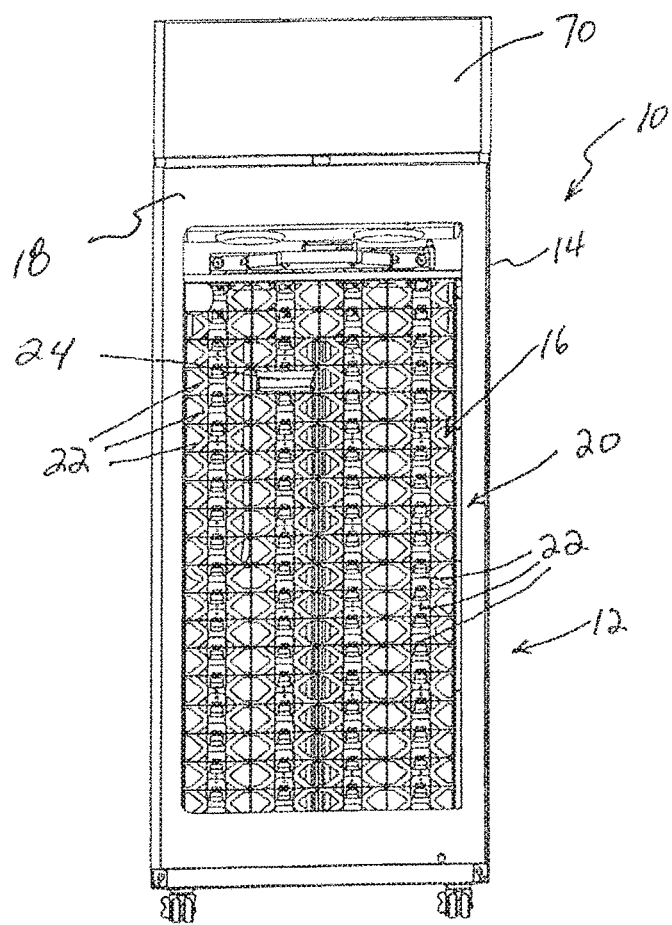
FIG. 2 is a front plan view similar to the front plan view of FIG. 1, the medical products storage device of FIG. 2 having a glass in a door of the medical products storage device being transparent such that a access control structure is visible therethrough.

A climate-controlled medical products storage device 10, illustratively embodied as a refrigerator is shown in FIG. 1. The refrigerator 10 includes a cabinet 12 having a cabinet body 14 forming an enclosure 16 (seen in FIG. 2) and a door 18 which is movable between an open position (not shown) and a closed position as shown in FIG. 1 in which the door 18 encloses the enclosure 16. Referring now to FIG. 2, the refrigerator 10 includes a rack 20 which forms a number of compartments 22, each compartment 22 being a storage space configured to receive and support a storage container embodied as a storage tray 24. As will be described in further detail below, the storage trays 24 are configured to be retained within the storage spaces 22 and inaccessible to a user under normal operating conditions.

Figure 6:
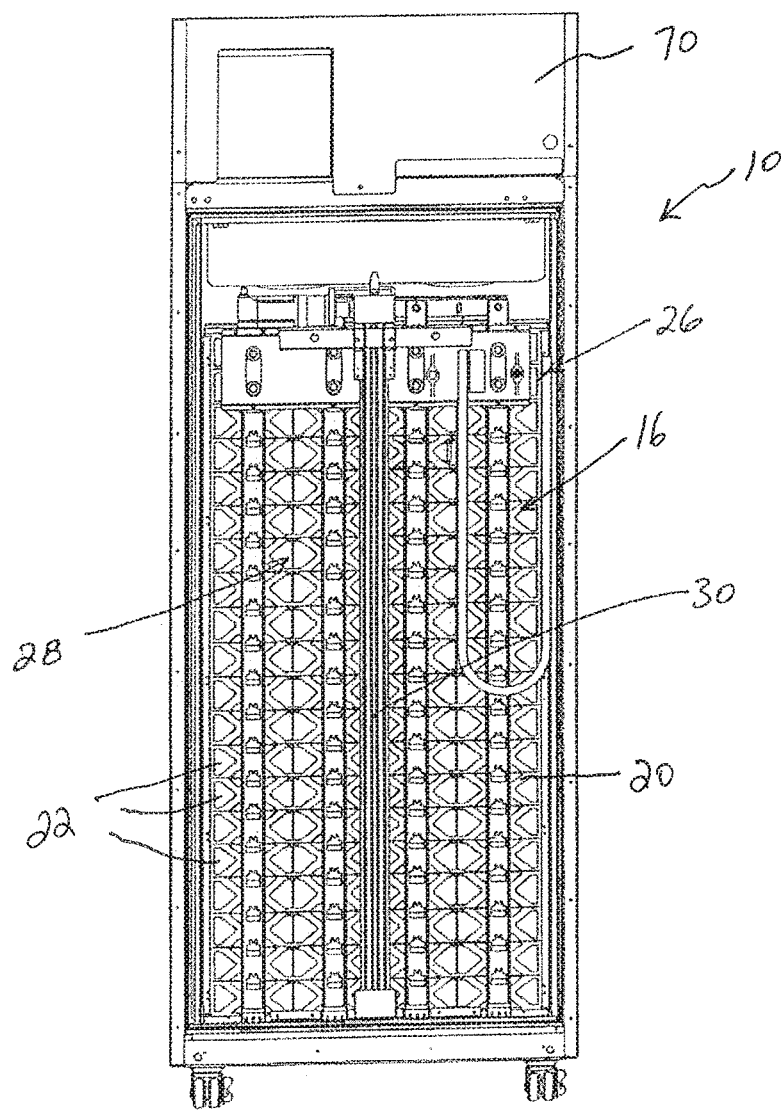
FIG. 6 is a back plan view of the medical products storage device of FIG. 1 with portions removed to expose a gantry system which is operable to control access to storage locations in the medical products storage device.
Figure 7:
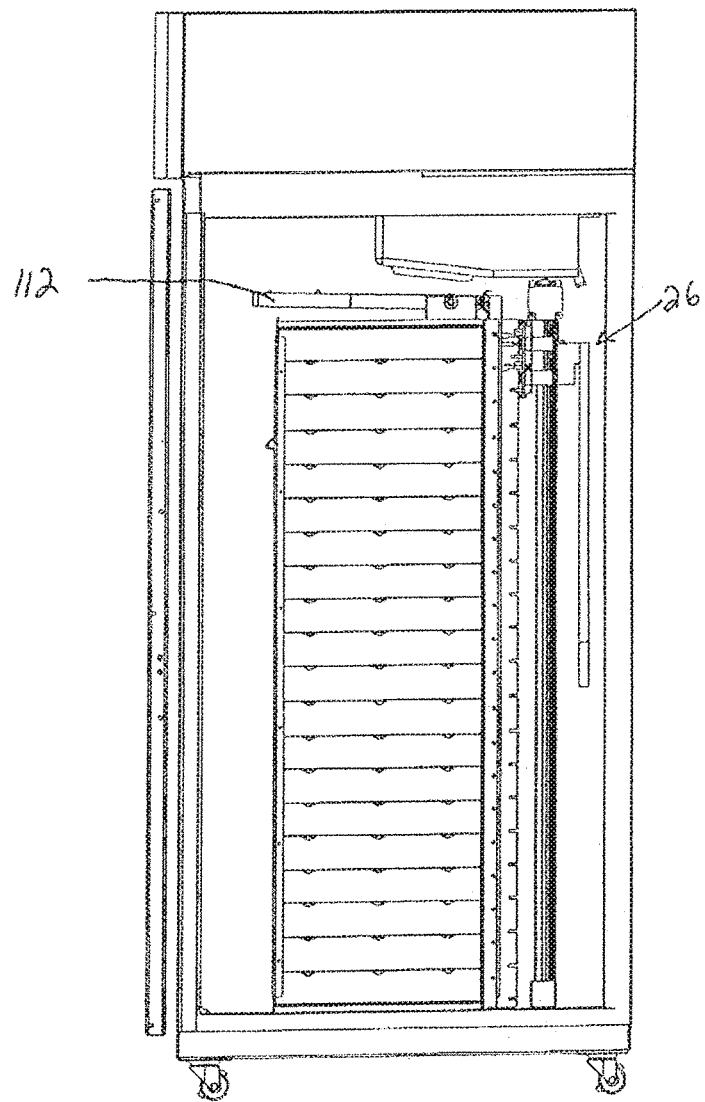
FIG. 7 is a side view of the medical products storage device with portions removed to show an actuation system used to control access to the various storage locations of the medical products storage device of FIG. 1.

Referring now to FIG. 6, control of access to the contents of the storage trays 24 is facilitated by an actuation system 26 which is supported for vertical movement on a gantry 28 such that the actuation system 26 may be moved vertically along a rail 30 of the gantry 28 to a number of vertical positions wherein the actuation system 26 is positioned to control access to different storage trays 24 positioned in the storage spaces 22.

Referring again to now to FIG. 1, the cabinet 12 further includes a controller box 70 supported on the cabinet body 14. The controller box 70 encloses a portion of a control system 72 in an ambient or non-refrigerated environment. Additional components of the control system 72 are enclosed in the cabinet body 14 and are subject to the environment of the enclosure 16 as illustrated diagrammatically in FIG. 3.

Figure 3:
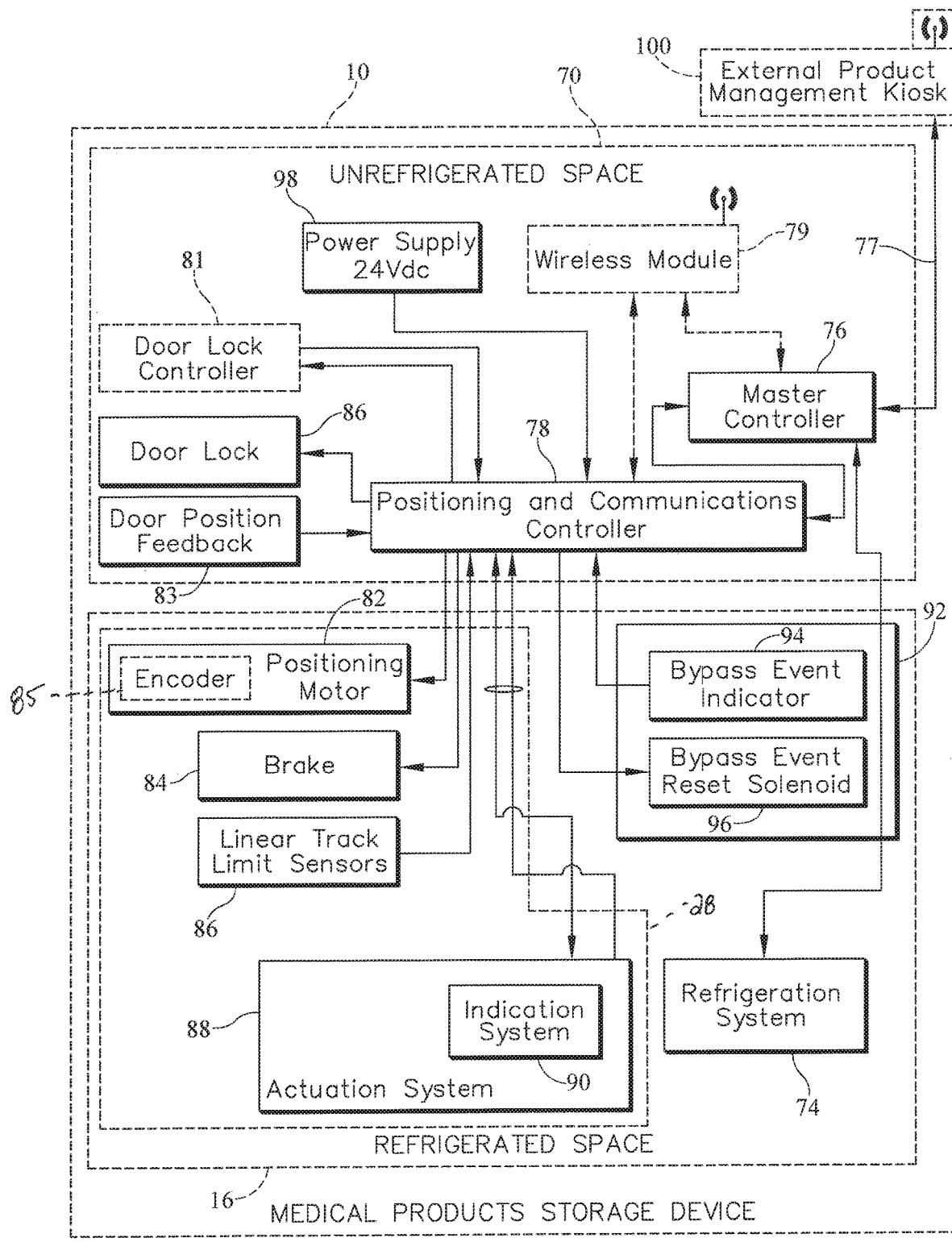
FIG. 3 is a diagrammatic block diagram of the control system for the medical products storage device of FIG. 1.

Referring now to FIG. 3, the enclosure 16 is shown in phantom and includes a climate control device illustratively embodied as a refrigeration system 74 that is operable to control the environment within the enclosure 16. In the illustrative embodiment, the refrigeration system 74 is under the control of a climate controller which is illustratively embodied as a master controller 76 which is positioned in the controller box 70. The operation of the master controller 76 and refrigeration system 74 are similar to that disclosed in U.S. Pat. No. 7,617,690, titled "BLOOD PRODUCTS FREEZER WITH EVENT LOG," issued Nov. 17, 2009, which is hereby incorporated herein by reference in its entirety for its disclosure relative to the control of environmental conditions in a medical products storage device. The refrigeration system 74 includes for example temperature sensors, heating elements for defrosting portions of the system, and evaporator along with circulating fans for controlling the environment within the enclosure 16. In some embodiments, the climate control device 74 may be omitted. In other embodiments, the climate control device 74 may heat the enclosure 16.

The master controller 76 is electrically connected to the refrigeration system 74 and is operable to receive temperature signals from the sensors and utilizes a fully functional processor based control scheme to control climate parameters in the enclosure 16 to maintain the enclosure 16 climate within acceptable parameters. In the illustrative embodiment, the refrigerator 10 is used to store pharmaceuticals, blood products, tissue components or the like. Operation of the refrigerator 10 permits the storage climate to be maintained appropriately for the storage of pharmaceuticals, blood products, tissue components and other perishable medical supplies. In some embodiments, the storage device may heat the storage space. In other embodiments, the storage device may be a freezer, for example an ultralow temperature freezer for storing certain biological materials. In some embodiments, the refrigeration system 74 may also control humidity levels within the enclosure 16. In some embodiments, the refrigeration system may do precise temperature profiling or cycling. In still other embodiments, the refrigeration system 74 may be omitted such that enclosure 16 is not be climate controlled and the conditions within the enclosure may be permitted to fluctuate with changes in the ambient climate surrounding the cabinet body 14.

Figure 27:
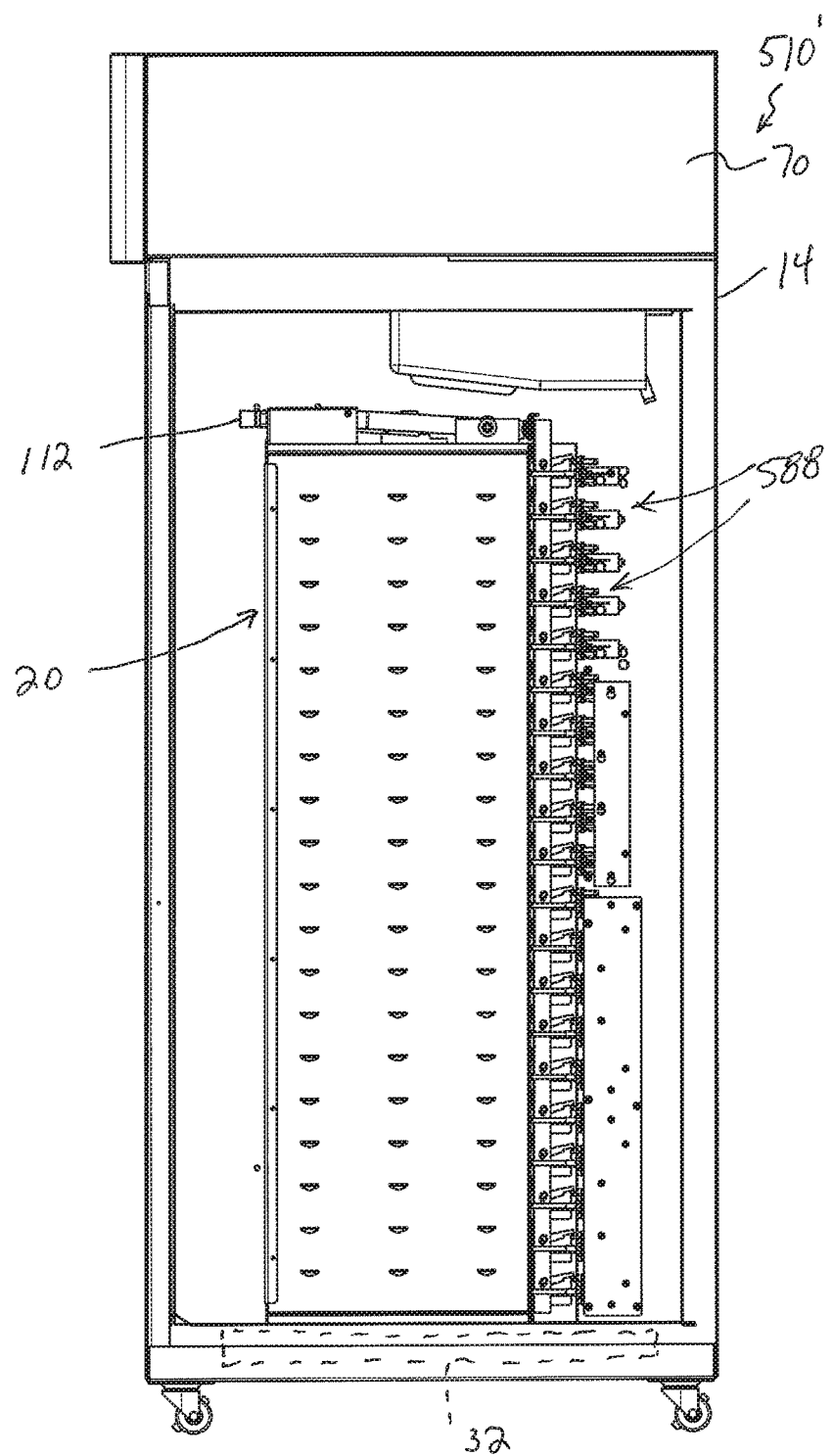
FIG. 27 is a side view of another embodiment of medical products storage device with portions removed, the medical products storage device including an oscillating platform shown in phantom, the platform supporting a structure defining a number of storage spaces and an access control system.

In another embodiment of medical products storage device 510' shown in FIG. 27, the rack 20 and the actuation system 26 are supported on an oscillating platform 32, shown in phantom in FIG. 27. The oscillating platform 32 oscillates, under the control of the master controller 76 relative to the cabinet body 14 to impart motion to products stored in the storage spaces 22. This approach may be used, for example, as an incubator for blood platelets or for any other product which must be oscillated to maintain quality. A complete disclosure of a suitable and control scheme for controlling the oscillation is disclosed in U.S. Pat. No. 7,638,100 titled "PLATELET INCUBATOR," issued Dec. 29, 2009, which is hereby incorporated herein by reference in its entirety for its disclosure relative to oscillation of medical products.

Referring again to FIG. 3, the master controller 76 is the master for the entire refrigerator 10, and functionally controls the refrigeration system 74 and bidirectinally communicates with a positioning controller 78. In the illustrative embodiment, the structure that supports the positioning controller 78 also supports communications between various components of the control system 72. The master controller 76 is operable to control various aspects of the refrigerator 10 to interact with the user and control access to the storage trays 24 in the various storage spaces 22. The positioning controller 78 operates a door lock 80 that is operable to electrically lock the door 18 in the closed position until access to the enclosure 16 is authorized by the master controller 76 in some embodiments or an external product management kiosk 100 in other embodiments. In some embodiments, the refrigerator 10 includes a separate door lock controller 81 that controls the locking of the door 18 under the control of the positioning controller 78.

The positioning controller 78 is also electrically connected to and in communication with various components of the gantry 28 to operate the gantry 28 and control access to the storage trays 24 through the actuation system 26 and arm 54. The gantry 28 includes a positioning motor 82 that is operable to move the actuation system 26 along the rail 30 (see FIG. 6) of the gantry 28 to various positions. The positioning motor 82 in the illustrative embodiment includes an optional encoder 85 to identify the location of the actuation system 26. The gantry 28 also includes a brake 84 which is used by the positioning controller 78 in conjunction with the positioning motor 82 to hold the position of the actuation system 26. The gantry 28 also includes end of travel limit sensors 86 positioned at the top and bottom of the rail 30 to indicate that the actuation system 26 has reached its respective end of travel limits. In some embodiments, the encoder is omitted from the positioning motor 82 and the position of the actuation system 26 is determined by sensing other components. For example, the actuation system 26 includes a circuit assembly 88 which is in communication with the positioning controller 78 and under the control of the positioning controller 78 is operable to permit access to selected storage trays 24 and to confirm the position of the actuation system 26 using optical sensors as will be described in further detail below. The positioning controller 78 is also in communication with an indication system 90 of the circuit assembly 88 that is operable to provide an illuminated indication of the location of a specific inventory item positioned in one of the storage trays 24 as will be described in further detail below. In some embodiments, the indication system 90 and the operation thereof may be omitted.

A separate lockable and manually operable, bypass system 92 is operable to release all of the storage trays 24 simultaneously in the event of an emergency or an electrical failure. The positioning controller 78 is in communication with a bypass event indicator 94 that communicates that a bypass event has been initiated to the positioning controller 78. The bypass event indicator 94 is configured such that the bypass event triggers an indicator. When the bypass system 92 is returned to a normal position, the indicator is not mechanically reset, but is maintained in the by-pass indication state. Thus, when power is restored, the bypass event indicator 94 communicates the bypass event and is maintained in the bypass event indication state until reset by the positioning controller 78. The positioning controller 78 is operable to reset the bypass event by actuating a bypass reset solenoid 96 as will be described in further detail below.

In general, power for the control system 72 is provided by a power supply 98 which receives mains power and provides a 24 V DC power supply to the control system 72 components. Some portions of the refrigeration system 74 are powered directly by mains power with other components receiving power from power supply 98 or another DC power supply within the refrigeration system 74.

The master controller 76 controls access to the enclosure 16 and storage trays 24 after determining that a particular storage location is accessible by a user. Various schemes for allowing access to the storage trays 24 or the enclosure 16 are described in detail in U.S. Patent Application Publication No. 20110202170, titled "ACCESS AND INVENTORY CONTROL FOR CLIMATE CONTROLLED STORAGE," published Aug. 18, 2011 and U.S. Patent Application Publication No. 20130086933, titled "CONTROLLER FOR A MEDICAL PRODUCTS STORAGE SYSTEM," published Apr. 11, 2013, each of which is hereby incorporated by reference in its entirety for the aspects of access control disclosed therein which may be applied to the illustrative medical products storage device 10.

While the master controller 76 may operate autonomously as an interface for access control, in one embodiment the external product management kiosk 100 independently provides signals to positioning controller 78 indicating which storage trays 24 are to be accessed. Thus, in the illustrative embodiment, the kiosk 100 interfaces with the master controller 76 which then interfaces with the circuit assembly 88 and indication system 90. In other embodiments, the kiosk 100 interfaces directly with the circuit assembly 88 and indication system 90 and the master controller 76 independently operates the refrigeration system. In still other embodiments, the kiosk 100 is omitted and the master controller 76 includes all of the system control and access control functionality of the kiosk 100. It should be understood that the external product management kiosk 100 may be linked to the master controller 76 through a wired link 77 utilizing a known communications interface such as Ethernet, USB, RS-232, as examples. The external product management kiosk 100 may also communicate to the master controller 76 through a wireless link wherein a wireless module 79 provides the wireless communications interface with either the master controller 76, or, if the master controller 76 is omitted, the positioning controller 78.

Figure 4A:
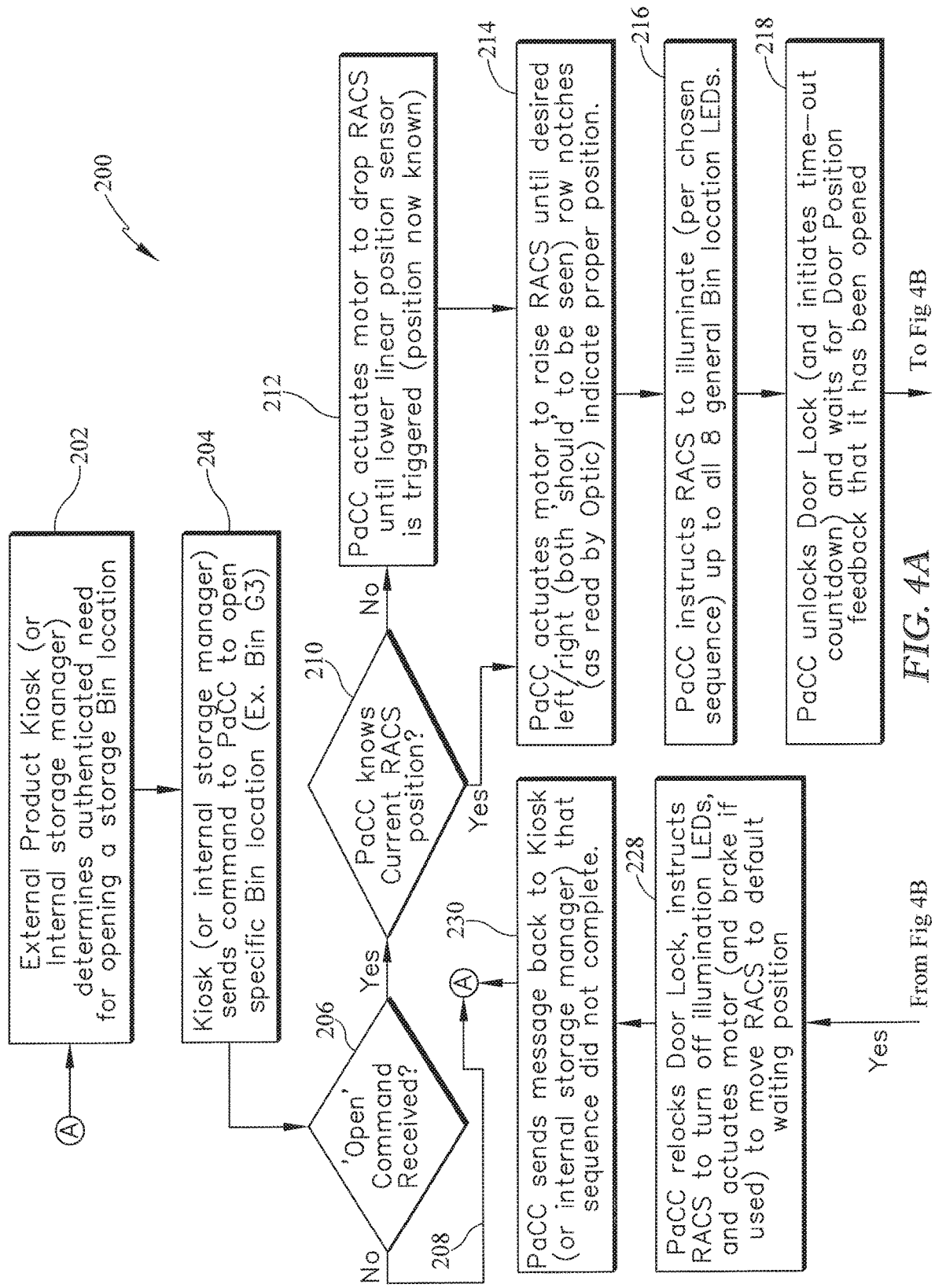
FIGS. 4A-4B is a flowchart depicting the process employed by a control system for the medical products storage device to provide access to a specific storage location in the medical products storage device.
Figure 4B:
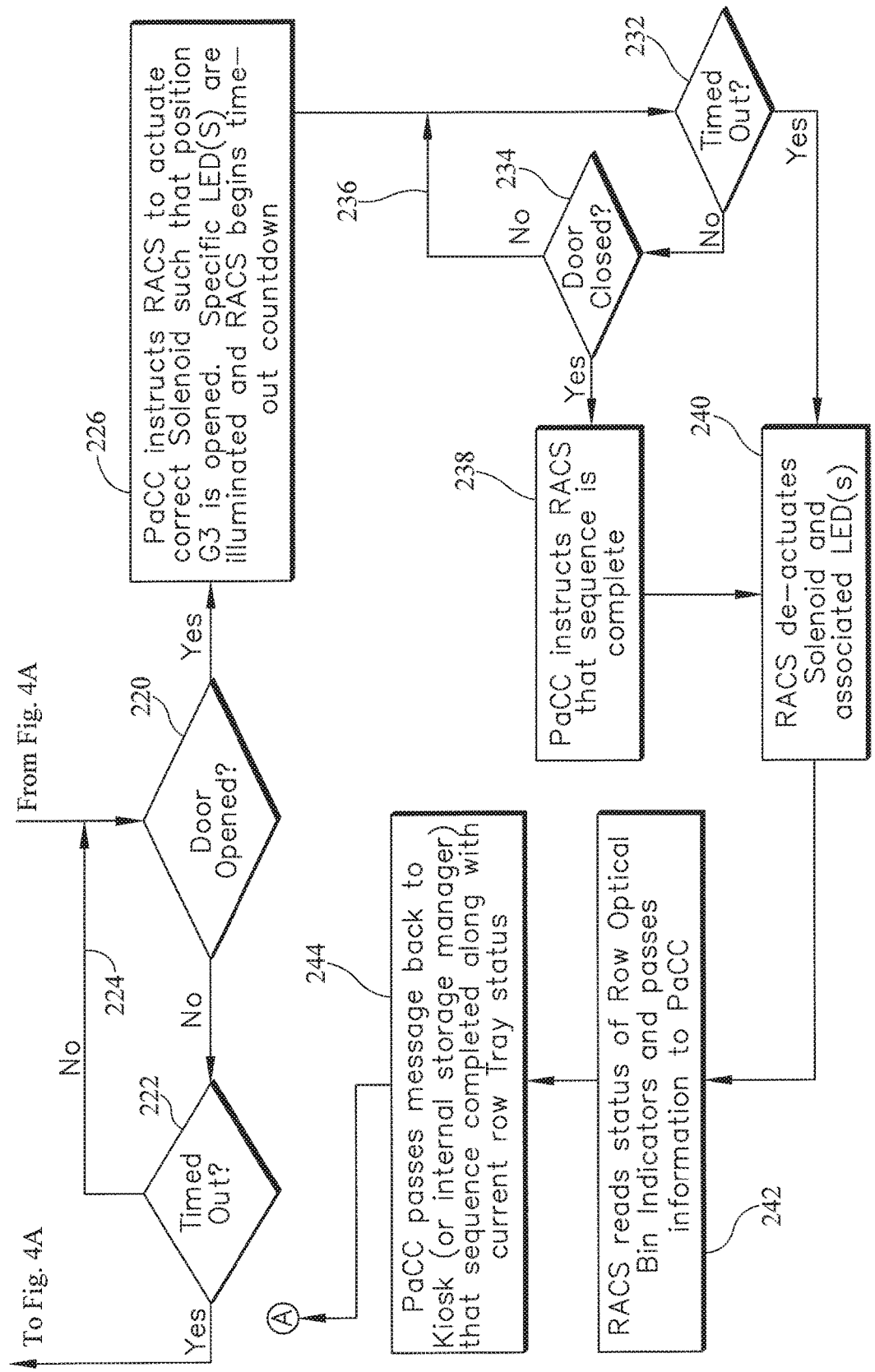

A control algorithm 200 for operating the access control aspects of the medical products storage device 10 is shown in FIG. 4. The control algorithm 200 initiates a step 202 where the master controller 76 either independently or based on a signal from the external product management kiosk 100 determines that an authorized user has requested that a particular storage tray 24 be accessed. The algorithm 200 proceeds to process step 204 where a command is sent to the positioning controller 78 to allow access to a specific tray location. The algorithm 200 then proceeds to decision step 206 where the positioning controller 78 monitors for an open command from the master controller 76 (or kiosk 100, in some embodiments). If no open command has been received, the positioning controller 78 continues to loop waiting for an open command as indicated by arrow 208. If however, an open command has been received, the algorithm 200 proceeds to decision step 210 wherein the positioning controller 78 evaluates whether the specific location of the actuation system 26 is known.

Figure 8:
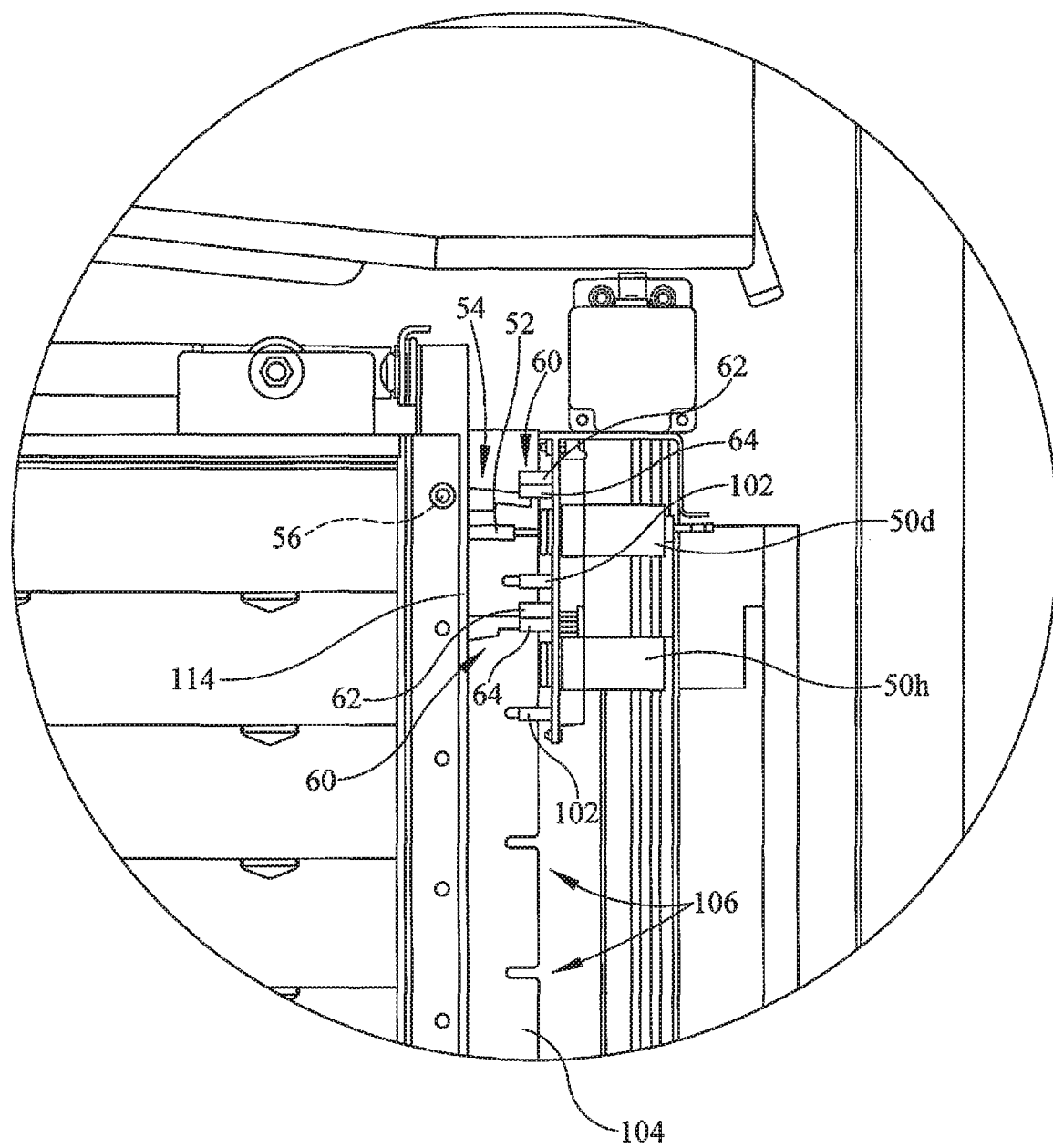
FIG. 8 is an enlarged view of a portion of the side view of FIG. 7.
Figure 9:
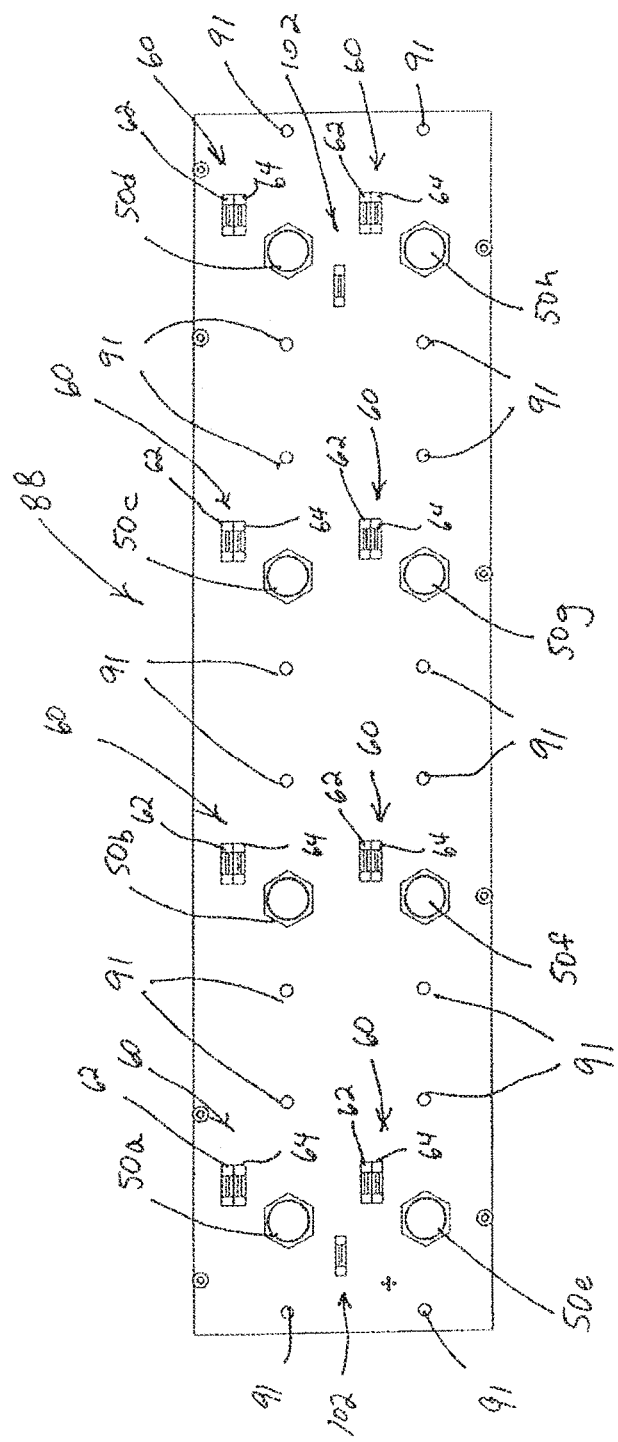
FIG. 9 is a diagrammatic view of a portion of the actuation system of the medical products storage device.

Referring to FIG. 9, the actuation system 26 includes optical sensors 102 that are part of the circuit assembly 88. Referring now to FIG. 8, the optical sensors 102 are positioned to engage one of four position rails 104 which are formed to include a number of evenly spaced notches 106. When the optical sensors 102 are aligned with the notches 106, the optical switches provide a null signal to the positioning controller 78. When the positioning controller 78 has identified with certainty the location of the actuation system 26, movement of the actuation system 26 by the gantry 28 is monitored by the positioning controller 78 which counts the number of notches 106 passed by the actuation system 26 to determine the location of the actuation system 26. Multiple optical sensors 102 are used to confirm that the actuation system 26 is properly aligned across the width of the refrigerator 10 and to provide redundancy in the event one or more optical sensors 102 fail. In other embodiments, the notches 106 may be intermittently positioned across the four position rails 104 such that each vertical position of the actuation system 26 provides a distinct arrangement of signals from the optical sensors 102 to define the vertical position of the actuation system 26.

If it is determined at step 210 of algorithm 200 that the positioning controller does not know the specific location of the actuation system 26 (e.g., after a power outage), the algorithm 200 proceeds to process step 212 where the positioning controller 78 actuates the positioning motor 82 to lower the actuation system 26 until the lower linear track limit sensor 86 is engaged. Once the lower linear track limit sensor is engaged, the positioning controller 78 knows the position of the actuation system 26. If the position of the actuation system 26 is known in step 210 or confirmed during step 212, the algorithm 200 proceeds to process step 214 where the positioning controller 78 actuates positioning motor 82 while the optical sensors 102 count the notches 106 to properly position the actuation system 26. It should be understood that process step 212 is unnecessary in embodiments where the positioning motor 82 includes an encoder.

Once the proper position is achieved, the algorithm 200 advances to process step 216 where one or more indicators 91 (shown in FIG. 9) are illuminated to provide a visual indication to a user of the tray(s) 24 which are to be accessed by the user.

Once the tray(s) 24 is/are illuminated, the algorithm 200 proceeds to step 218 wherein the positioning controller 78 drives the door lock 80 unlocking the door and initiates a timer to countdown a preset time while monitoring a door sensor 83 that provides a signal that the door 18 has been opened. While the timer counts down the preset time the door status is monitored at decision step 220. A decision loop is maintained at decision step 220 and decision step 222 such that if the door has not been opened at step 220 the algorithm proceeds to step 222 to determine if the timer has timed out. If the timer has not timed out, the algorithm loops back to the decision step 220 as indicated by arrow 224. If the door is opened before the timeout period, the algorithm 200 proceeds to process step 226 which will be discussed in further detail below. If the timer does timeout as determined that decision step 222, the algorithm 200 proceeds to process step 228 and the positioning controller 78 locks the door 18, turns off the indicators 91, and returns the actuation system 26 to a default waiting position. The algorithm 200 then proceeds to process step 230 where the positioning controller 78 communicates with the master controller 76 (or kiosk 100) to inform the master controller 76 (or kiosk 100) that the open command was not acted upon by a user. The algorithm 200 then returns to process step 202 and monitors for a new open command from the external product management kiosk 100 or the master controller 76.

In some embodiments, all of the indicators 91 are initially illuminated and select indicators 91 are turned off sequentially until only the indicators 91 that are directly associated with the particular location are illuminated. In this way, the user's attention can be drawn to the particular location. In the illustrative embodiment, the indicators 91 are turned off after a user closes the door 18 as detected by the door sensor 83. This is indicative that the user has removed the particular storage tray 24. As will be discussed below with regard to another embodiment of refrigerator 510 and storage tray 524, a storage tray, such as storage tray 24 or storage tray 524 may be independently monitored such that removal of the storage trays 24 or 524 is detected by the master controller 76.

If the algorithm 200 proceeds from decision step 220 to process step 226, the positioning controller 78 instructs the actuation system to actuate a solenoid 50a-50h associated with the specific position of the storage tray 24 to be accessed and the specific optical indicator 91 associated with that position is illuminated with all other indicators being turned off. A countdown timer is also initiated at process step 226, the countdown timer waiting to determine if the door 18 has been closed as detected by the door sensor 83.

Referring now to FIGS. 6-9, the actuation system 26 includes the solenoids 50a-h that include a plunger 52 operable to extend to cause an arm 54 to be pivoted about an axis 56 to cause the arm 54 to release or disengage from a storage tray 24. It should be understood that there is a separate arm 54 associated with each storage space 22 such that when storage trays 24 are positioned in respective storage spaces 22, a hook 34 of the respective arm 54 engages the storage tray 24 to retain the storage tray 24 in the storage space 22.

The algorithm 200 receives to a decision step 232 where the timer is monitored. If the timer is determined not to have timed out at decision step 232, the algorithm 200 proceeds to decision step 234 and checks to see if the door 18 has been closed. If the door 18 has not been closed, the algorithm 200 loops back to decision step 232 as indicated by arrow 236. If it is determined at decision step 234 that the door has been closed, the algorithm 200 proceeds to process step 238 where the positioning controller 78 signals the circuit assembly 88 that the sequence is complete. If it is determined that the timer timed out at decision step 232 or process step 238 is complete, the algorithm 200 proceeds to process step 240 where the circuit assembly 88 actuates the solenoid 50 and any optical indicators 91.

The position of any given arm 54 is determined by an array 60 of optical sensors 62, 64, shown in FIG. 9. Evaluation of the signals of the optical sensors 62, 64 in a particular array 60 provides an indication of the position of the arm 54 by sensing a flange 66 of the arm 54. For example, in the arrangement shown in FIG. 6, an upper arm 54 is being acted upon by the plunger 52 of the solenoid 50 such that the arm 54 is disengaged from the back wall 58 (seen in FIG. 17) of the storage tray 24. The flange 66 of the arm 54 breaks the light beam of the optical sensor 62, but does not affect the optical sensor 64. The optical sensor 62 thereby provides a negative or null signal to the positioning controller 78 indicating that the light beam is broken while the optical sensor 64 provides a positive signal to the positioning controller 78. This combination of signals indicates that the arm 54 is in the released position. In such a case, the indication is that the corresponding storage tray 24 is either not present or not seated in a position to engage the arm 54. In contrast, the lower arm 54 has not been acted upon by the plunger 52 of the solenoid 50 so that the flange 66 breaks the beam of both optical sensors 62 and 64. Because both sensors 62 and 64 will provide a positive signal to the positioning controller 78, the positioning controller 78 will discern that the 54 is in the lowered, latched position where the storage tray 24 is secured from removal from the storage space 22.

The circuit assembly 88 is further operable to compare the signal from the optical sensors 62, 64 to the expected condition to determine if an unexpected condition exists. For example, solenoids 50 are normally in a retracted condition such as that shown associated with the lower arm 54 in FIG. 9B. Once a solenoid is energized such as the solenoid 50 associated with the upper released arm 54 in FIG. 9B, the condition of the sensors 62, 64 in array 60 is expected to correspond to a null signal from sensor 62 and a positive signal from sensor 64. As such, by comparing the energization of a solenoid 50 and the composite signal from a sensor array 60 associated with the solenoid 50, the positioning controller 78 determines if the arm 54 is in an unexpected position. If an unexpected position is encountered, the positioning controller 78 can respond to the unexpected condition in a number of ways as will be discussed in further detail below. The algorithm 200 then proceeds to process step 242. Further, an optical reader (not shown) checks to determine if the medical product in the specific storage tray 24 that was to be accessed is present or absent as will be described in further detail below. The status of the storage tray 24 including the presence or absence of a medical product in the storage tray 24 is communicated from the circuit assembly 88 to the positioning controller 78. The algorithm 200 then proceeds to process step 244 and the positioning controller 78 communicates with the master controller 76 and/or the external product management kiosk 100 either directly or through the master controller 76 to indicate that the sequence has been completed and to provide the status of the storage tray 24 that was to be accessed indicating whether or not the medical product has been removed or remains. The algorithm 200 then returns to the initial step 202 awaiting input to the master controller 76 or external product management kiosk 100.

Figure 10:
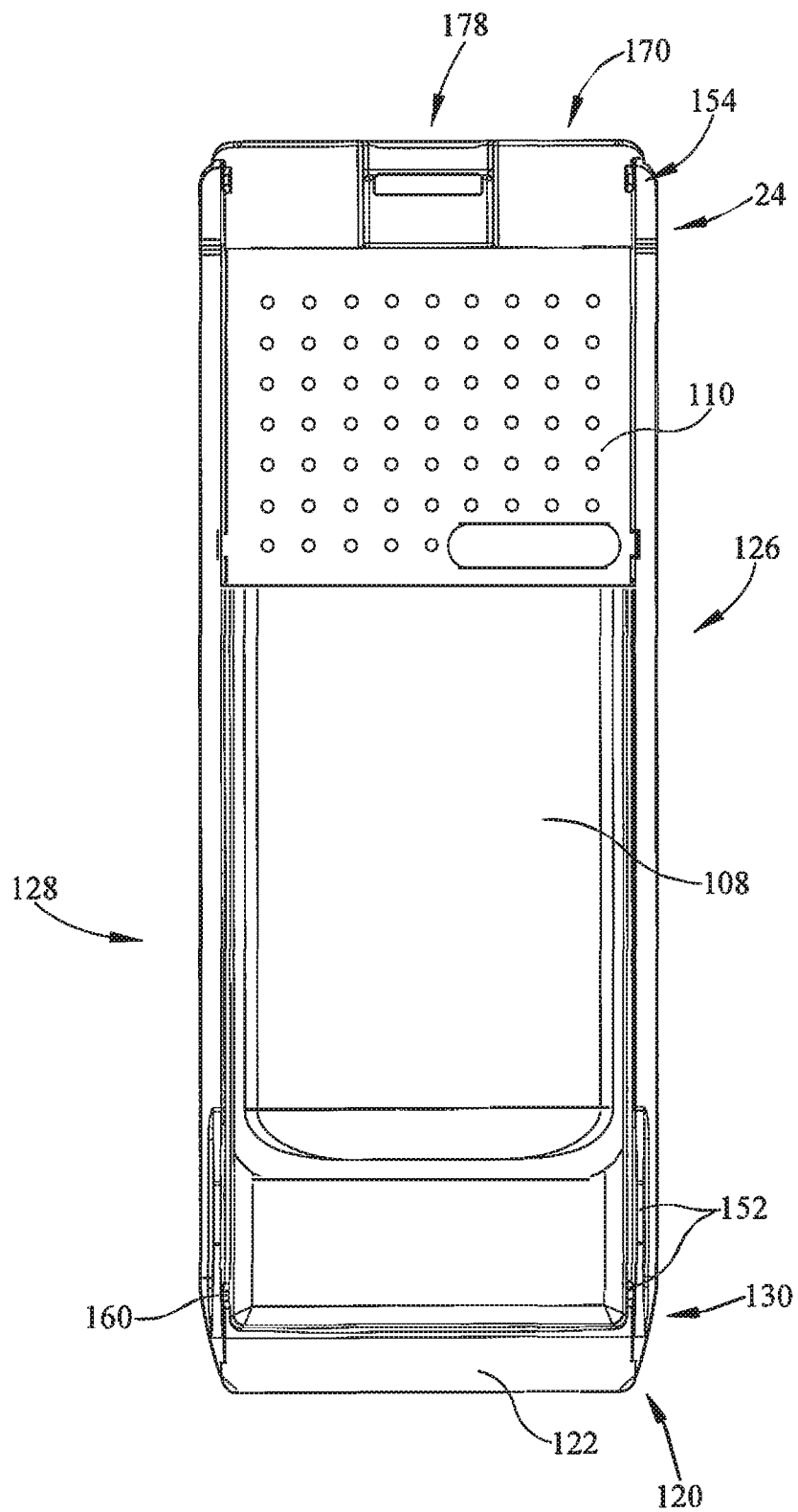
FIG. 10 is a top plan view of a storage tray to be used with the medical products storage device of FIG. 1, the storage tray supporting a containment cover and a container for a medical product positioned in the tray.
Figure 11:
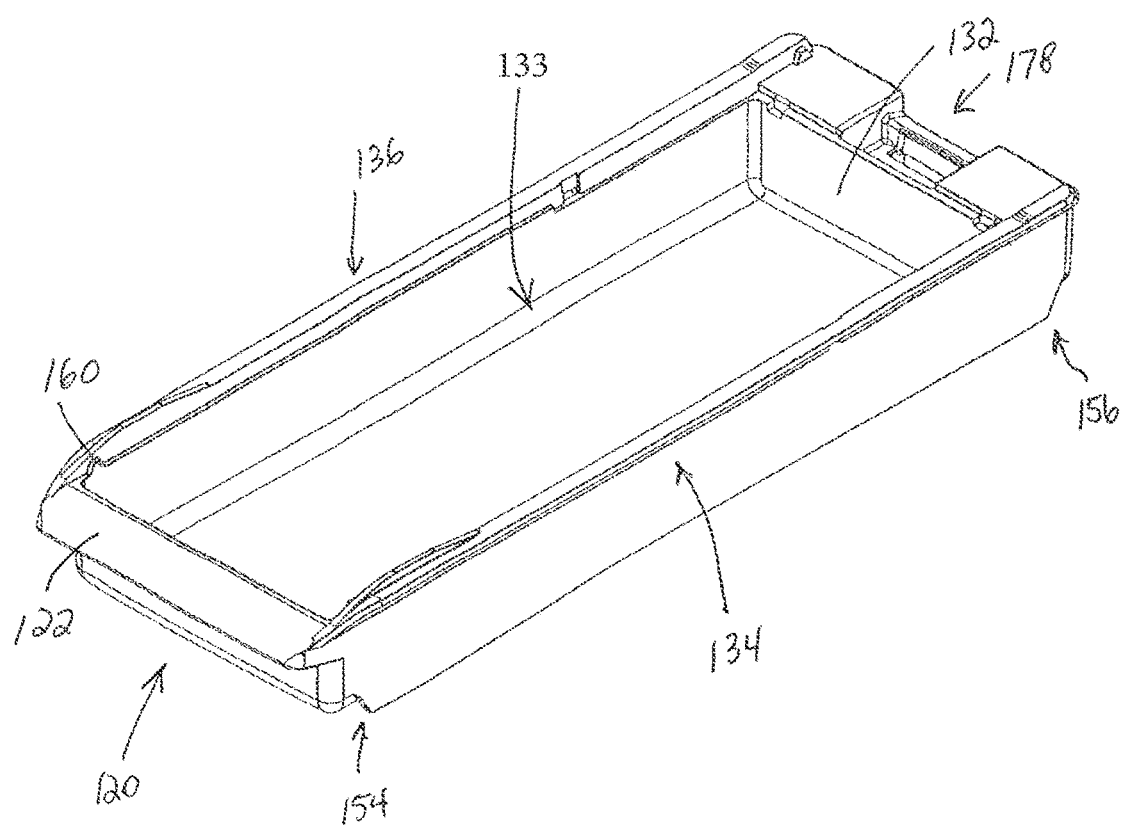
FIG. 11 is a perspective view of the storage tray of FIG. 10.
Figure 12:
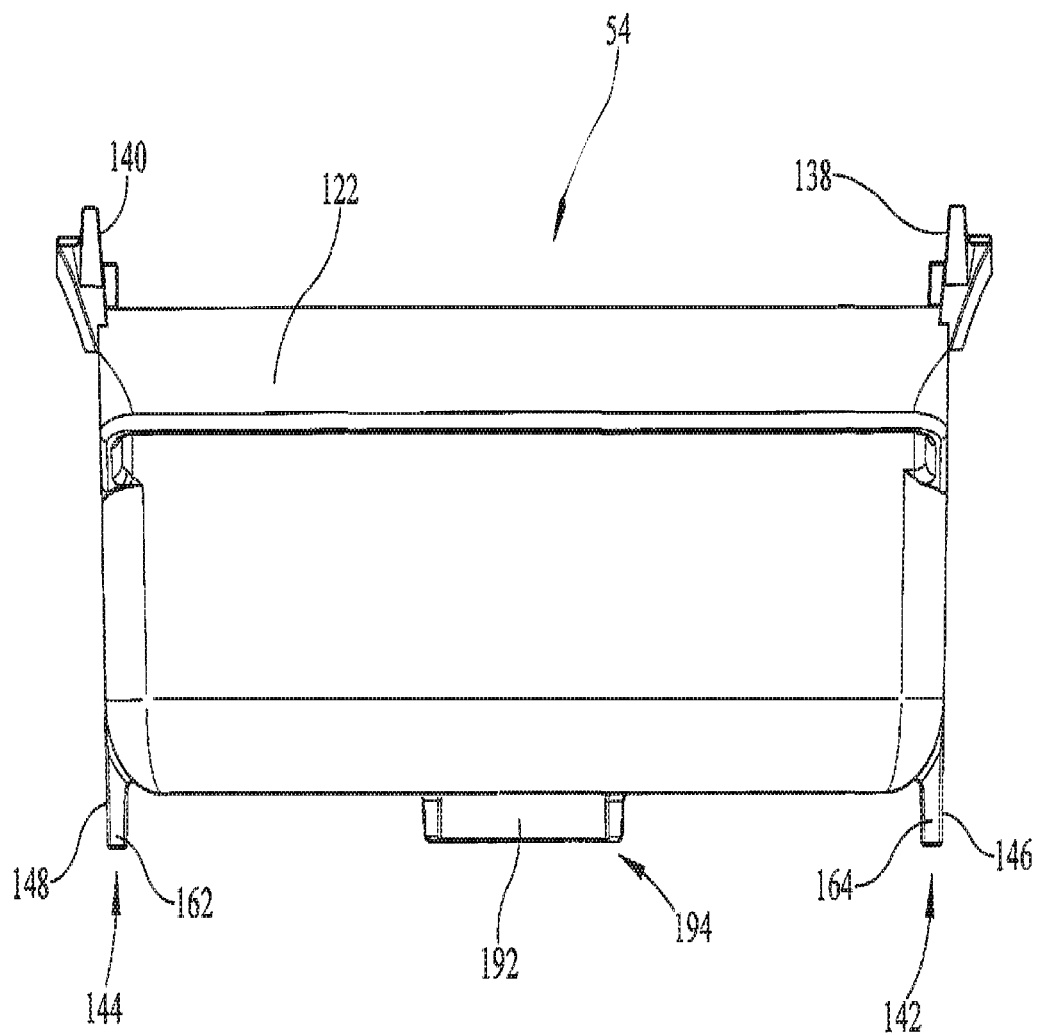
FIG. 12 is a front plan view of the storage tray of FIG. 10.
Figure 13:
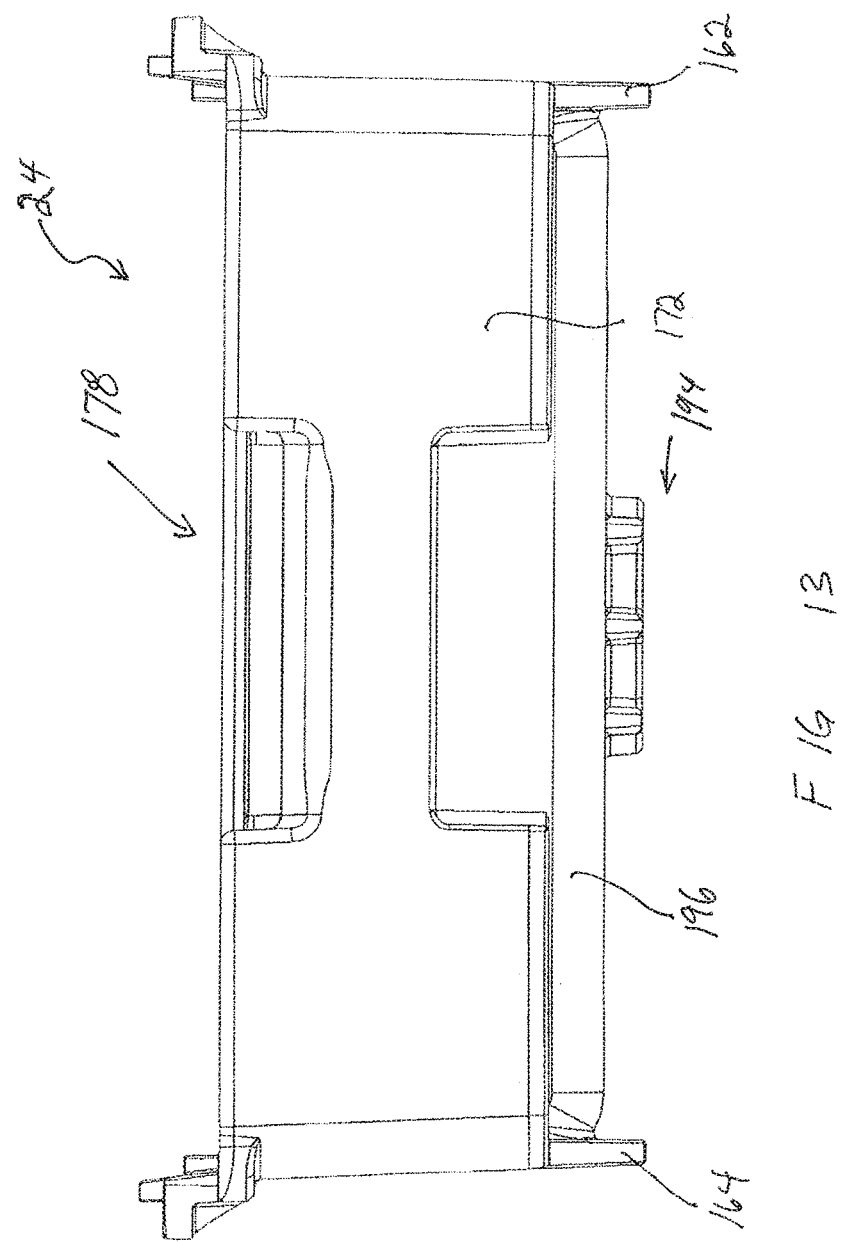
FIG. 13 is a back plan view of the storage tray of FIG. 10.
Figure 14:
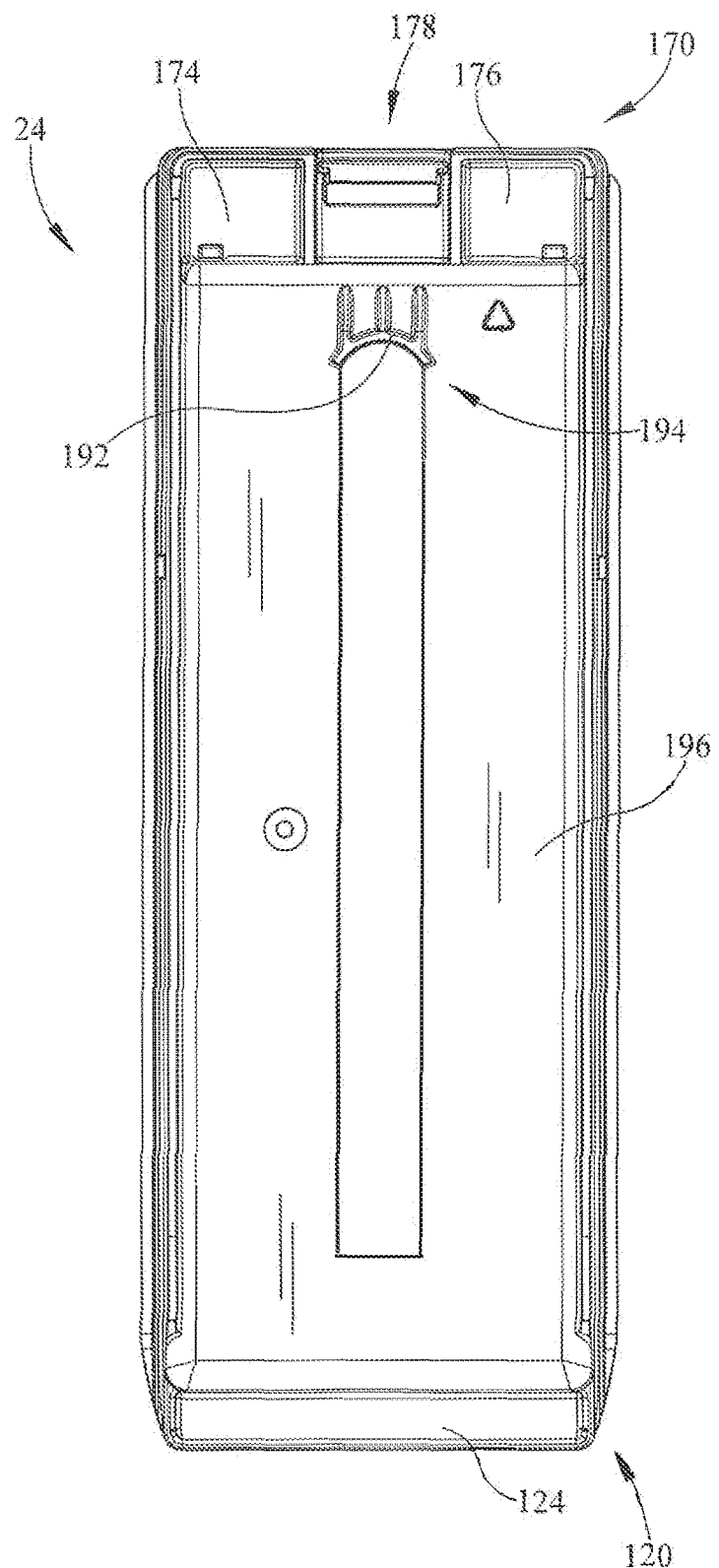
FIG. 14 is a bottom plan view of the storage tray of FIG. 10.
Figure 15:
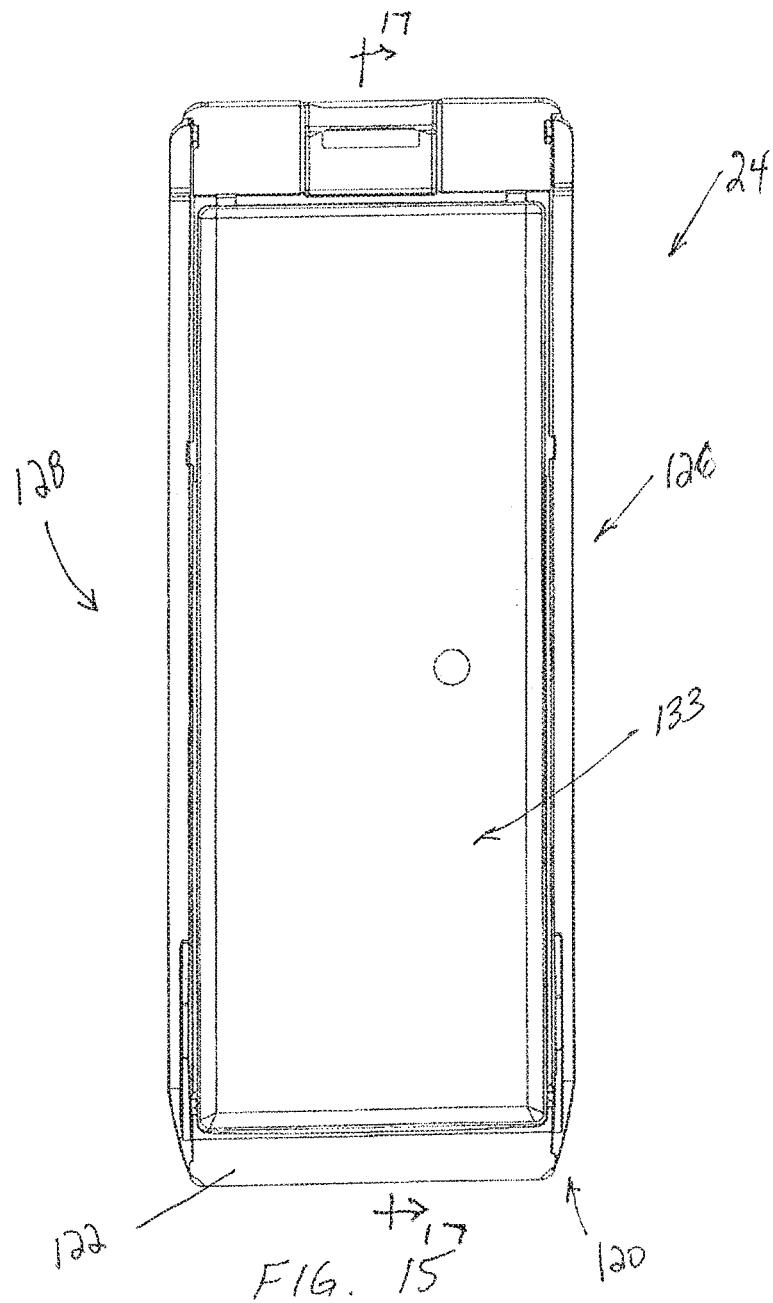
FIG. 15 is a top plan view similar to FIG. 10, FIG. 15 showing the tray without the containment cover and container.

In some instances a user may desire to know the status of various storage spaces 22 to confirm whether a storage tray 24 is located in each of the storage spaces 22 and whether a medical product is stored in the particular storage tray 24. For example, a storage tray 24 shown in FIG. 10 is supporting a medical products container 108 which is retained in the tray 24 by a lid 110. It should be understood that the medical products container 108 may include tubing or other appendages that are also retained by the lid 110. Each storage space 22 is configured to receive a storage tray 24 with or without the lid 110 or medical products container 108. In certain instances, the master controller 76 or the external product management kiosk 100 may have an established record of which storage spaces 22 include a storage tray 24 and in which of the storage trays 24 are included a previously identified and associated medical products container 108.

Figure 5A:
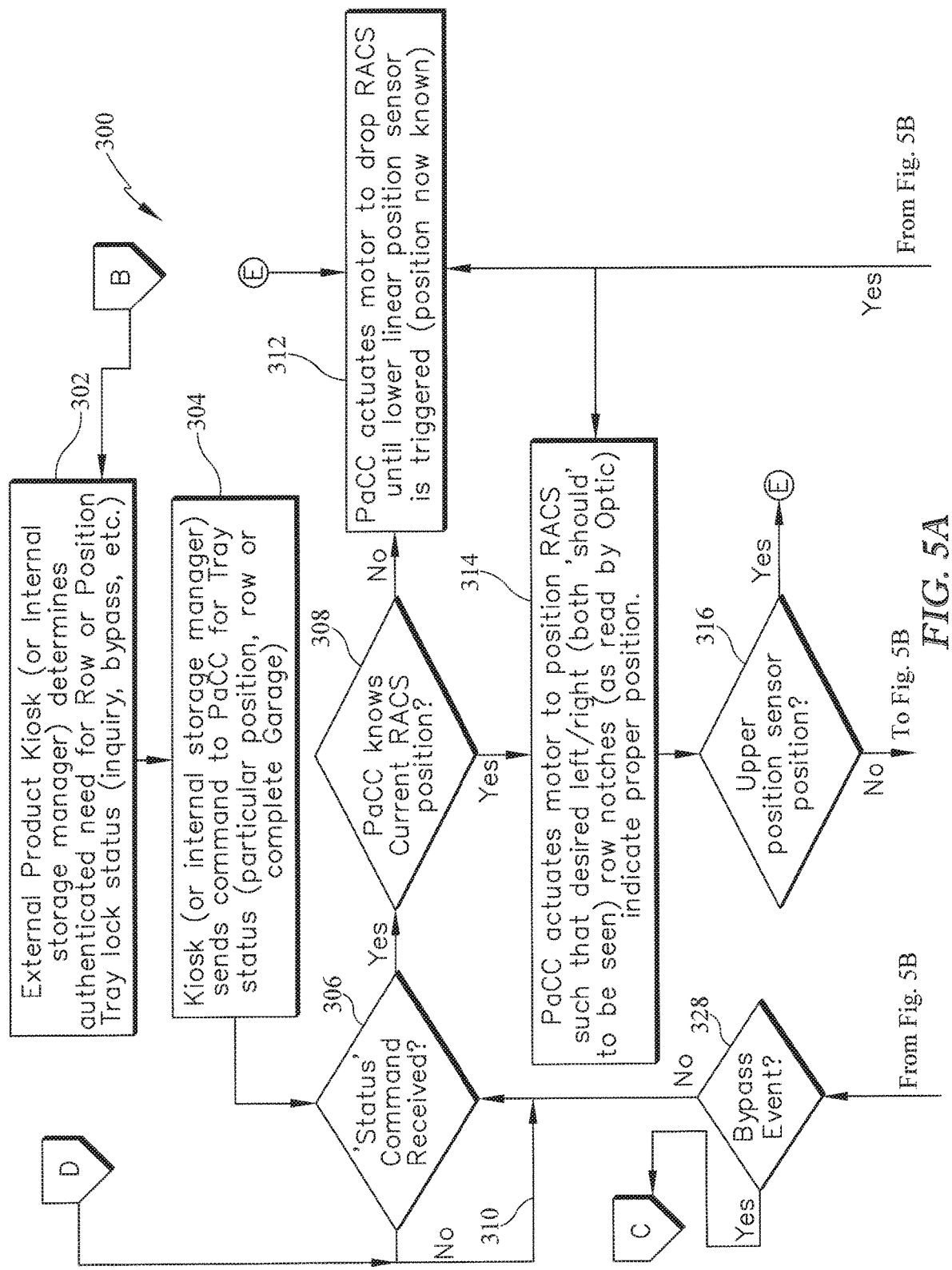
FIGS. 5A-5C is a flowchart depicting the process employed by a control system for the medical products storage device to provide the status regarding a specific storage location in the medical products storage device.
Figure 5B:
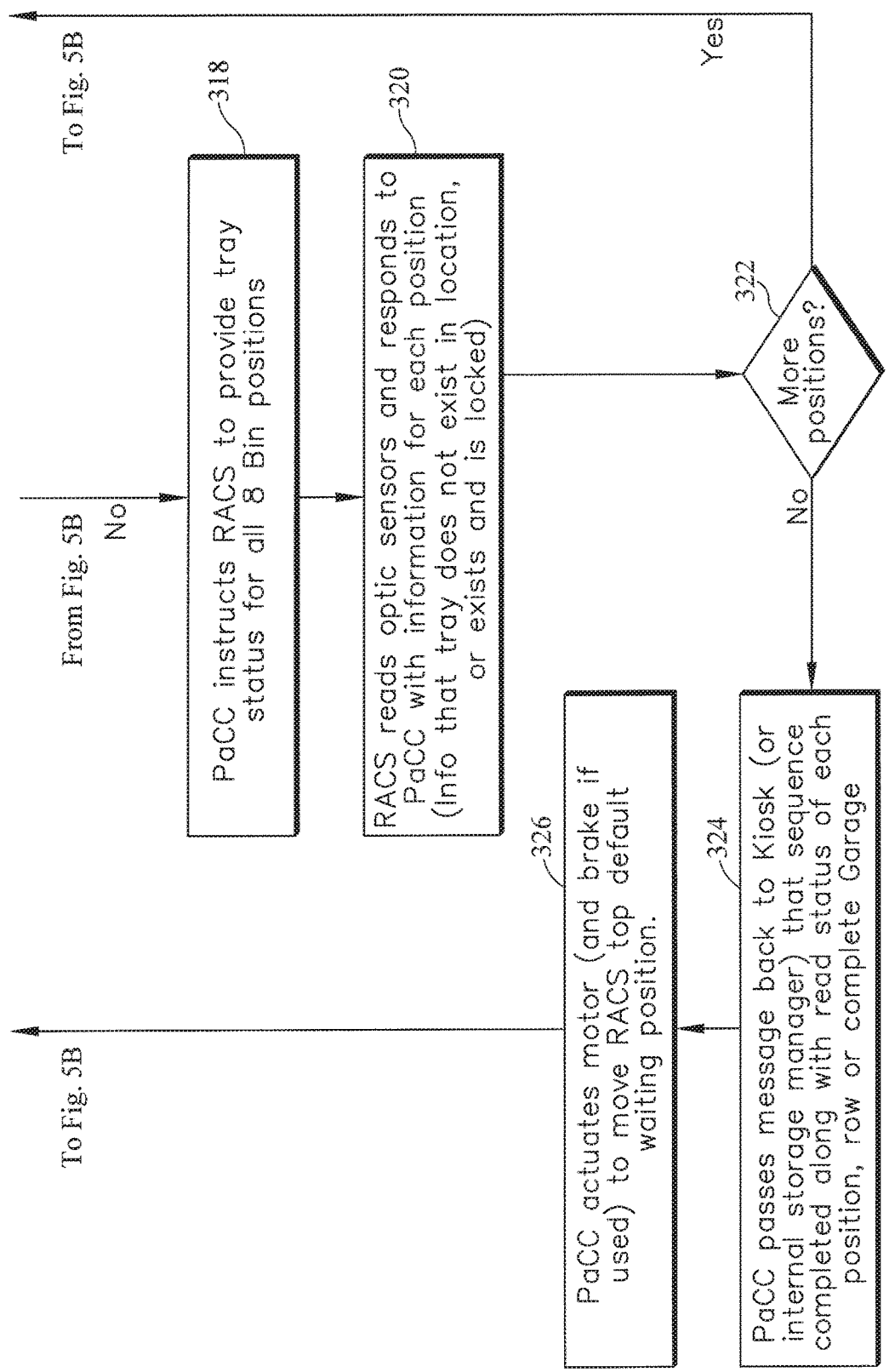
Figure 5C:
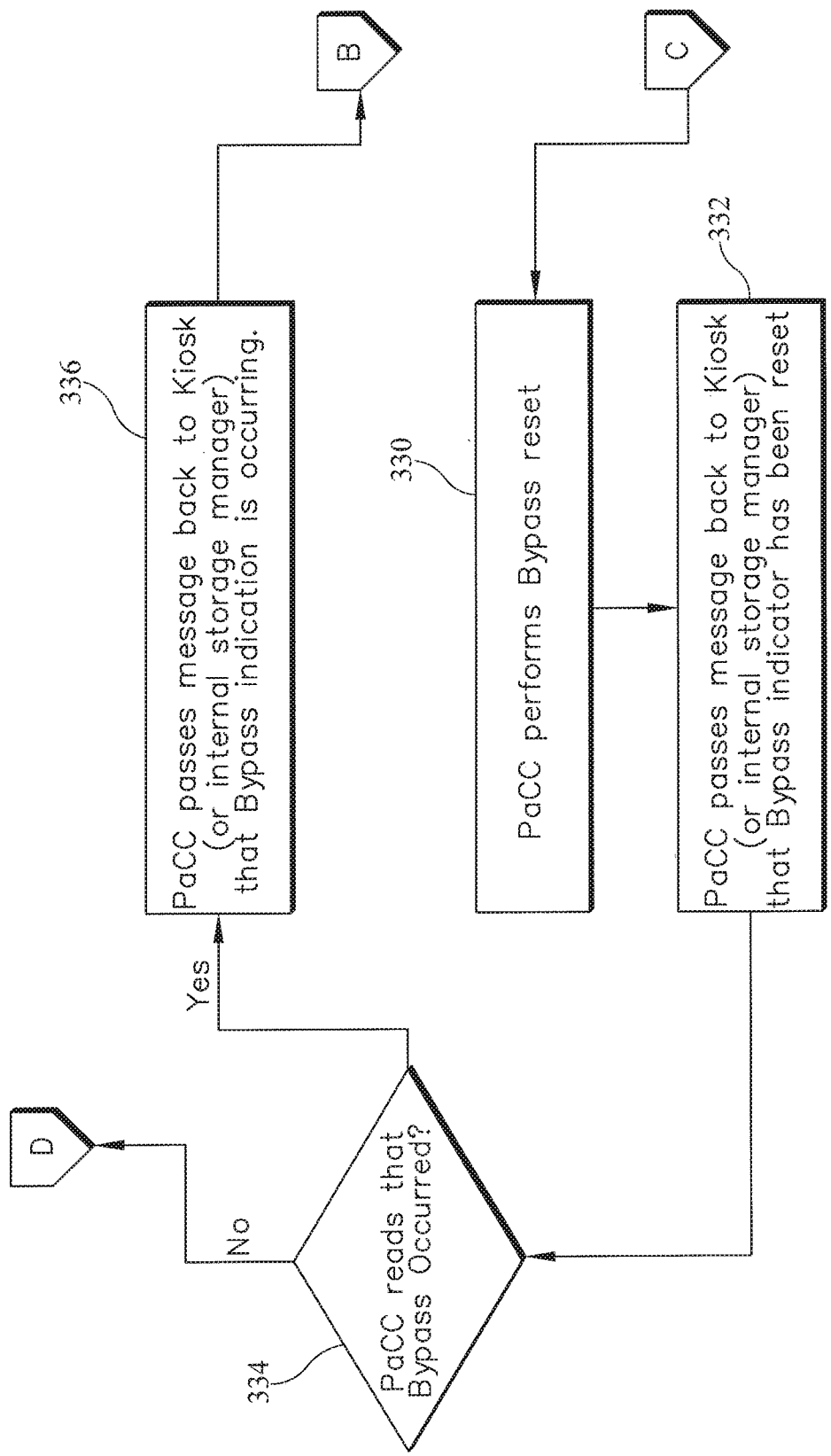

An algorithm 300 shown in FIGS. 5A-5B operates to confirm, when requested, the status of one or more storage spaces 22 by sensing the absence or presence of a storage tray 24 and a medical products container 108. The algorithm 300 is also operable to respond to a specific request from a user to confirm that a storage tray 24 is present in a specific storage space 22 and that the tray 24 supports a medical products container 108. The algorithm 300 initiates at process step 302 where either the master controller 76 or the external product management kiosk 100 receives an authorized request for the status of a particular storage space 22. The process step 302 is an optional step and the algorithm 300 proceeds from process step 302 to process step 304 where the master controller 76 or kiosk 100 commands the positioning controller 78 to determine the status of a particular storage space 22. Process step 302 is optional in that the master controller 76 or kiosk 100 may initiate process step 304 as a part of a regular routine to confirm the status of various storage spaces 22. This may happen, for example, when a bypass event indicator 94 communicates a bypass event to the master controller 76 or kiosk 100.

From process step 304, algorithm 300 proceeds to decision step 306 which is conducted by the positioning controller 78 whereby the positioning controller 78 waits for a command from the master controller 76 or kiosk 100. If the status command is received at step 306 by the positioning controller 78, the algorithm 300 proceeds to decision step 308. If no status command is received from the master controller 76 or kiosk 100 by the positioning controller 78 at decision step 306, the positioning controller 78 continues to loop waiting for a status command as indicated by arrow 310.

At decision step 308 the positioning controller 78 determines whether the current position of the actuation system 26 is known. If the location of the actuation system 26 is not known, algorithm 300 proceeds to process step 312 where the positioning controller 78 causes the positioning motor 82 to move the actuation system 26 until the lower linear track limit sensor 86 is activated indicating that the position of the actuation system 26 is known. Once the position is defined at step 312 or already known at 308, the algorithm 300 proceeds to process step 314 where the positioning controller 78 utilizes the optical sensors 102 to count the notches 106 as described above until the actuation system 26 is properly positioned. While the positioning motor 82 moves the actuation system 26 the upper linear track limit sensor 86 is monitored at decision step 316 to determine if it is activated. Such a situation may occur if the system power gets cycled or if the positioning controller 78 made an incorrect determination of the position of the circuit assembly 88 at decision step 308. If such a situation arises, the algorithm 300 proceeds to process step 312 where the position of the actuation system 26 is reset.

If the upper position sensor is not triggered at decision step 316 the algorithm 300 proceeds to process step 318 where the positioning controller 78 request a status for all eight compartments that the actuation system 26 is aligned with. The algorithm 300 then proceeds to process step 320 where the optical sensors 62, 64 for each of the arms 54 are read to determine the status, i.e., whether or not the arms 54 are in a secured or released position. In addition, the optical detectors positioned in the storage spaces 22 read to determine whether a storage tray 24 is positioned in the storage space 22, and whether a medical products container 108 is positioned in the storage tray 24. This information is communicated from the circuit assembly 88 to the positioning controller 78. The algorithm then proceeds to decision step 322 where the positioning controller 78 evaluate whether additional storage space 22 information has been requested. If additional storage space 22 information has been requested, the algorithm 300 returns to step 314 where the actuation system 26 is moved to a new location and steps 314-322 are repeated.

In some embodiments, the ability of the system to detect the presence of a storage tray 24 and/or a medical products container 108 is used to determine the placement of a particular medical products container 108. For example, if a user scans or otherwise identifies a particular medical products container 108' to the master controller 76 or kiosk 100, the user may be prompted to place the medical products container 108' into any empty storage location. Once the medical products container 108' is placed in a storage location and the door 18 is closed, the system may then scan all of the locations to determine if a storage tray 24 has been newly placed into one of the locations. The presence of a new storage tray 24 being detected indicates to the system that the medical products container 108' has been positioned at the corresponding storage location and that information is logged by either the master controller 76 or the kiosk 100.

In other embodiments, the presence of a medical products container 108 may be determined by a proximity sensor positioned on a circuit assembly 88 of the actuation system 26 is operable to detect the presence of the medical products container 108. For example, the proximity sensor may be configured to sense properties of the materials stored in the medical products container 108. Another embodiment utilizing a similar approach is disclosed and explained below with regard to the embodiment of FIG. 38.

Figure 31:
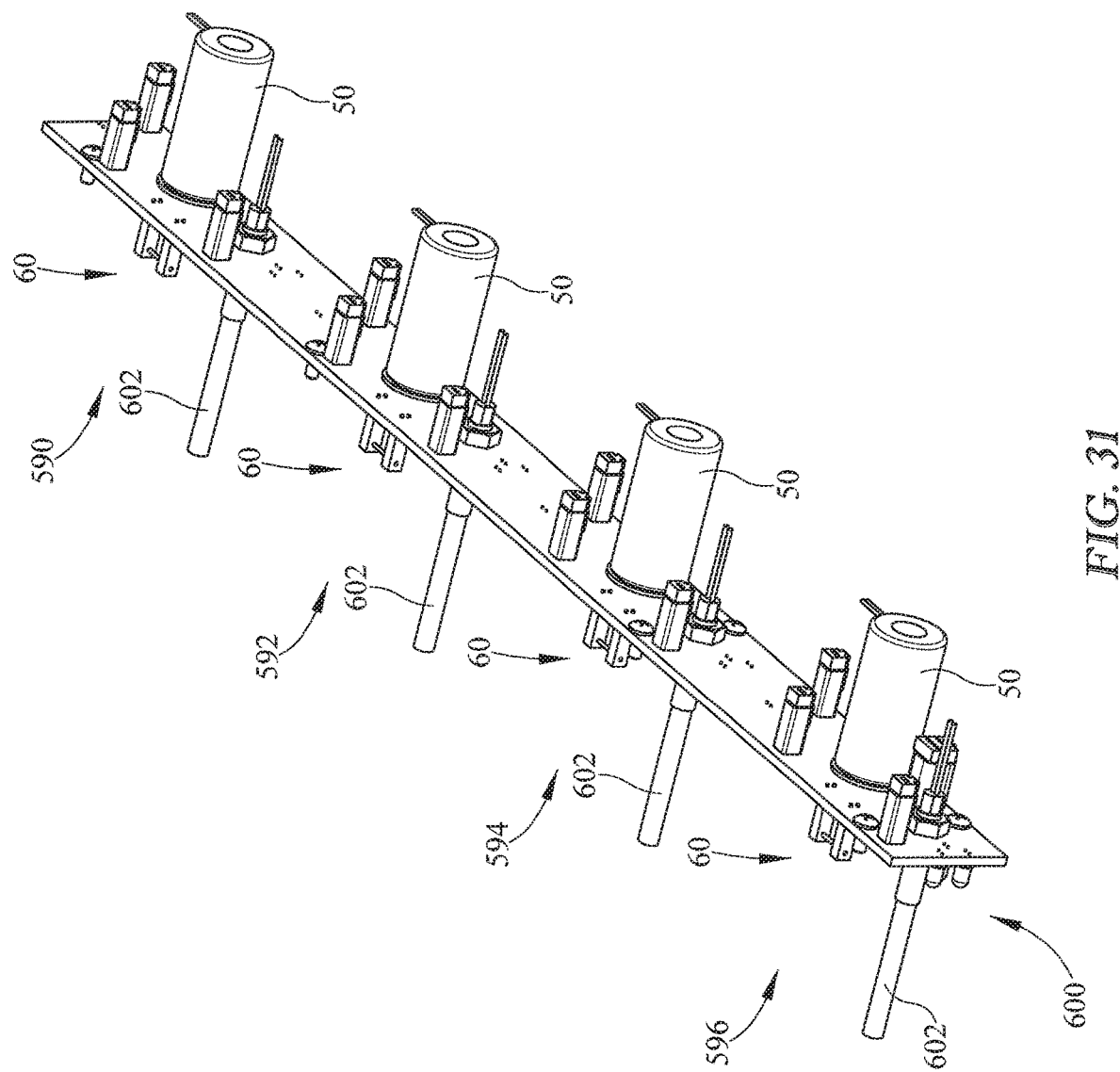
FIG. 31 is a rear perspective view of the circuit assembly of FIG. 30.
Figure 32:
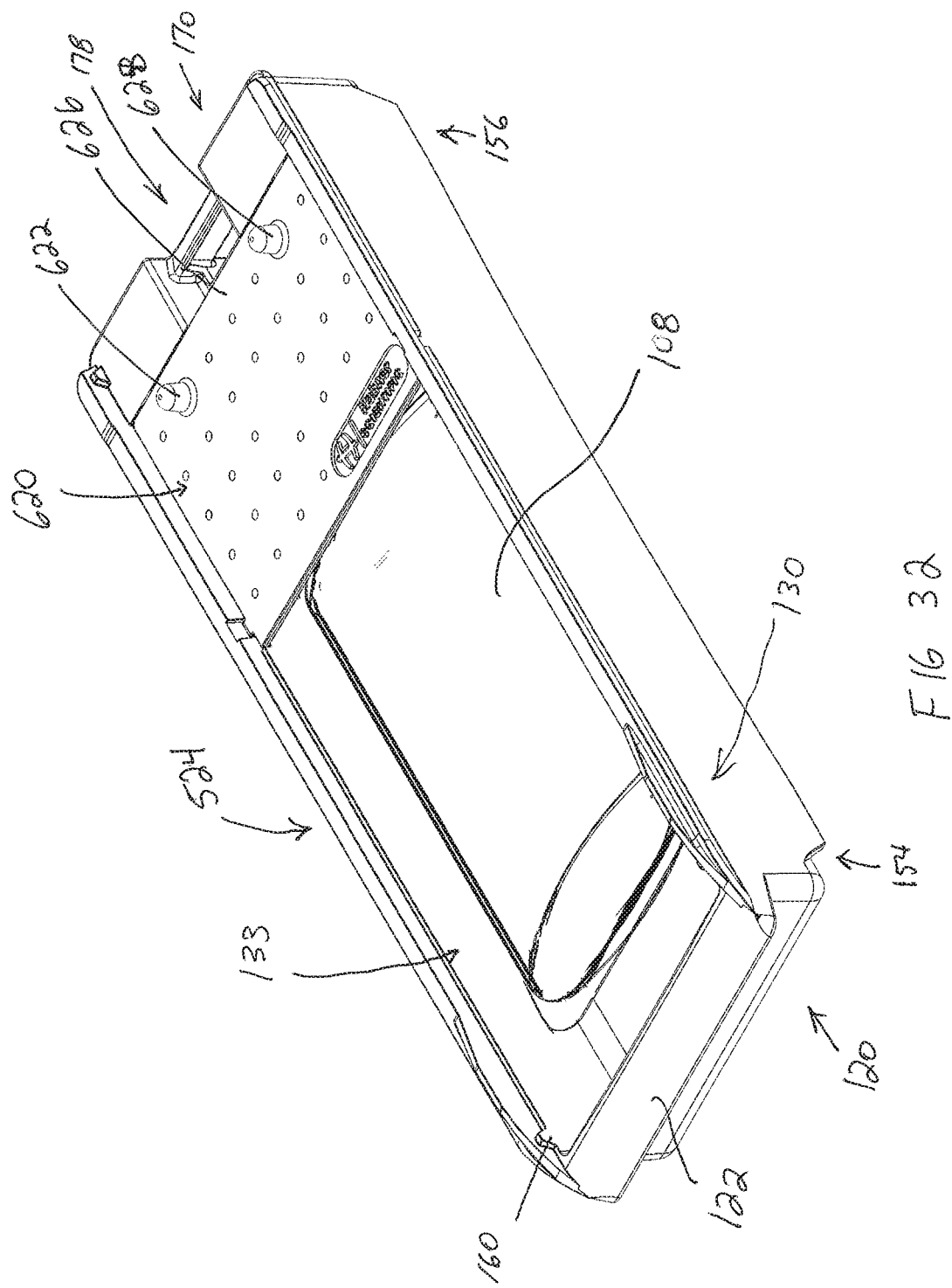
FIG. 32 is a perspective view of another embodiment of a storage tray for use with the medical products storage devices of the present disclosure, the storage tray supporting a medical product container and a lid.
Figure 33:
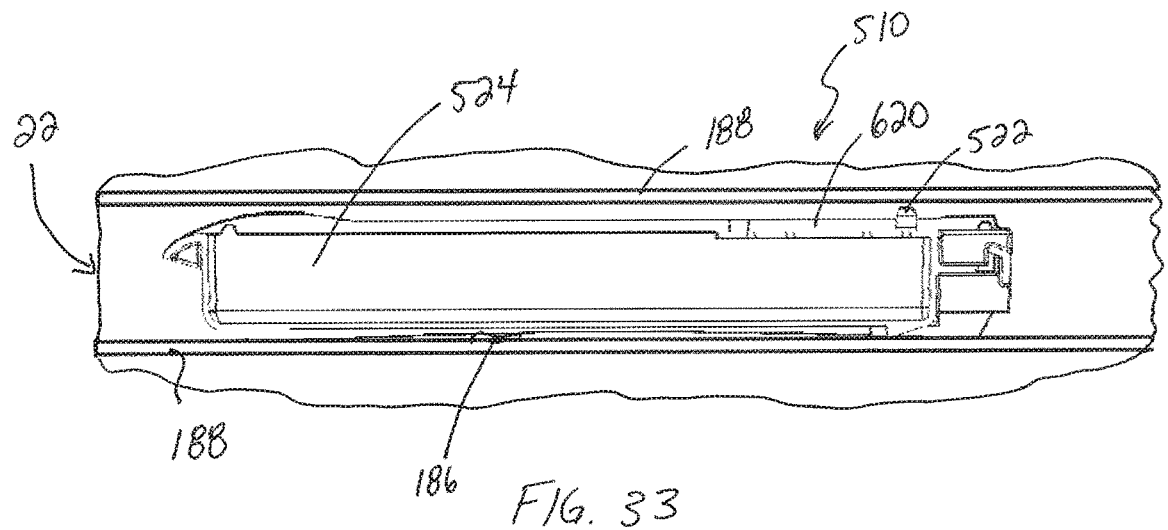
FIG. 33 is a cross-sectional view of the tray and lid of FIG. 32 positioned in a storage space of the medical products storage device of FIG. 28.
Figure 34:
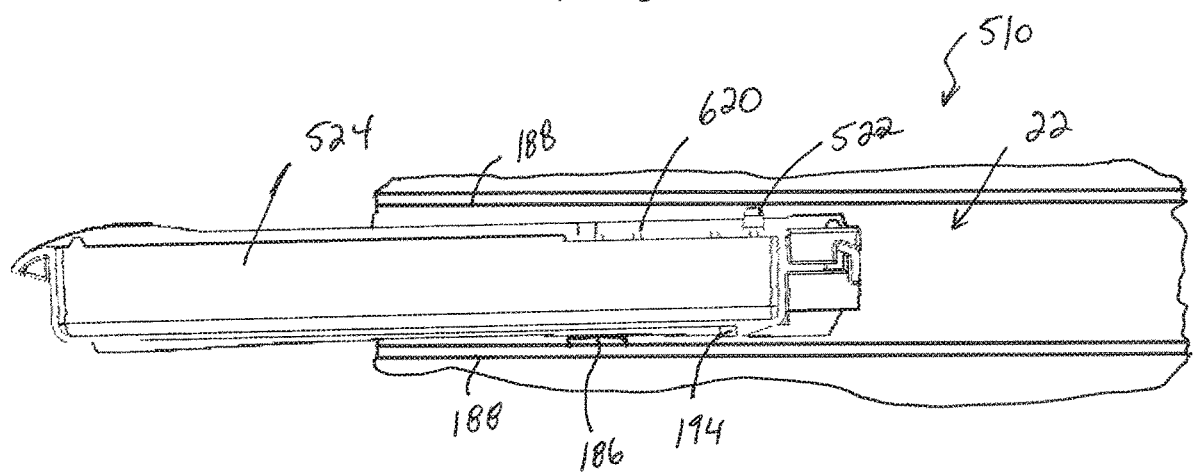
FIG. 34 is a cross-sectional view of the tray and lid of FIG. 33, the tray being slid out to provide access to the tray.
Figure 35:
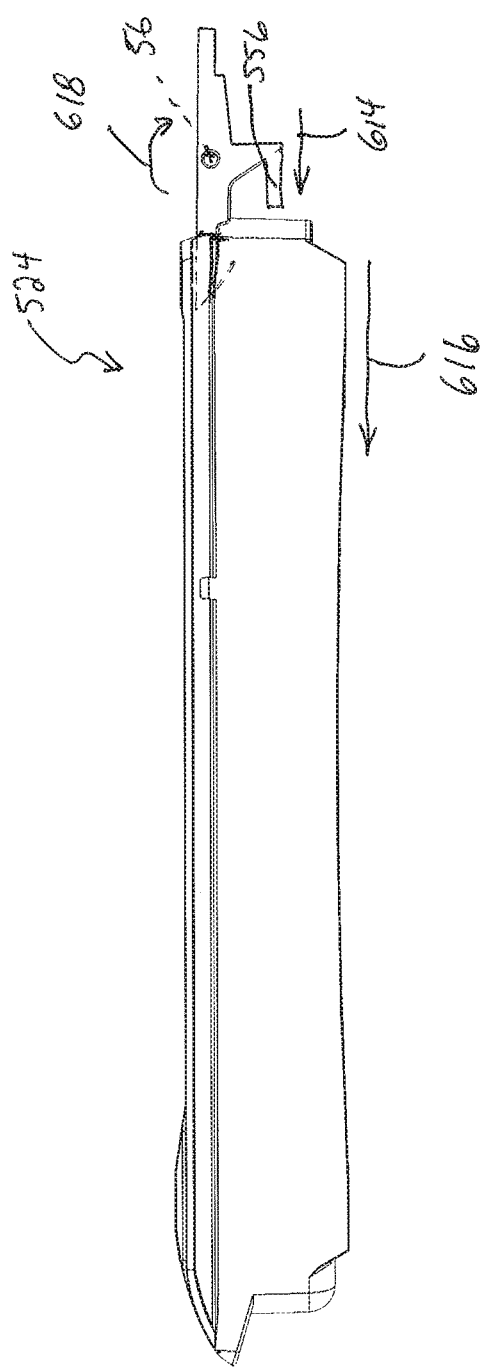
FIG. 35 is an elevation view of the tray and lid of FIG. 33.

In still other embodiments, an optical emitter 38 is positioned in the storage space 22 on the ceiling 40 as shown in FIG. 32. A reflective material 42 is positioned in the storage tray 24 as shown in FIG. 31. An optical detector 44 is operable to detect the particular wavelength of light emitted by the emitter 38. The detector 44 is positioned to receive emissions reflected from the reflective material 42. When a medical product or a medical products container 108 is positioned in the tray 24, as shown in FIG. 33, the emission from the emitter 38 is not reflected to the detector 44. The positioning controller 78 is operable to cause the optical emitter 38 to occasionally emit a signal. By monitoring for the reflected emission at the detector 44, the positioning controller 78 can discern whether something is positioned in the tray 24. This allows the positioning controller 78 to confirm the inventory status in each discrete storage space 22.

If no additional positions are determined to be needed at step 322, the algorithm 300 proceeds to process step 324 where the positioning controller 78 transfers the compartment status to the master controller 76 with the master controller 76 sharing that information with the external product management kiosk 100, if necessary.

The algorithm 300 then proceeds to process step 326 and the positioning controller 78 moves to a default waiting position. In addition, the algorithm 300, at step 328, understands if status was requested and performed due to bypass event indicator 94. If the status request is due to the bypass event indicator 94 the algorithm 300 proceeds to process step 330 shown in FIG. 5A. A bypass event described in detail below occurs when a user initiates a mechanical override of the arms 54 to allow access to multiple compartments simultaneously without intervention by the positioning controller 78. Such an event may occur, for example, if power is lost causing the refrigerator 10 to be electrically inoperable. Alternatively, a user may wish to override the actuation system 26 to allow immediate access to all of the storage spaces 22 in an emergency situation. For example, if the products need to be removed quickly in the event of a fire, or if refrigerator 10 is used to store medical products that may be required to respond to a disaster situation.

Figure 18:
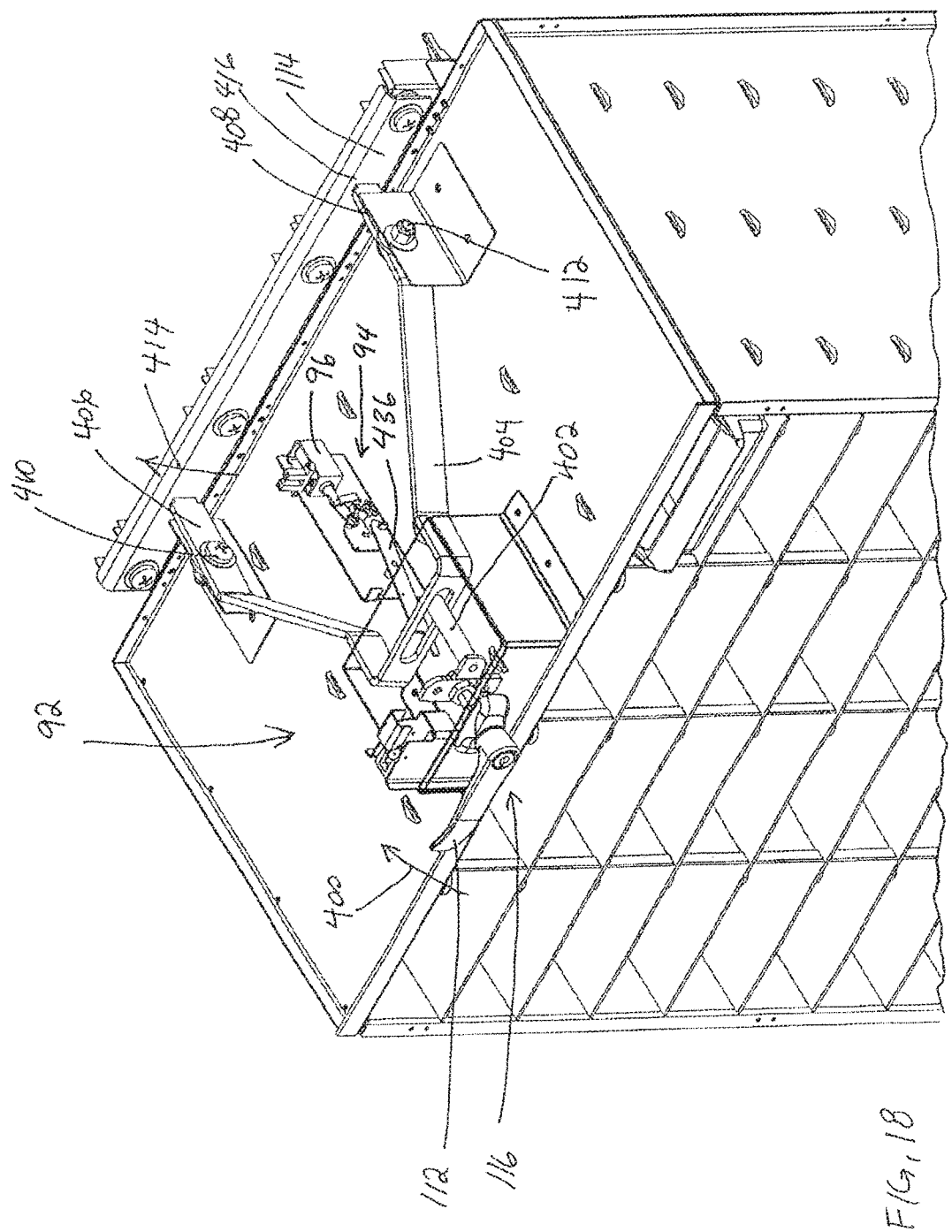
FIG. 18 is a perspective view of a portion of the medical products storage device with portions removed to show a manual bypass system which is actuable to cause an access control system of the medical products storage device to be overridden to allow access to all of the storage trays positioned in the medical products storage device.
Figure 19:
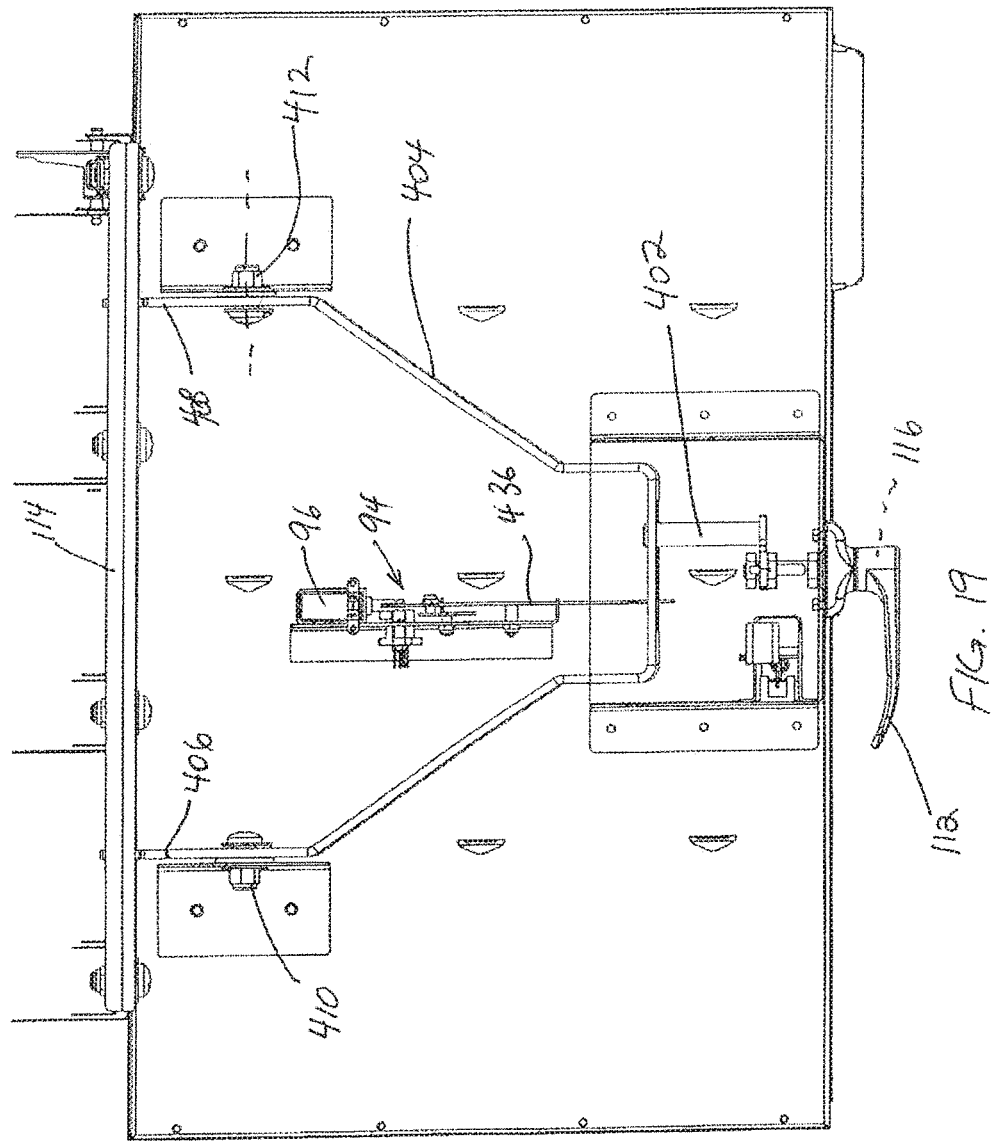
FIG. 19 is a top plan view of the medical products storage device with portions removed to show the manual bypass system.
Figure 20:
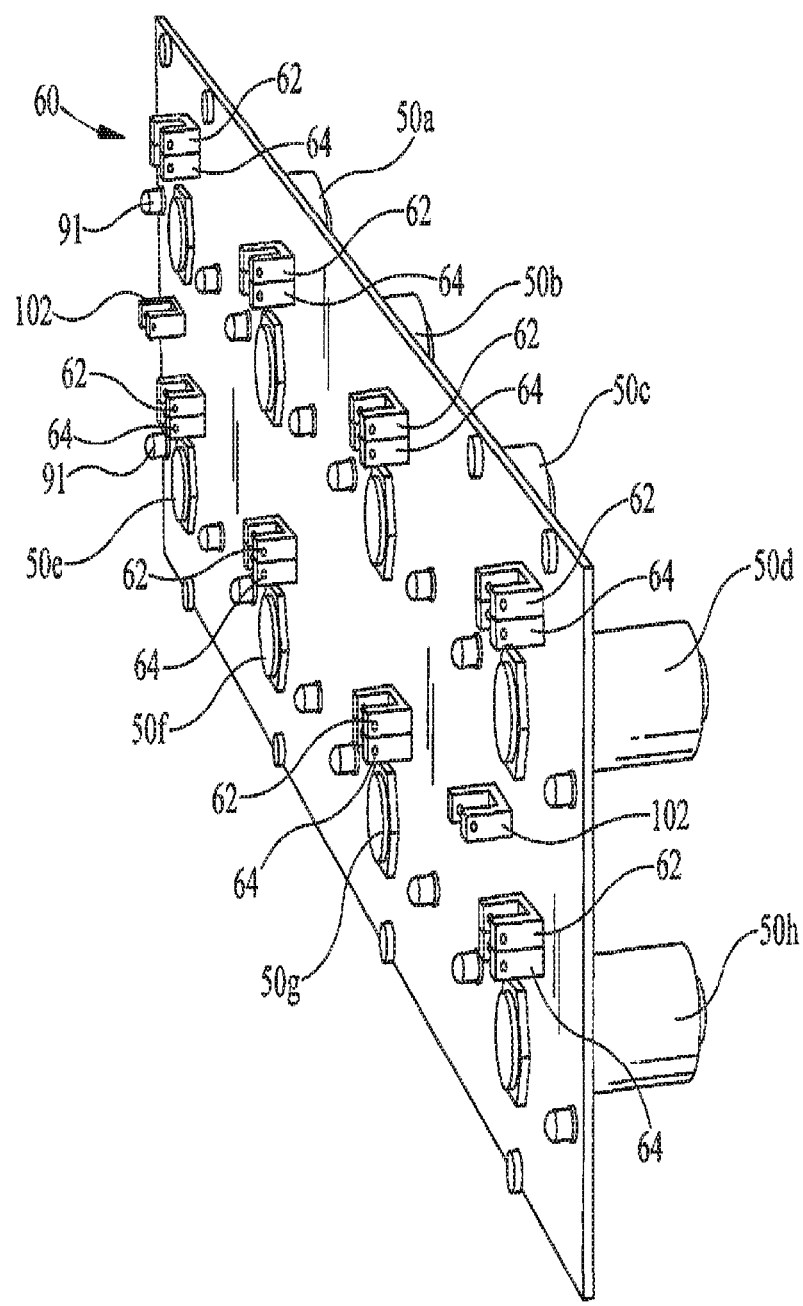
FIG. 20 is a perspective view of a portion of an actuation system of the medical products storage device.
Figure 21:
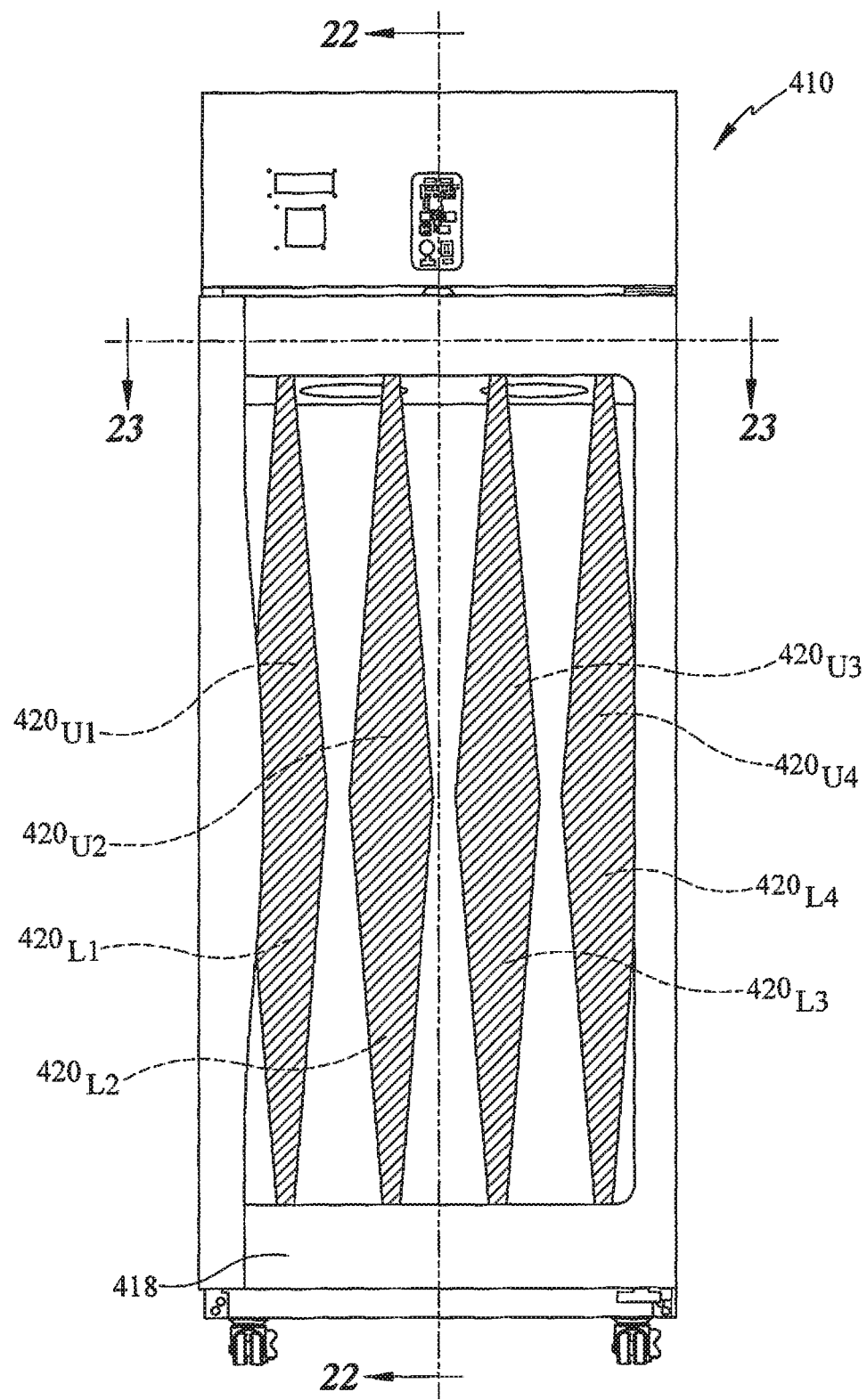
FIG. 21 is a front plan view of another embodiment of a medical products storage device, the embodiment of FIG. 21 including an optical system for detecting indicia positioned on medical products that are being moved into or out of the medical products storage device.

Referring to FIGS. 18 and 19, a mechanical bypass of the actuation system 26 can be initiated by a user by unlocking a key or tumbler lock 116 and activating a bypass handle 112. The bypass handle 112 actuates a sliding plate 114 (best seen in FIG. 8) which engages all of the arms 54 to pivot the arms 54 about each of the respective axes 56 to disengage the storage trays 24. Because the sliding plate 114 engages all of the arms 54 simultaneously, the actuation system 26 is not needed to unlock all of the arms 54. Rotation of bypass handle 112 in the direction of arrow 400 causes movement of a cam rod 402 downwardly, forcing a actuator 404 to move downwardly, resulting in legs 406 and 408 of the actuator to pivot about respective pivots 432 and 434. Pivoting of the legs 406 and 408 induces upward forces 414 and 416 on the sliding plate 114 to move the sliding plate 114 to allow the arms 54 to disengage the storage trays 24.

Movement of the actuator 404 acts on an arm 436 that acts on the bypass event indicator 94 to cause the position of the bypass event indicator 94 change to bypass event status. Bypass event indicator 94 is a limit switch that is activated by the arm 436. Arm 436 as a lost motion component that allows the actuator 404 to return to the normal position without acting on the arm 436. The bypass reset solenoid 96 must be activated to cause the arm 436 to return to a normal status position engaging the actuator 404. This removes the bypass event indication from the indicator 94. Thus, even if the bypass handle 112 and sliding plate 114 are returned to a normal position, the bypass event indicator 94 continues to indicate that a bypass event has occurred. In this way, the bypass event can be detected even if the system was unpowered when the event occurred.

At process step 330, algorithm 300 performs a reset of a bypass event by actuating the bypass reset solenoid 96 which moves the arm 436, and if necessary, the bypass handle 112 and the sliding plate 114 to a normal, non-bypass, position. The algorithm 300 then proceeds to process step 332 where the positioning controller 78 communicates that the bypass reset has been conducted to the master controller 76 which then passes the information to the external product management kiosk 100, if it is present. When the bypass handle 112 is returned to the normal position, the lock 116 re-engages so that a bypass cannot be initiated without unlocking the lock 116.

As part of the algorithm 300, the positioning controller 78 continuously monitors the bypass event indicator 94 to determine if a bypass event has occurred. This analysis is performed by the algorithm 300 at decision step 334. If no bypass event is detected by the positioning controller 78, the algorithm 300 returns to decision step 306 and monitors for a status command from the master controller 76. If a bypass event occurs, the algorithm 300 proceeds from decision step 334 to process step 336 where the positioning controller 78 communicates that a bypass event has occurred to the master controller 76. The master controller 76 will share the bypass event occurrence with the external product management kiosk 100, if it is present.

Turning now again to the structure of the storage tray 24 and the interaction of the storage tray 24 with the storage spaces 22, various views of the storage tray 24 shown in FIGS. 10-17. The storage tray 24 includes materials which tend to illuminate, or conduct light, when light is directed to the material. The light is then emitted from the tray 24. In the illustrative embodiment, the storage tray 24 is a monolithic structure comprising polycarbonate which has been found suitable for causing the tray to appear to light up when LEDs in proximity to the storage tray 24 are illuminated. In this way, the circuit assembly 88 is operable to illuminate a particular storage tray 24 when access to the contents of the particular tray is requested by a user. In some embodiments, the tray 24 may include a textured surface 36 that tends to provide additional diffusion of the light being applied to the tray 24 to provide additional indicia to a user of which tray 24 is to be accessed.

The storage tray 24 is configured to be optionally used to carry the medical products container 108 from the refrigerator 10 to a use location so that a user does not have to handle the medical products container 108 in transit. The storage tray 24 is configured to interact with the storage space 22 such that a storage tray 24 will not unexpectedly fall out of a storage space 22 as it is being removed by a user. A front portion 120 of the storage tray 24 includes a flange 122 which has a surface on which a label may be positioned. The front portion 120 is formed to include a space 124 in which a user's fingers are positioned to grip the storage tray 24 so that the front portion 120 may be used as a handle to slide the storage tray 24 out of the storage space 22. The storage tray 24 has lateral sides 126 and 128 to form walls to contain a medical products container 108 or other materials or containers. A front wall 130 engages the front portion 120 with the front portion 120 extending therefrom. A back wall 132 cooperates with the sides 126 and 128 as well as the front wall 130 defines a storage enclosure 133. Storage enclosure 133 is configured to contain product in the storage space in case the medical products container 108 is damaged, causing product, such as blood, to leak out and into the storage enclosure 133. Each side 126 and 128 is formed to include a respective upper portion 134, 136 which include inner surfaces 138 and 140, respectively. Each side 126, 128 also include a lower portion 142 and 144 respectively. The lower portions 142 and 144 each define an outer surface 146 and 148 respectively. In use, multiple storage trays 24 may be stacked upon each other with the outer surfaces 146 and 148 of the lower portions 142 and 144 engaging with the inner surfaces 138 and 140 of the upper portions 134 and 136 so that a first storage tray 24 positioned on top of a second storage tray 24 is precluded from lateral movement relative to the first storage tray 24.

In addition, the right side 126 is formed to include two protrusions 150 and 152 that engage ends 156 and 154, respectively, of lower portion 142 of the right side 126 with a first storage tray 24 stacked upon a second storage tray 24. Similarly the left side 128 includes two protrusions 158 and 160 that engage ends 164 and 162, respectively, of lower portion 144 of right side 128 of storage tray 24 went two trays are stacked. Thus, when the storage trays 24 are not positioned in a compartment, they are configured to stack to interengage so that multiple storage trays 24 can be stacked upon one another for transport and be restricted from relative movement.

The storage tray 24 is further configured to include a back portion 170 adjacent the back wall 132. The back portion 170 is formed to include a flange 172 that is spaced apart from the back wall 132 so that to spaces 174 and 176 are formed between the back wall 132 and flange 172. A user can insert their hand into either or both of the spaces 174 and 176 gripping the flange 172 while simultaneously gripping the flange 122 to carry a storage tray 24. In addition, back portion 170 has a retainer 178 formed therein, the retainer 178 configured to be secured by an arm 54 when the storage tray 24 is engaged by a hook 180 of the arm 54 as suggested in FIG. 8A. The arm 54 includes a nose 182 that includes a cam surface 184 which engages the retainer 178 as the storage tray 24 is inserted into a storage space 22. Pressure against the arm 54 by interaction between the retainer 178 and a cam surface 184 induces rotation of the arm 54 about axis 56 until the cam surface 184 is cleared by the retainer 178 and the hook 180 engages the wall 58 of the retainer 178. Once the hook 180 engages the retainer 178, the storage tray 24 is retained in the storage space 22 until released by either the actuation system 26 or the bypass handle 112.

Figure 16:
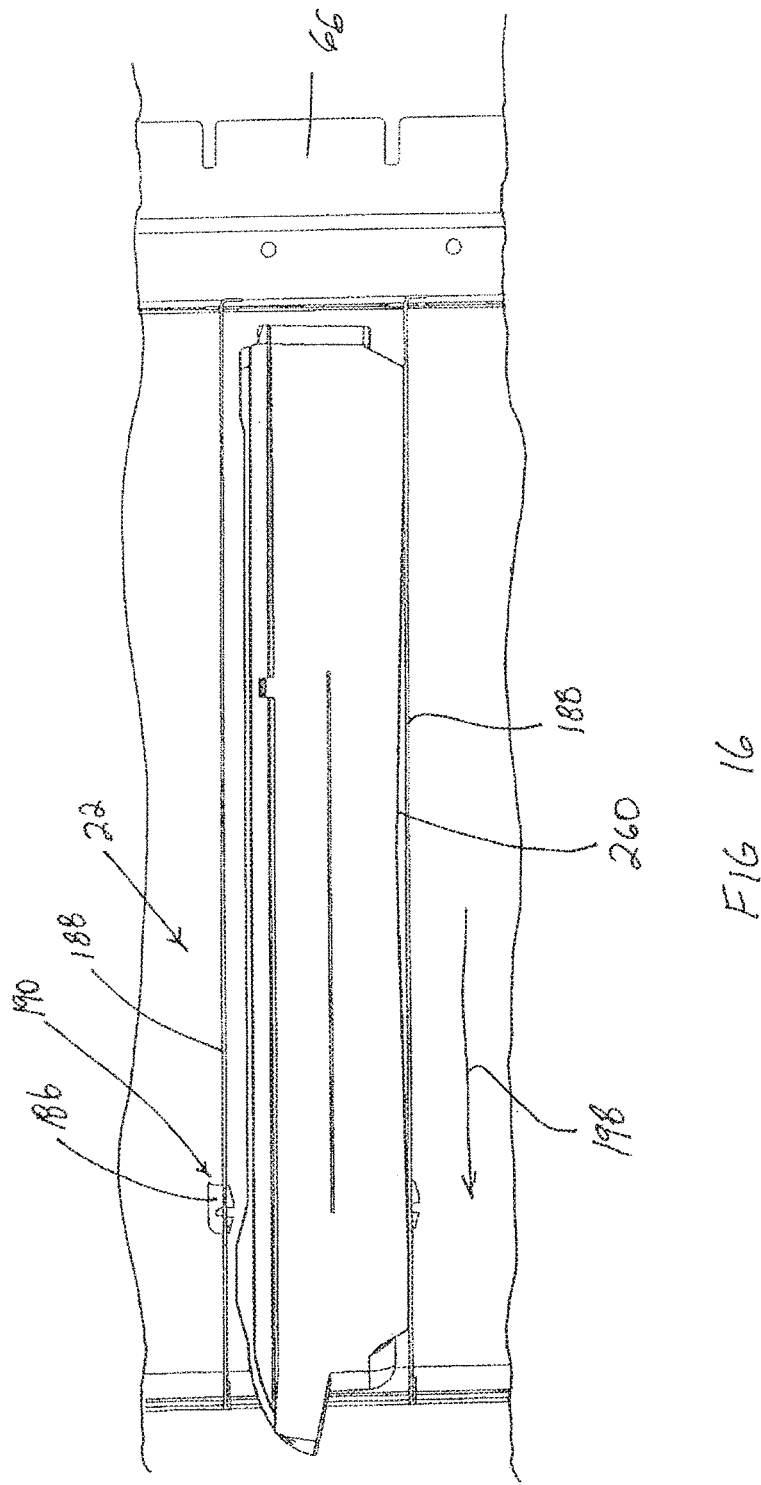
FIG. 16 is a side view of a portion of the medical products storage device of FIG. 1 with portions removed showing a storage tray similar to the storage tray of FIG. 10 positioned in a storage space.
Figure 17:
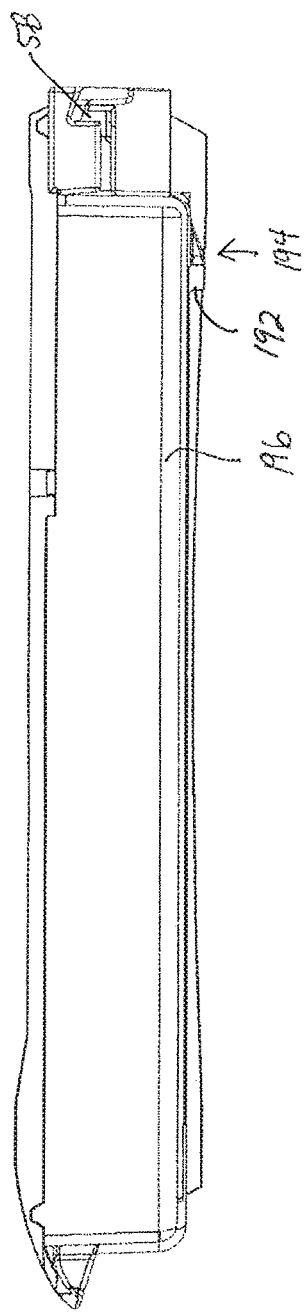
FIG. 17 is a cross-sectional view of the storage view of a storage tray taken along lines 17-17 of FIG. 15.

Referring now to FIGS. 16-17, a stop 186 is positioned on a shelf 188 in each storage space 22. Each stop 186 is formed to include a catch 190 positioned to engage a surface 192 formed on a hook 194 that extends from the bottom wall 196 of the storage tray 24 near the back wall 132. As the storage tray 24 is slid out of the storage space 22, the catch 190 engages the surface 192 to prevent the tray 24 from sliding directly out of the storage space 22. The lower portions 142 and 144 of respective sides 126 and 128 are each formed to include an arcuate lower edge 260 which requires that the front and back of a storage tray 24 be raised in parallel below the level of the shelf 188 causing the back of the storage tray 24 to be raised up so that the hook 194 clears the stop 186 to allow the tray to be removed from the storage space 22. The spacing between shelves 188 above and below a particular storage space 22 is configured to allow the tray to be slipped over the stop 186 when being removed with a deliberate effort of the user.

While the disclosed system is configured to help reduce errors in storage and allocation of medical products, there is the potential, under certain circumstances, for errors to arise. For example, consider a potential error condition caused as a user is performing a check-in request for a medical product container such as a blood bag, for example. The user, having multiple bags and may choose one to be checked in, and upon performing a check in scan at a kiosk they put the bag down and inadvertently pick up an incorrect bag and put it into the bin location intended for the first bag. If multiple bags are being stored, it may not be until others are loaded that the original bag is picked up for check-in; at that time the system would alert the user the bag had already been checked and the user would have to back-track to determine where the error occurred.

In another example, consider a potential error condition caused during a short power outage and user bypass event. A user having invoked a bypass and in the process of removing bags or trays containing bags may be susceptible to errors when the power is returned quickly. When power is restored and the user puts the bags or trays (with product) back into the unit, there is potential to inadvertently mix some up. It is expected the control system will read an event occurred and request each bin position be verified, but if this is not done then incorrect product release could occur.

In still another example, an error condition may be caused as a user is performing a check-in request for a blood bag. For example, a bin location in which (a) a tray latch has previously been damaged allowing a tray to be opened at any time or (b) the user pulls a 'locked' tray with sufficient force to break the latch or tray latch point. Upon performing a check in scan at a kiosk the user inadvertently opens the tray at the damaged location or breaks a locking location and subsequently places the blood bag in a location other than the specified location.

In yet another example, a potential error condition may be caused as a user is performing a check-out request of a previously loaded blood bag. Upon the door being opened and the bin unlocked such that the blood bag can be removed, a user may pull the bag but put another in its place that had not been properly logged. This unit of blood would be 'lost' until accidentally found at a later time when the bin is re-opened during a check-in request.

The disclosed medical products storage device 10 and related system components uses various checks and re-checks during check-in that includes kiosk barcode scanning, controlled unit door access, controlled tray illumination and unlocking to help ensure the blood product is loaded into the correct bin position. Upon check-out when a product request is made through the kiosk, it results in a controlled unit door access; controlled tray illumination and unlocking helping ensure the user pulls open the intended bin position. The removed product is then transported over to the kiosk for follow-up barcode scanning to ensure the correct bag has been removed.

Referring now to FIGS. 21-25, another embodiment of medical products storage device 410 is similar to the medical products storage device 10 and like components will utilize the same reference numerals. The medical products storage device 410 includes optical units 412 which may be a singular or multiple camera/video units within a door 418 of the device 410. The optical units 412 communicate with the master controller 76 or kiosk 100 and are capable of targeting, detecting and reading descriptive text and/or ID or 2D barcodes or other indicia within short time. During a check-in, the system of optical units 412 capture an image of a product label as the product is placed into a storage tray 24 and moves through the field of view 420 of an optical unit 412 to provide quick verification back to the master controller 76 or kiosk 100 that the correct product (or potentially an incorrect product) has been placed into the storage tray 24 at particular position. Following the same concept, during a checkout the optical units 412 detect the label as the storage tray 24 is removed and the product enters the field of view 420.

It should be understood that in some embodiments, the optical units 412 may be capable of storing images or frames for a period of time so that the image might be processed to evaluate the markings or indicia. Thus, the image processing does not have to be in real time, but might occur in near real time with the image capture triggered on movement in the field of view 420.

Figure 22:
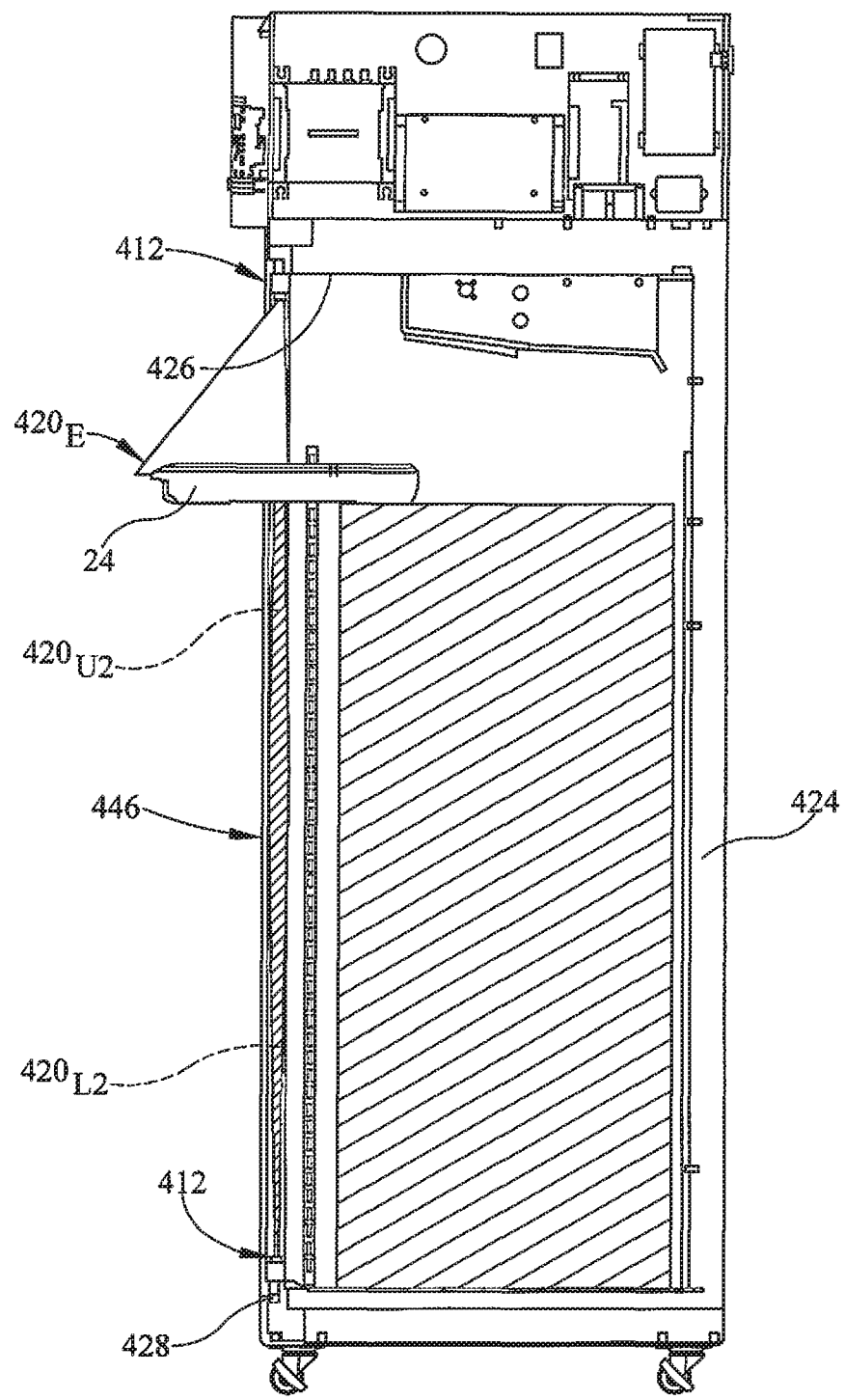
FIG. 22 is a cross-sectional view of the medical products storage device of FIG. 21 taken along lines 22-22 in FIG. 21.
Figure 23:
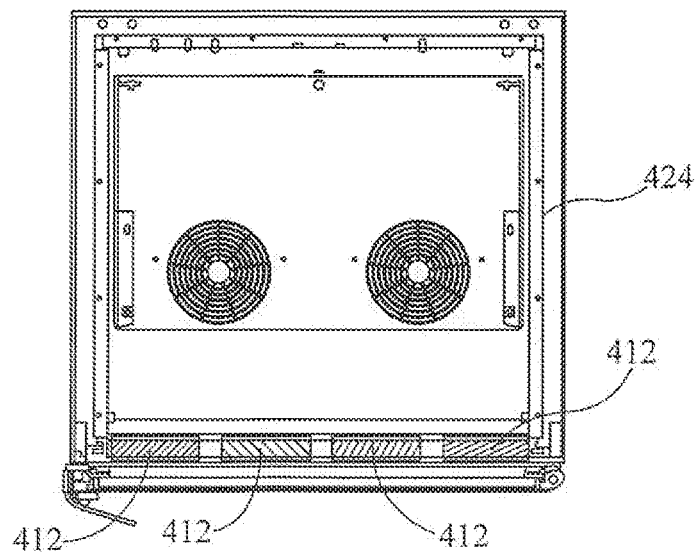
FIG. 23 is a cross-sectional view of the medical products storage device of FIG. 21 taken along lines 23-23 in FIG. 21.

Depending upon the capability of the optical unit 412, one or more optical units 412 can be positioned at a single location such as the top surface 426 (viewing downwardly) of a cabinet 424 of the device 410, as shown in FIG. 22. The units 412 may also be arranged in a dual orientation system where one or more optical units 412 are attached to opposing locations such as the top surface 426 (viewing downwardly) while the similar optical units 412 are attached to a bottom surface 428 of the cabinet 424 (viewing is up) whereas collectively they can image a label from above or from below through a clear plastic storage tray 24. A dual orientation system supports bagged product whose information is facing either up or down.

In the illustrative embodiment, the optical units 412 each include a controller which, under the direction of the master controller 76 or kiosk 100, changes the position that is being imaged to the expected location of the product being stored or removed. Using this information, an optical unit 412 with an adjustable focal depth lens can be preset by the controller of the optical unit 412 to preset the lens to the expected field of view. This lens adjustment would illustratively occur prior to the cabinet 424 door 430 being unlocked. For example, there are four fields of view $420_{U1}$, $420_{U2}$, $420_{U3}$, and $420_{U4}$ looking vertically downward and four fields of view $420_{L1}$, $420_{L2}$, $420_{L3}$, and $420_{L4}$ looking upward. shown. Each of the fields of view $420_{U1}$, $420_{U2}$, $420_{U3}$, $420_{U4}$, $420_{L1}$, $420_{L2}$, $420_{L3}$, and $420_{L4}$ have been adjusted to be focused on a common generally vertical position 446.

As shown in FIG. 22, in some instances, the field of view may be expanded, as represented by reference numeral 420E which shows how the field of view may be expanded to extend out of the cabinet 424.

Figure 24:
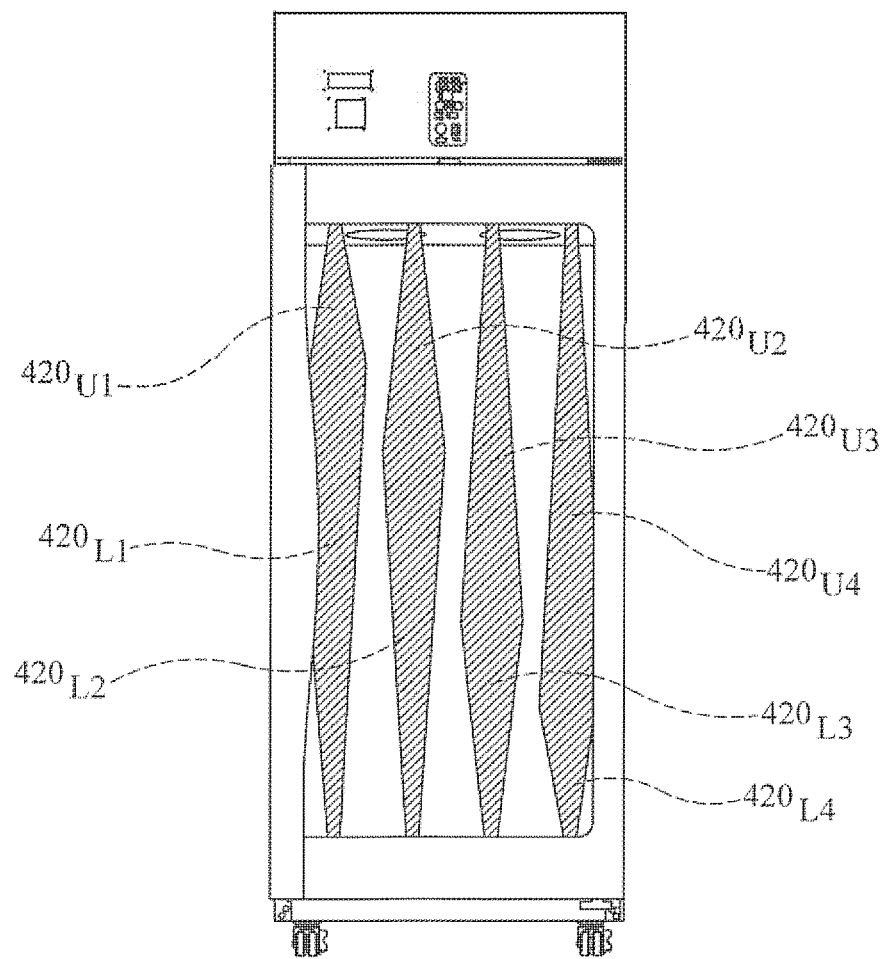
FIG. 24 is a diagrammatic representation of another embodiment of medical products storage device similar to the medical products storage device of FIG. 21, the device of FIG. 24 having multiple optical units with different focal lengths.
Figure 25:
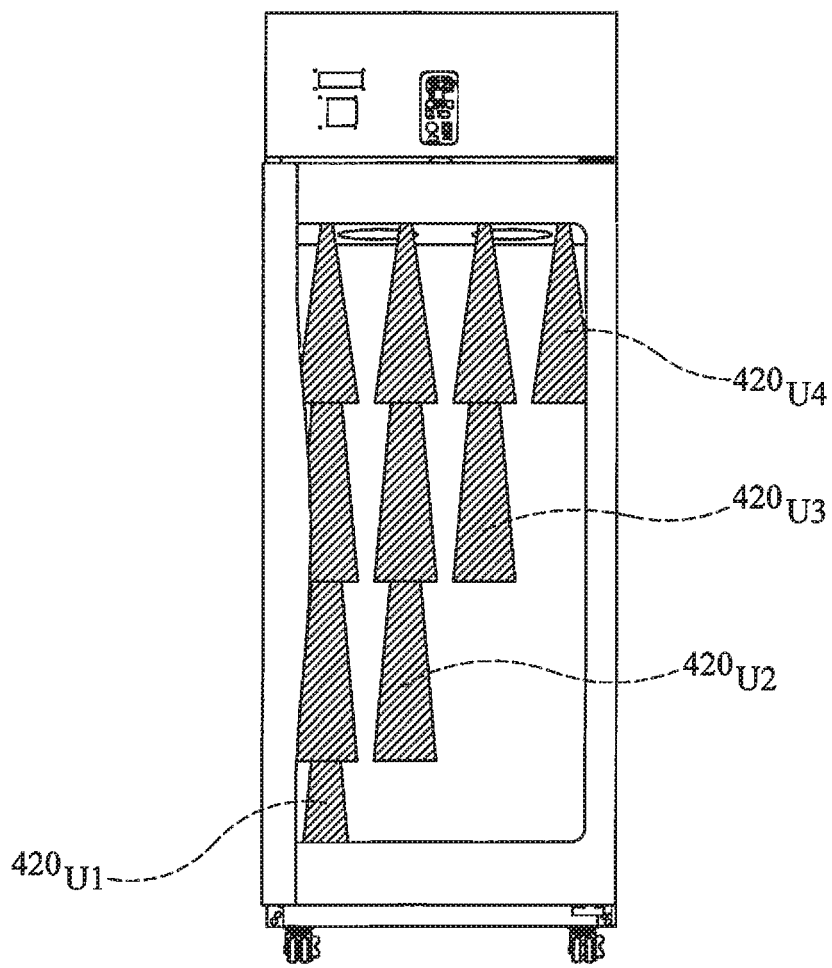
FIG. 25 is a diagrammatic representation of yet another embodiment of medical products storage device similar to the medical products storage device of FIG. 21, the device of FIG. 25 having multiple optical units with different focal lengths.

As shown in FIG. 24, each of the fields of view $420_{U1}$, $420_{U2}$, $420_{U3}$, $420_{U4}$, $420_{L1}$, $4202_{L2}$, $420_{L3}$, and $420_{L4}$ may be set to a different focal length, depending on the targeted location. FIG. 25 is representative of how the focal length of the optical units 412 might be varied, with the fields of view Each of the fields of view $420_{U1}$, $420_{U2}$, $420_{U3}$, and $420_{U4}$ each being shown with different focal lengths and illustrating the use of only one set of optical units 412 with all of the units positioned on the top surface 426.

Figure 26:
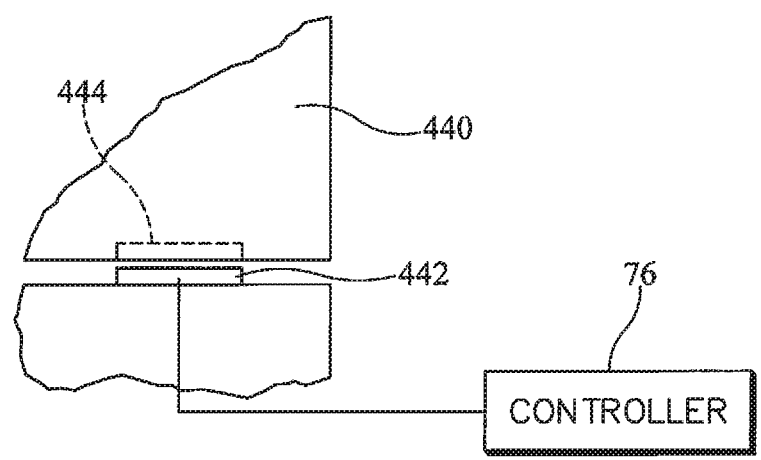
FIG. 26 is a diagrammatic representation of a tray that includes a ferrous component that is selectively engaged by an electro-magnet that is under the control of a control system.

Referring now to FIG. 26, in another embodiment, individual trays 440 or drawers are held locked by an individual electro-magnet 442 that, when energized engages with a ferrous member 444 positioned in the body of the tray 440. The electro-magnet 442 is in communication with a controller, such as master controller 76 which energizes the electro-magnet 442. While effective at holding a tray 440 closed to prevent removal of the stored contents, the electro-magnet 442 is a significant consumer of power and, as such, when many are used have the potential to generate significant heat in a closed cabinet. If the cabinet includes a refrigeration system the efficiency of the system will be reduced as the refrigeration portion will have to operate more often to counter the effects of the electro-magnet 442 heat output. If the cabinet is passive, meaning no refrigeration system, the heat output of the electromagnets 442 will cause the internal chamber to heat up such that as a minimum an active air exchange feature (unit fans) will have to be added or the chamber inside will become too hot for product storage. Either way the unit will use more energy than is desired.

In some embodiments, the excess heat can be avoided by coordinating the electromagnets 442 with a door lock 80 discussed above or electro-magnet. When product is not being loaded or removed from the cabinet the door can remain locked and the internal individual storage tray 24 electro-magnets 442 are deenergized. When a product check-in or check-out event is occurring, the internal storage tray 24 electro-magnets 442 are energized just before or at the same time as the chamber door is unlocked. If the chassis were to be located in a high vibration environment or be moved about (such as a mobile unit) a concern may exist about a drawer/tray shifting away from the electro-magnet when off such that it would be too far from the electro-magnet for it to recapture the drawer/tray/etc. and re-lock it upon the electro-magnet energizing. In this event and during the period that the chassis door is locked, one option would be for the electro-magnet instead of powering fully off can be driven by a low duty cycle PWM such that its strength is just sufficient to maintain a positive hold on the tray (but not sufficient to apply locking force). A heat load will still exist within the system but at a much reduced level.

Beyond heat load, the above configurations would also improve functional operation under a battery backup condition. Instead of maintaining a large power load which would drain backup batteries quickly, powering just the door lock (electromagnetic lock) or solenoid door latch (solenoid is powered to unlock) and only powering the electro-magnets during a controlled access event would allow for a much longer functional timeframe maintaining the locked condition. This extended battery operation would potentially be more important when the stored product is pharmacy related.

It should be understood that in some embodiments, the entire tray, drawer, bin, or other internal storage device may be constructed entirely of ferrous material. In other embodiments, multiple electro-magnets 442 may be used with the same tray, drawer, bin, or other internal storage device. In some embodiments, several ferrous members 444 may be embedded in a non-ferrous tray, drawer, bin, or other internal storage device and each ferrous member 444 may interact with a particular electromagnetic 442.

Figure 28:
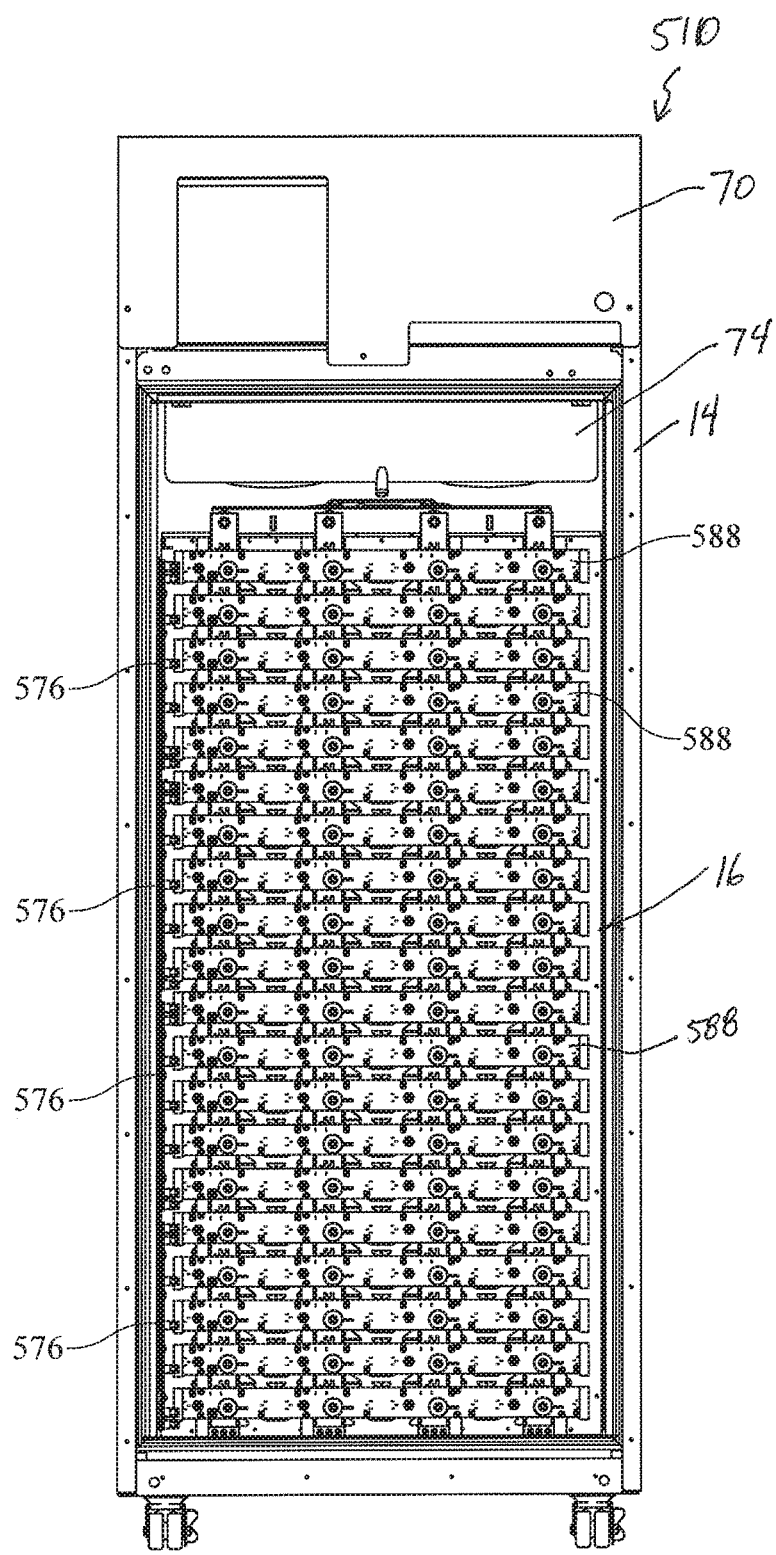
FIG. 28 is a back view of yet another embodiment of medical products storage device with portions removed, the medical products storage device having a number of discrete circuit assemblies that are positioned to control access to storage containers positioned in storage spaces of the medical products storage device.
Figure 29:
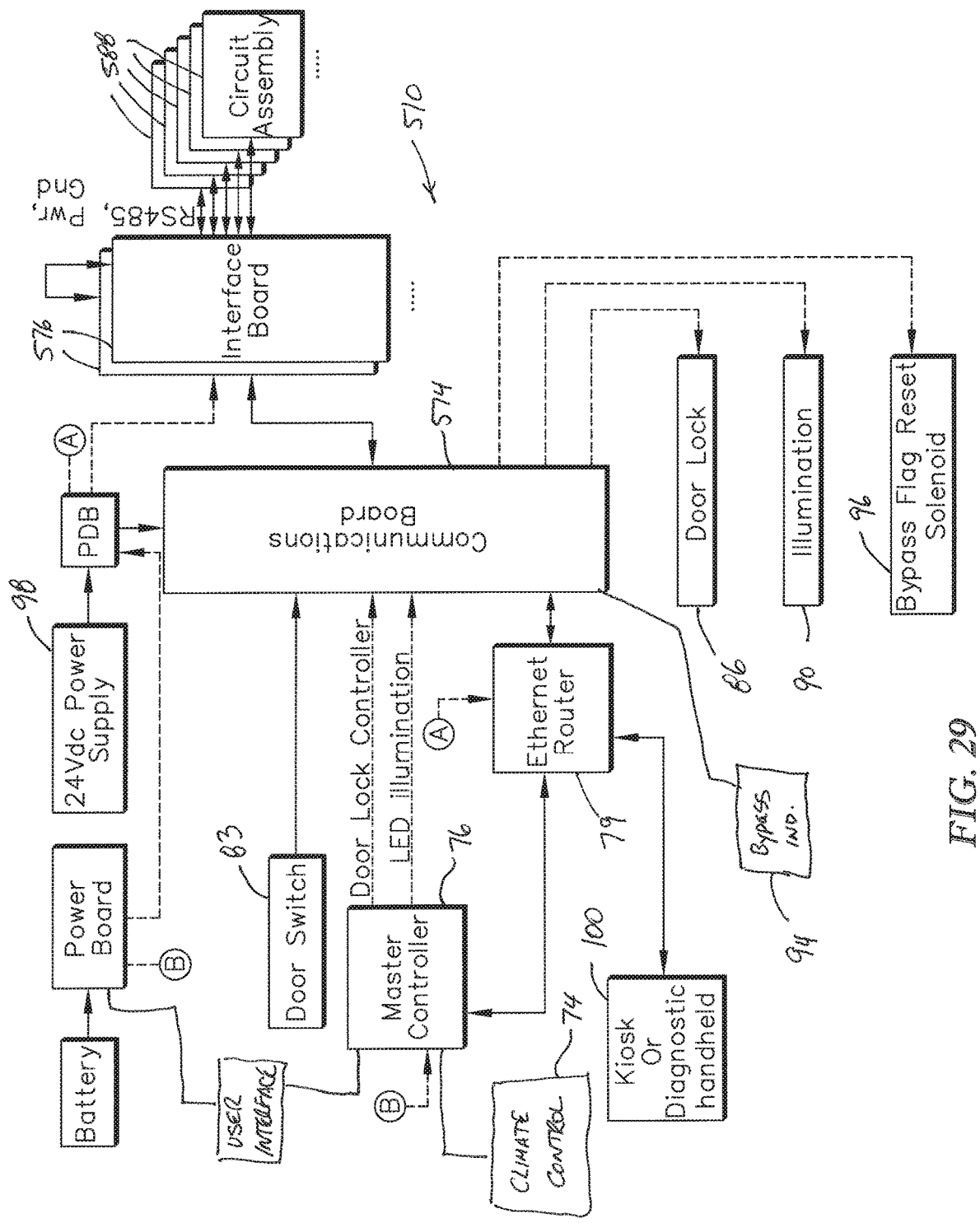
FIG. 29 is a block diagram of the control system of the medical products storage device of FIG. 28.

Referring now to FIGS. 28-29, the refrigerator 510 is similar to the refrigerator 10 and like reference numerals will be used where the features are the same. As shown in FIG. 28, the actuation system 526 of the refrigerator 510 does not include a gantry, but includes a number of circuit assemblies 588 which are each fixed to the rack 20 at a fixed location that corresponds to a row of storage spaces 22. In the illustrative embodiment, there are 20 circuit assemblies 588. Each circuit assembly 588 is connected to a specific connector associated with an interface board 576 which corresponds to the row of storage spaces 22 which is associated with the specific circuit assembly 588. In this way, the particular location of each circuit assembly 588 is determined by the control system 572 (shown in FIG. 29). The control system 572 is similar to the control system 72 of the refrigerator 10, with the omission of the actuation assembly 88, replaced by the circuit assemblies 588 and the addition of the interface boards 576. The control system 572 also omits the positioning controller 78 and replaces it with a separate communications board 574.

Each interface board 576 distributes power and RS485 communication to each of the circuit assemblies 588 from the communications board 574. The interface board 576 also contains shift registers with different latched inputs based on connector placement location such that a circuit assembly 588 will automatically know its position relative to the respective interface board 574, and accordingly, the requests it is to respond to as the requests over the RS485 network are broadcast to all circuit assemblies 588. Further a rotary switch on each interface board 576 changes the two input shift register bit configuration to allow for an interface board 576 to consider itself I of 4 possible positions—those bits in in conjunction with 3 others fully defining all circuit assembly 588 independent row positions. In some embodiments, a different setup could allow more interface boards 576 and circuit assemblies 588 by using additional bits.

The control system 572 also includes a user interface 650, a battery 652, a user interface power board 654, a power distribution board 656, and a router 658. The user interface 650 provides direct control of the refrigerator 510 to a proper! y authorized user. In addition, the battery 650, user interface power board 654, and power distribution board 656 allow for efficient transmission of power to the control system 572 and operation of portions of the refrigerator 510 in power outages. The router 79 is similar to the wireless module 79 and facilitates communication between the various components of the control system 572.

Figure 30:
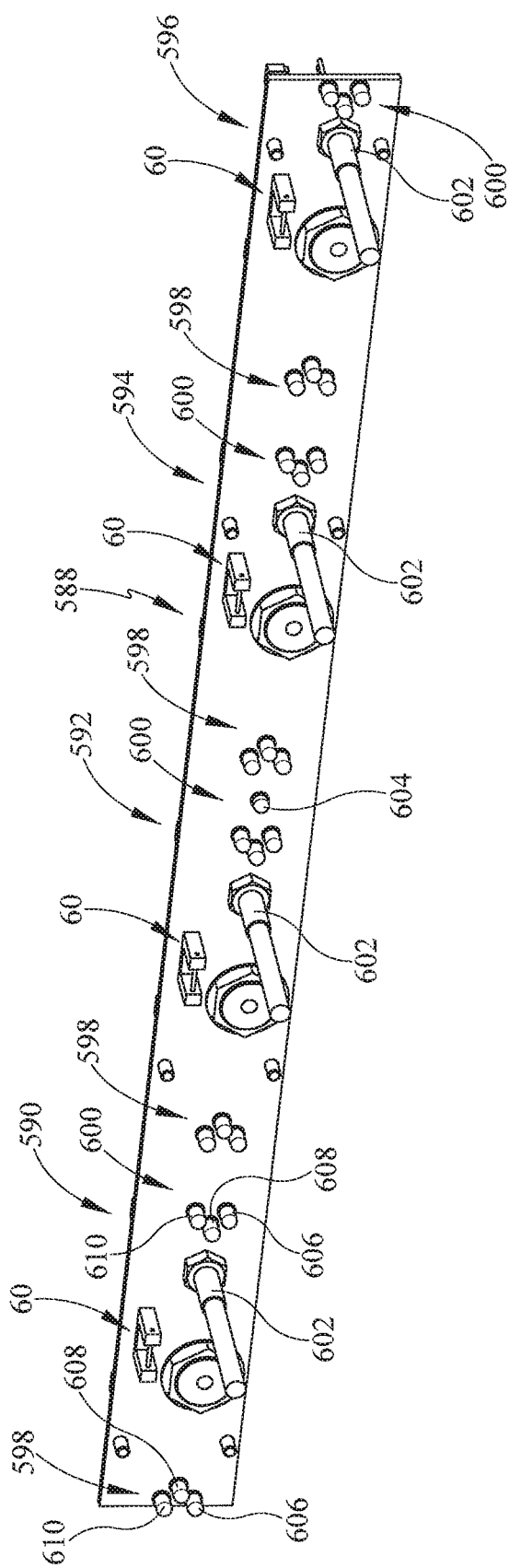
FIG. 30 is a front perspective view of one of the circuit assemblies of the medical products storage device of FIG. 28.

Referring now to FIGS. 30 and 31, a circuit assembly 588 is shown. The circuit assembly 588 is similar to the circuit assembly 88 with some differences. The circuit assembly 588 is separated into four sections 590, 592, 594 and 596. Each section 590, 592, 594 and 596 includes a solenoid 50, an optical sensor 60, a magnetic sensor 602, and a pair of LED arrays 598, 600. The circuit assembly 588 also includes a temperature sensor 604. Each section 590, 592, 594 and 596 is positioned to be adjacent a particular storage space 22. The solenoid 50 operates as described above to move an arm 554 between a release position and a secured position. The use of the signal optical sensor 60 with each arm 554 in the refrigerator 510 relies on the identification of the state of the solenoid to determine if the solenoid plunger 52 has been extended. If it has, and the optical sensor 60 does not detect the arm 554, then error condition will be detected and signal to the control system 524.

Each of the LED arrays 598 and 600 includes three LEDs 606, 608, and 610. In some embodiments, the LEDs 606, 608, and 610 are all the same color. In other embodiments, each of the LEDs 606, 608, and 610 are a different color and independently activated to provide different colors of illumination. In some embodiments, the LEDs 606, 608, and 610 are illuminated intermittently. The illumination of the LEDs 606, 608, and 610 provides an indication to a user of which of the storage trays 524 have been released. In use, each of the arrays 598 and 600 associated with a specific location will be illuminated simultaneously. The arrays 598 and 600 are positioned so that the light travels alongside the tray 524. As discussed above, the tray 524 conducts and emits the light of the LEDs 606, 608, and 610 to draw attention to the tray 524.

The magnetic sensor 602 is positioned to detect a magnet 612 positioned in the tray 524 as shown in phantom in FIG. 32-36. When a storage tray 524 is properly positioned in a storage space 22, the magnet 612 is within the field of detection of the magnetic sensor 602. The magnetic sensor 602 detects the magnetic field emitted by the magnet 612 and provides a signal to the control system 572 that there is a storage tray 524 positioned in the associated storage space 22.

The temperature sensor 604 is used to determine a value of the temperature in the enclosure 16 in the area of the circuit assembly 588. This temperature can be compared to other temperatures sensed by other temperature sensors 604 on other circuit assemblies 588 to evaluate the variations in temperature. For example, the temperature sensors 604 may be compared to determine if there is a temperature gradient within the enclosure 16. The temperature sensors 604 may also help determine which of the products stored in the refrigerator 510 might have been subjected to an over temperature condition, rather than considering all of the products as suspect. In some embodiments, additional temperature sensors may be used and a temperature sensor 604 may be positioned in each of the sections 590, 592, 594 and 596 of each circuit assembly 588, thereby permitting additional data to be gathered.

The arm 554 of refrigerator 510 further includes a push rod 556, best seen in FIG. 30, that is operable to engage the storage tray 524 as the plunger 60 extends to cause the motion of the plunger 60 to be transferred to the tray 524 to push the tray 524 outwardly slightly. This movement of the tray 524 provides an additional indication to a user of the tray 524 that has been released due to the user's request. The plunger 60 acts on the arm 54 as indicated by arrow 614 causing the arm 554 to pivot about axis 56 in the direction of arrow 618. The push rod 556 engages the back surface 172 of the tray 524 and urges the tray 524 to move in the direction of arrow 616, displacing the tray 524 from the storage position.

In the embodiment shown in FIG. 32, the tray 524 supports a lid 620 that is similar to lid 110 but includes two protrusions 622, 628 which extend upwardly from a body 626. The protrusions 622 and 624 are configured to prevent the tray 524 from being completely removed from a storage space 22. Referring to FIG. 33, the tray 524 is positioned in a storage space 522. As the tray 524 is moved to the left, out of the storage space 522, the hook 194 on the bottom of the tray 524 engages the stop 186 extending from the shelf 188. The protrusion 522 prevents the tray 524 from being rotated sufficiently to allow the hook 194 to clear the stop 186. Thus, when present, the lid 620 is configured to prevent the removal of the tray 524. A user must reach into the tray 524, dislodge the lid 620 to create sufficient clearance for the hook 194 to clear the stop 186 and then remove the tray 524. This prevents inadvertent removal of the tray 524 by a user.

Figure 36:
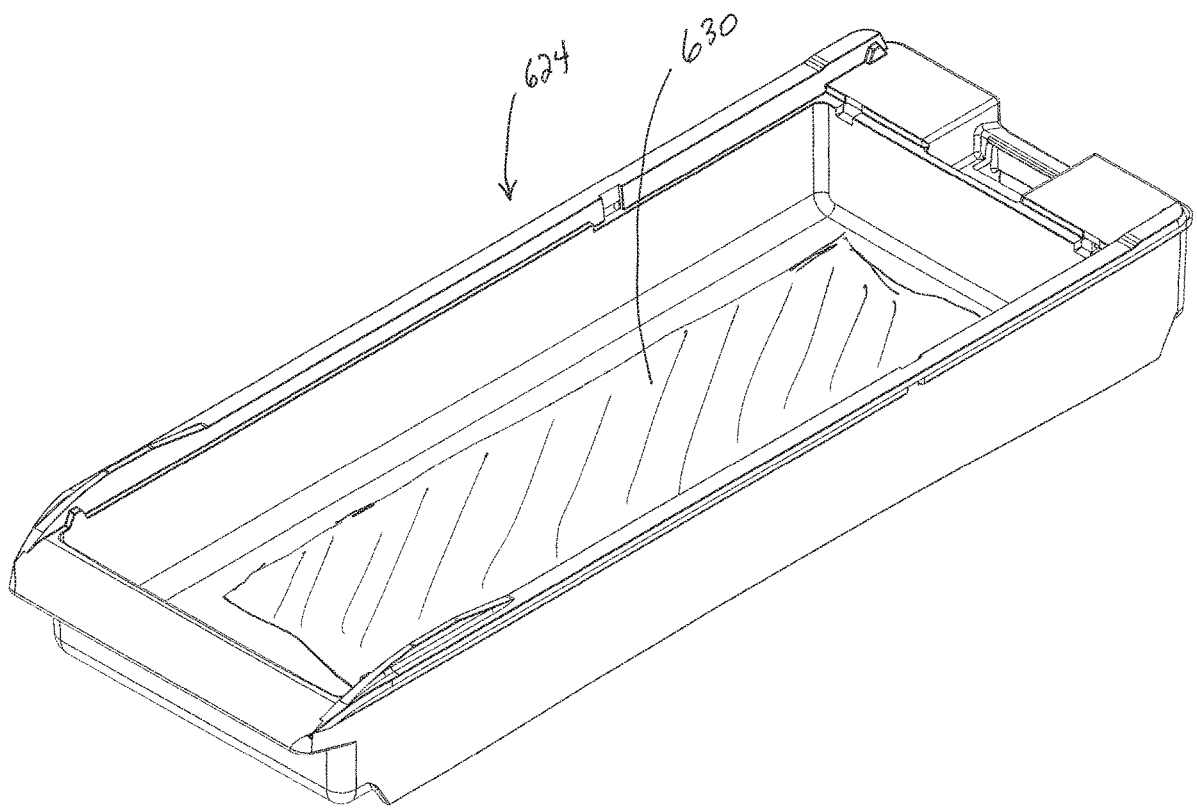
FIG. 36 is a perspective view of a tray embodiment that is similar to the embodiment of FIGS. 32-34, the embodiment of FIG. 36 further including a reflective covering positioned in the bottom of the tray.
Figure 37:
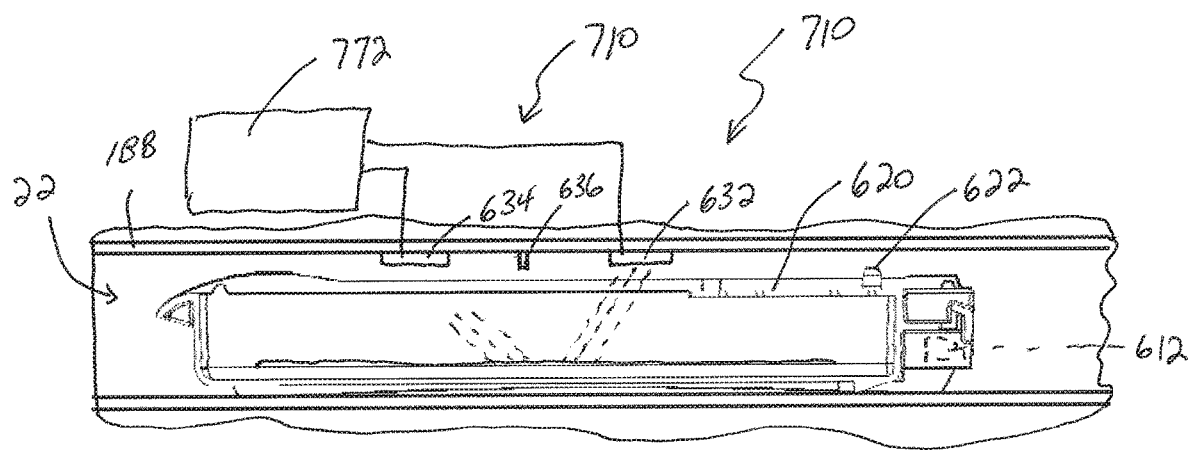
FIG. 37 is a cross-sectional view of the tray of FIG. 36 positioned in a storage space of a medical products storage device, the device including an optical emitter and an optical detector operable to detect light emitted from the emitter and reflected by the reflective covering.

Referring now to FIG. 36, a tray 624 is similar to tray 524, but includes a reflective coating 630 positioned on the bottom interior surface of the tray 624. The reflective coating 630 is used to assist with detecting whether a medical products container 108 is positioned in the tray 624. In the embodiment of FIG. 36, a refrigerator 710 includes an optical emitter 632 positioned on the bottom of a shelf 188 and positioned to direct light down into the tray 624 as shown in FIG. 37. A companion detector 634 is positioned to detect light emitted by the emitter 632 and reflected by the reflective coating 630. The refrigerator 710 further includes a shroud 636 to prevent light from the emitter 632 to be directly detected by the detector 634. The control system 772 of the refrigerator 710 is operable to cause the various emitters 632 in each storage space 22 to be selectively illuminated while the detector 634 is monitored. If the detector 634 detects the light emitted from the emitter 632, the light is presumably being reflected by the reflective coating 630. Thus, the control system 772 determines that there are no medical products container 108 positioned in the tray 624, because such a container would not properly reflect the emitted light. In this way, the control system 772 is operable to detect the presence or absence of a medical product or medical products container 108 positioned in the tray 624. It should be understood that an emitter 632 and detector pair 634 could be positioned in one or more, including all, of the storage spaces 22 of the refrigerator 710.

Figure 38:
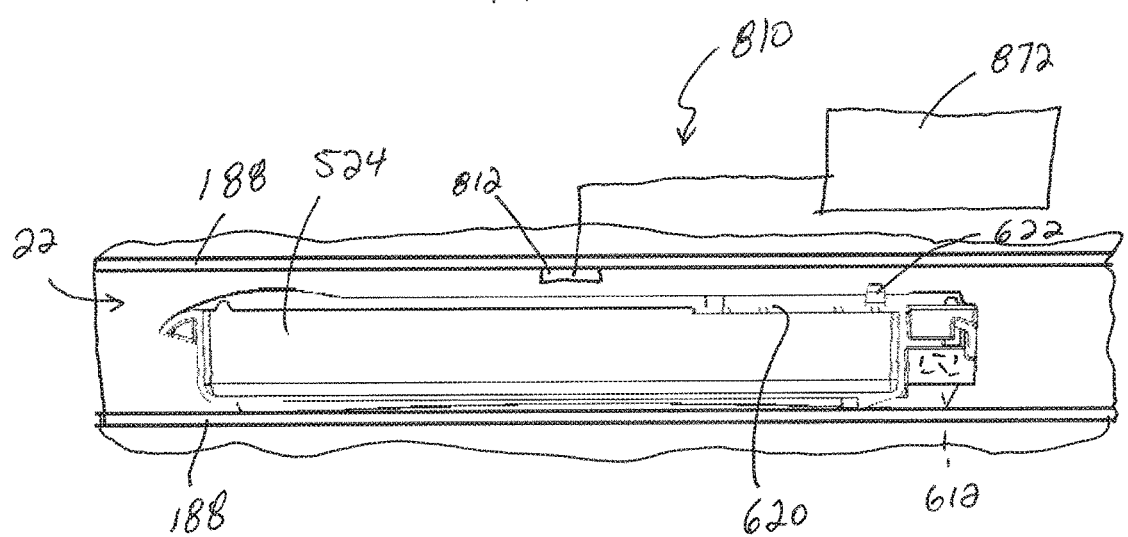
FIG. 38 is a is a cross-sectional view of the tray of FIG. 32 positioned in a storage space of a medical products storage device, the device including a near field proximity switch positioned to detect the presence of a medical product or medical product storage container positioned in the tray.

In still another embodiment shown in FIG. 38, a refrigerator 810 includes a near field detector 812 positioned on the bottom of the shelf 188. The near field detector 812 is configured to detect the presence of a medical component container 108 positioned in a tray 524. The near field detector 812 in the illustrative embodiment simply generates a field signal when the detector 812 is energized to a baseline signal. If a control system 872 of the refrigerator 810 determines the detected signal is different from the baseline signal, the detector 812 determines that a medical product or medical product container 108 is positioned in the tray 524. In some embodiments, the near field detector 812 may be positioned on the top of a shelf 188 and positioned to allow the tray 524 to be slid overtop of the detector 812.

In some embodiments, the detector 812 may comprise a radio frequency detector. A medical products container 108 may include a radio frequency identification tag that identifies the particular container 108. The tag may be a passive tag that reflects energy from the detector 812 or may be an active tag that actively transmits radio frequency identification. In such embodiments, the control system 872 is operable to detect the identification from the tag and associate it with the particular detector 812 which detects the signal, thereby identifying a location of the particular tag. When the particular material is called for, LEDs associated with the storage space 22 may illuminate to indicate the location of the tag. Because a detector 182 may detect signals from tags in adjacent storage spaces 22, in some cases, the control system 872 may identify multiple locations for the same tagged item. In such cases, the control system 872 may illuminate multiple LEDs in multiple spaces to provide a user with an idea of the general vicinity of the tag and associated material. In still other embodiments, the control system 872 may utilize known methods for triangulating the location of the particular tag based on signal strength, or determining the location mathematically by a composite analysis of all of the detectors 812 which detect the signal.

Although certain illustrative embodiments have been described in detail above, variations and modifications exist within the scope and spirit of this disclosure as described and as defined in the following claims.

What is claimed is:

1. A storage device for medical products, the storage device comprising:
 a cabinet defining an enclosure having a plurality of compartments, each of the plurality of compartments including a stop;
 a plurality of storage containers, each storage container including a hook formed on a bottom side of the storage container, and each storage container configured to be inserted into a corresponding one of the plurality of compartments so that withdrawal of a storage container from the corresponding one of the plurality of compartments is configured to engage the hook of the storage container with the stop of the corresponding one of the plurality of compartments to restrict further withdrawal of the storage container;
 an actuation assembly including:
  a plurality of arms that are configured to engage the plurality of storage containers so as to secure the plurality of storage containers in the plurality of compartments; and
  a plurality of actuators positioned in the cabinet, each of the plurality of actuators being configured to actuate one of the plurality of arms independent of a remaining portion of the plurality of arms; and
 a release mechanism that is configured to simultaneously actuate each of the plurality of arms to release the plurality of storage containers from the plurality of compartments.

2. The storage device of claim 1, wherein each of the plurality of actuators is configured to be electrically actuated.

3. The storage device of claim 1, wherein the release mechanism is manually operable.

4. The storage device of claim 3, wherein the release mechanism includes a security device that is configured to prevent the release mechanism from being actuated.

5. The storage device of claim 4, wherein the security device is a key-operated lock.

6. The storage device of claim 1, wherein the actuation assembly includes a plurality of detectors that are each configured to detect a position of a corresponding one of the plurality of arms.

7. The storage device of claim 1,
 wherein for each storage container of the plurality of storage containers, the storage container includes:
  one or more protrusions positioned along a top side of the storage container, and
 wherein, for each storage container, the one or more protrusions are opposed to an upper surface in the corresponding compartment to prevent rotation of the storage container to disengage the hook from the stop.

8. A storage device for medical products, the storage device comprising:
 a cabinet defining an enclosure;
 a first compartment positioned in the enclosure that is configured to receive a first storage container therein, the first compartment including a first stop and the first storage container including a first hook on a bottom side of the first storage container, the first hook configured to engage the first stop to restrict a withdrawal of the first storage container from the first compartment;
 a second compartment positioned in the enclosure that is configured to receive a second storage container therein, the second compartment including a second stop and the second storage container including a second hook on a bottom side of the second storage container, the second hook configured to engage the second stop to restrict a withdrawal of the second storage container from the second compartment;
 an actuation assembly including:
  a first arm that is configured to engage a back end of the first storage container to secure the first storage container in the first compartment; and
  a second arm that is configured to engage a back end of the second storage container to secure the second storage container in the second compartment; and
 a release mechanism that is configured to simultaneously:
  disengage the first arm from the first storage container to release first storage container from the first compartment; and
  disengage the second arm from the second storage container to release the second storage container from the second compartment.

9. The storage device of claim 8, wherein the actuation assembly further comprises:
 a first actuator that is configured to actuate the first arm independently of the second arm; and
 a second actuator that is configured to actuate the second arm independently of the first arm.

10. The storage device of claim 9, wherein the first compartment and the second compartment are laterally adjacent one another within the cabinet.

11. The storage device of claim 10, wherein the first actuator and the second actuator both comprise solenoid actuated plungers.

12. The storage device of claim 11, wherein the release mechanism is manually operable.

13. The storage device of claim 11, wherein the release mechanism includes a security device that is configured to prevent the release mechanism from being actuated.

14. The storage device of claim 13, wherein the security device is a key-operated lock.

15. The storage device of claim 8,
wherein the first storage container includes:
one or more protrusions positioned along a top side of the first storage container, and
wherein the one or more protrusions are opposed to an upper surface in the first compartment to prevent rotation of the first storage container to disengage the hook from the stop.

16. A method comprising:
inserting a first storage container into a first compartment defined in a cabinet;
inserting a second storage container into a second compartment defined in the cabinet;
engaging a back end of the first storage container with a first arm to secure the first storage container in the first compartment;
engaging a back end of the second storage container with a second arm to secure the second storage container in the second compartment;
actuating a first actuator to disengage the first arm from the first storage container without disengaging the second arm from the second storage container;
simultaneously disengaging the first arm from the first storage container and the second arm from the second storage container by use of a release mechanism; and
withdrawing the first storage container from the first compartment so as to engage a hook on a bottom side of the first storage container with a stop defined in the first compartment to prevent further withdrawal of the first storage container from the first compartment.

17. The method of claim 16, further comprising actuating a second actuator to disengage the second arm from the second storage container.

18. The method of claim 16, wherein the first actuator includes a solenoid actuated plunger.

19. The method of claim 16, further comprising actuating a security device to allow actuation of the release mechanism.

20. The method of claim 16, further comprising preventing disengagement of the hook from the stop with one or more protrusions positioned along a top side of the first storage container that are to oppose an upper surface in the first compartment.

* * * * *